US012585224B2

(12) United States Patent
Macé et al.

(10) Patent No.: US 12,585,224 B2
(45) Date of Patent: Mar. 24, 2026

(54) SYMPATHETIC TIMEPIECE ASSEMBLY

(71) Applicant: Montres Breguet S.A., L'Abbaye (CH)

(72) Inventors: Jérôme Macé, Le Pont (CH); Alain Zaugg, Le Sentier (CH); Daniel Matteazzi, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 506 days.

(21) Appl. No.: 18/006,646

(22) PCT Filed: Jul. 30, 2020

(86) PCT No.: PCT/EP2020/071502
§ 371 (c)(1),
(2) Date: Jan. 24, 2023

(87) PCT Pub. No.: WO2022/022825
PCT Pub. Date: Feb. 3, 2022

(65) Prior Publication Data

US 2023/0288874 A1 Sep. 14, 2023

(51) Int. Cl.

| | |
|---|---|
| ***G04B 19/02*** | (2006.01) |
| ***G04B 27/00*** | (2006.01) |
| *G04C 1/00* | (2006.01) |
| *G04C 11/00* | (2006.01) |
| *G04C 13/02* | (2006.01) |
| *G04C 13/03* | (2006.01) |
| *G04D 7/00* | (2006.01) |

(52) U.S. Cl.
CPC ........... *G04B 19/02* (2013.01); *G04B 27/007* (2013.01); *G04C 1/00* (2013.01); *G04C 11/007* (2013.01); *G04C 13/023* (2013.01); *G04C 13/03* (2013.01); *G04D 7/009* (2013.01)

(58) Field of Classification Search
CPC ........ G04B 27/007; G04B 19/02; G04C 1/00; G04C 13/03; G04C 13/023; G04C 11/007; G04D 7/009
See application file for complete search history.

(56) References Cited

PUBLICATIONS

Excerpt from George Daniels The Art of Breguetâ, published 1975 (Sotheby Parke Bernet) (Year: 1975) (Year: 1975).*

(Continued)

*Primary Examiner* — Renee S Luebke
*Assistant Examiner* — Sean R Brannon
(74) *Attorney, Agent, or Firm* — Sughrue Mion, PLLC

(57) ABSTRACT

A method for reference time setting of the displays of a sympathetic watch by a sympathetic clock forming a sympathetic assembly with the watch. At any time, the reference time setting of the watch is performed by a first phase during which the placement in the reference position is triggered, by a first displacement of an interface between the clock and the watch, the reference time setting of the displays, and the coupling mechanism is uncoupled to allow the rack to drive the display gear train of the watch in the counter-clockwise direction, over as many revolutions as necessary, until the pawl meets the ratchet tooth opening of the hour cam, then the time-setting mechanism controlled by the clock sets the time of the displays of the watch in the clockwise direction to the exact time by recoiling the rack, then the coupling mechanism is recoupled.

23 Claims, 19 Drawing Sheets

(56) References Cited

PUBLICATIONS

Anonymous, "Fonctionnement d'une Pendule sympathique??", FAM Forum A Montres, Aug. 24, 2011, URL:http://forumamontres.forumactif.com/t109579-fonctionnement-d-une-pendule-sympathique, [retrieved on Apr. 12, 2021], XP055794313, 10 pages.
Anonyme, "Pendule sympathique", Wikipedia, L'encyclopedie libre, Apr. 11, 2019, https://fr.wikipedia.org/w/index.php?title=Pendule_sympathique&oldid=158356924, [retrieved on Apr. 6, 2021], XP002802613, 1 page.
International Search Report for PCT/EP2020/071502, dated Apr. 29, 2021.

* cited by examiner

SYMPATHETIC TIMEPIECE ASSEMBLY

CROSS REFERENCE TO RELATED APPLICATIONS

This application is a National Stage of International Application No. PCT/EP2020/071502 filed Jul. 30, 2020.

FIELD OF THE INVENTION

The invention relates to a sympathetic timepiece assembly, which includes the clock and at least one watch arranged to be deposited in a receptacle included in the clock, in a single transfer position, said sympathetic assembly including a connection mechanism between said clock and each watch when said watch is deposited in said receptacle in said transfer position.

The invention relates to the very particular field of sympathetic clocks and watches, where these pair-paired timepieces each include a time base for counting time, and display means for displaying horological variables; in particular, these display means are arranged to allow the user to simultaneously view the display on the clock and the display on the watch.

BACKGROUND OF THE INVENTION

Since 1800, Abraham-Louis Breguet has designed sympathetic clocks allowing to wind, time set and adjust the watches dedicated thereto, with no other constraint than placing the watch on the clock.

These three functions (which is the maximum number of known functions), are performed simultaneously at a time defined by the construction of the clock, generally once or twice a day. This is the case, for example, with the Breguet clock N° 128 and the associated watch N° 5009 described in the book "The art of Breguet" by George Daniels. It is the moment when the time setting is triggered which conditions the precision of the time setting, which explains the fact that this function is only done once or twice a day for the clocks of the 1800s, and every two hours for the clocks of the 1990s. It should be noted that the watches do not have an hour correction in addition to the minute correction as mentioned in the analysis of George Daniels, which obliges the user to make a preliminary adjustment with a first rough time setting, of the order of plus or minus fifteen minutes, the clock performing the fine time setting during the passage.

To this day, these only types of functions have always been applied to the few existing sympathetic clocks.

Some sympathetic clocks permanently coil the barrel of the watch, of the automatic barrel type, and perform the time setting of the minute once or twice a day, at a fixed time. In this type of clock, the coiling of the barrel must be rapid to ensure the winding of the uncoiled watch within a reasonable time.

Some sympathetic clocks ensure the adjustment of the rate which is derived from the time setting of the watch.

Several disadvantages arise from the constructions of these sympathetic clocks:

- if the watch is placed continuously on the clock, it will be time-set periodically (every two hours, twelve hours or every twenty-four hours), which unnecessarily biases the time-setting mechanism;
- if the watch is placed continuously on the clock, and if the winding is constant and rapid, the automatic barrel required in this case undergoes significant wear;

- if the watch is stopped when the user places it on the clock, the time is not set, it is necessary to wait for the next passage to the set time, for an uncertain time setting;
- if the watch is stopped when the user places it on the clock, and the winding is expected to be periodic with the time setting, the winding will not take place before the next passage to the set time, and as a result, the watch does not work and the prior adjustment of the time to plus or minus fifteen minutes is lost;
- if the watch is stopped when the user places it on the clock, and the winding is expected to be constant at slow speed, or will not reach full coiling for several days
- if the watch is stopped when the user places it on the clock, and the winding is expected to be constant at high speed, or will not reach full coiling faster, but if the watch remains stored on the clock, this high speed will address the sliding flange function of the barrel and cause premature wear thereof;
- only the functions of time setting the minutes and the winding are guaranteed, other functions are difficult to be provided or added.

SUMMARY OF THE INVENTION

The invention proposes to improve the functionality of sympathetic clocks and watches, by overcoming the disadvantages of the known technique.

The purpose of the invention is to develop an assembly formed of a clock and at least one watch, which:

- ensures optimum winding of the watch at all times as soon as it is placed on the clock;
- provides time setting at the user's request, for example before taking the watch to wear it;
- allows to guarantee precise time setting, at the exact second for example;
- allows to guarantee full time setting, even if the watch is stopped;
- allows more information to be transmitted than just a single minute, for example: second, minute, hour, date, moon phase and/or age, day of week, week, month, year, leap year, or the like.

The clock is a true autonomous timepiece, including its own time base, and its own display of time and variables related to the complications it includes.

To this end, the invention relates to a sympathetic assembly according to claim 1.

BRIEF DESCRIPTION OF THE DRAWINGS

Other features and advantages of the invention will become apparent upon reading the detailed description which follows, with reference to the appended drawings, where:

FIG. 8 is similar to FIG. 1, and shows a clock whose movement is maintained by weights, and including a conventional front display; between two linear guide columns of the weights are visible two transfer shafts, each arranged to drive an actuator in the upper part of the clock, near the receptacle for receiving the watch; the leftmost transfer shaft in the figure is an output of a differential mechanism which calibrates a variable read on the clock, in this case for time setting the watch; in this figure it is seen that the hour display on the watch, which is stopped, is at 10h10, while the instantaneous display on the clock is at 10h08;

FIG. 9 is a detail of the upper part of FIG. 8, at the receptacle, of the two actuators of the clock, and of the watch; this figure superimposes different displays of the watch, and only shows the variation in the minute display: in broken lines, an initial display at 12h23 of the watch when it has been placed on the receptacle; a return arrow PESIAM, in the counter-clockwise direction, indicates the forced return of the hour and minute displays to a predetermined reference position, here to 12h00; small arrows PE or PESAM, of elementary steps in the clockwise direction, illustrate part of the two-minute steps successively imposed on the minute hand of the watch to approach the display of the clock; the watch indicates 10h10 it has therefore completed four elementary two-minute steps, and it is ready to immediately resume working upon order of the clock when the clock reaches 10h10;

FIG. 10 shows that the clock includes a snail cam, the detail of which is visible in FIG. 11, with 360 bearings and which is driven by its movement at the rate of one revolution in twelve hours, and through which a feeler-spindle travels, to read the instantaneous value thereof. This feeler-spindle includes a rack which cooperates with a gear train arranged to drive a second actuator; more particularly, this gear train is an input gear train of a differential mechanism, one output of which is the leftmost transfer shaft in the figure, and which is arranged to drive a second actuator via an intermediate wheel;

FIG. 12 illustrates, similarly to FIG. 10, a similar and less bulky embodiment, with two snail cams, one less than 12 bearings for reading the hours, and the other one greater than 30 bearings for reading two-minute steps; in the same way, each one is traversed by a feeler-spindle, the rack of which constitutes an input of the differential which corrects the difference in unit;

FIG. 13 shows, schematically and in plane, part of the mechanism of the sympathetic watch, which includes a hammer, similar to a chronograph hammer, which has a coiled position where it is held by a pawl and stretched by a spring, and an active position where it rests on the periphery of a first heart-shaped hour cam, so as to force it to rotate to its smallest radius; this first heart-shaped hour cam is similar to those used in chronograph mechanisms and is carried by the hour wheel; a second truncated heart-shaped minute cam is carried by the minute display; a jumper bearingly cooperates with a star integral with the minute display;

FIG. 14 is a detail of FIG. 13, showing the detail of the hour cam, which includes a substantially square notch, and of the minute cam, in the shape of a cardioid in its lower part;

FIG. 15 shows, schematically and in section passing through the axis of the hands, the mechanism of FIG. 13, including a coupling-clutch between the display gear train and the finishing gear train, including a friction spring, in the coupled position;

FIG. 16, similar to FIG. 15, shows the same mechanism in the uncoupled position;

FIG. 17 is a detail of FIGS. 13 and 14, showing the cooperation of a double jumper with the pinion of the cannon-pinion;

FIG. 18 illustrates, schematically and in plane, a BREGUET chronograph 1050 coupling mechanism, including a clamp whose function is to ensure coupling and uncoupling, under the control of a column wheel which controls the angular deviation of the clamp arms, for opening or closing the clamp, and therefore the uncoupling or coupling according to FIGS. 16 and 15;

FIG. 19 shows, schematically and in plane, a part of the mechanism of the sympathetic watch, which includes a pawl with a pawl spring, a rack meshed on an hour wheel, and clicking in the clockwise direction of the hour wheel, and driven by a return spring, a rack pinion (or hour pinion), a first hour cam carried by the hour wheel, and including an opening, and a second minute cam carried by a minute display mobile, and including a ratchet tooth opening or a notch, and a jumper arranged to cooperate with a star integral with the minute display mobile;

FIG. 20 shows, schematically and in section passing through the axis of the hands, the mechanism of FIG. 19, including a coupling-clutch between the display gear train and the finishing gear train, including a friction spring, in the coupled position;

FIG. 21, similar to FIG. 20, shows the same mechanism in the uncoupled position;

FIG. 22 shows, schematically and in plane, part of the mechanism of the sympathetic watch, which includes a corrector coinciding with the interface of the clock or another element allowing to transmit a reciprocating movement, a rocker lever capable of driving the cannon-pinion of a tooth in a reciprocating movement, a jumper maintaining the position of the minute display in the interval of the drive functions, and a star of 30 teeth carried by the minute display for two-minute steps;

FIG. 23 shows, schematically and in section passing through the axis of the hands, the mechanism of FIG. 22, including a coupling-clutch between the display gear train and the finishing gear train, including a friction spring, in the coupled position;

FIG. 24, similar to FIG. 23, shows the same mechanism in the uncoupled position;

FIG. 25 is a detail of FIG. 22, showing the cooperation of a double jumper with the pinion of the 15-teeth cannon-pinion, to obtain 30 stable positions thanks to the double jumper and the staging of two support surfaces offset from the rocker lever arm;

FIG. 29 shows the watch ready to be wound up and time set, as it appears in FIG. 28;

FIG. 30 shows a winding of the watch by the rotation of a winding sleeve, constituting the third actuator, driving the crown of the watch, which is wound up by the equivalent of thirteen hours of battery life, either at request by the user DMAH, or periodically every twelve hours at a fixed time;

FIG. 31 shows the stop of the watch by the action of a stop lever on the balance of the resonator; the clock controls, by the first actuator at four o'clock, this stopping of the resonator of the watch, the uncoupling of the hands from the gear train, and the return of the hands to a reference position, here selected at 12h00;

FIG. 32 shows the displacement of the hands of the watch by jumps each by the value of a pre-determined step, selected of three minutes in this example, until they are brought into the position of the instantaneous time displayed by the clock, here 10h12, plus a step of three minutes, therefore at the 10h15 position; it is the clock which transmits to the watch, after reading on the snail(s) of the clock, this instantaneous value of the time, by the required number of pulses to control the overall displacement of the hands;

Figure 3:
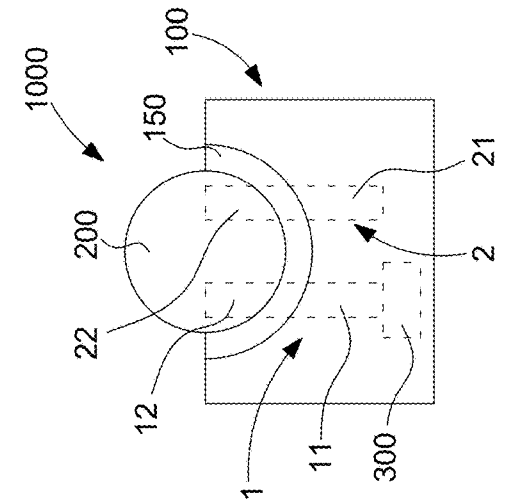
FIG. 3 is similar to FIG. 2 and illustrates a variant with two parallel shafts.
Figure 5:
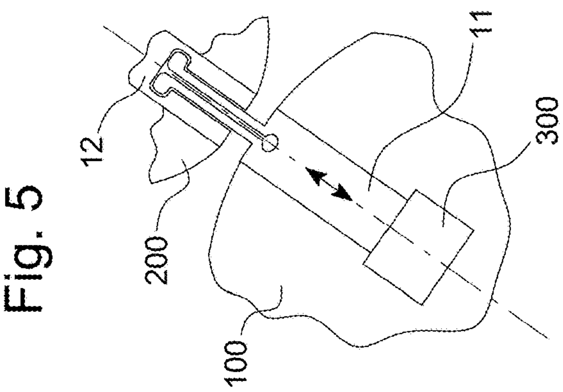
FIG. 5 is a detail showing a translational drive of the upper half-shaft by the lower half-shaft, by a spring finger cooperating with a groove.
Figure 2:
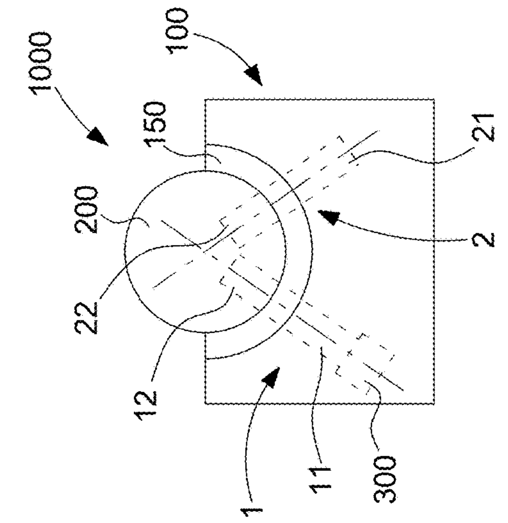
FIG. 2 shows, schematically, a detail with two such transmission lines coplanar in FIG. 1, each including a shaft consisting of a lower half-shaft housed in the clock, and an upper half-shaft housed in the watch, with a control means shown for driving one of the two shafts.
Figure 4:
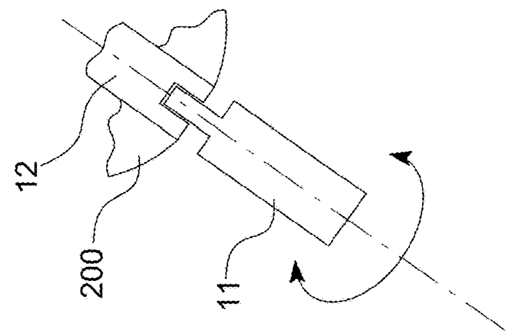
FIG. 4 is a detail showing a rotational drive of the upper half-shaft by the lower half-shaft, by a flat section cooperating with a slot.
Figure 1:
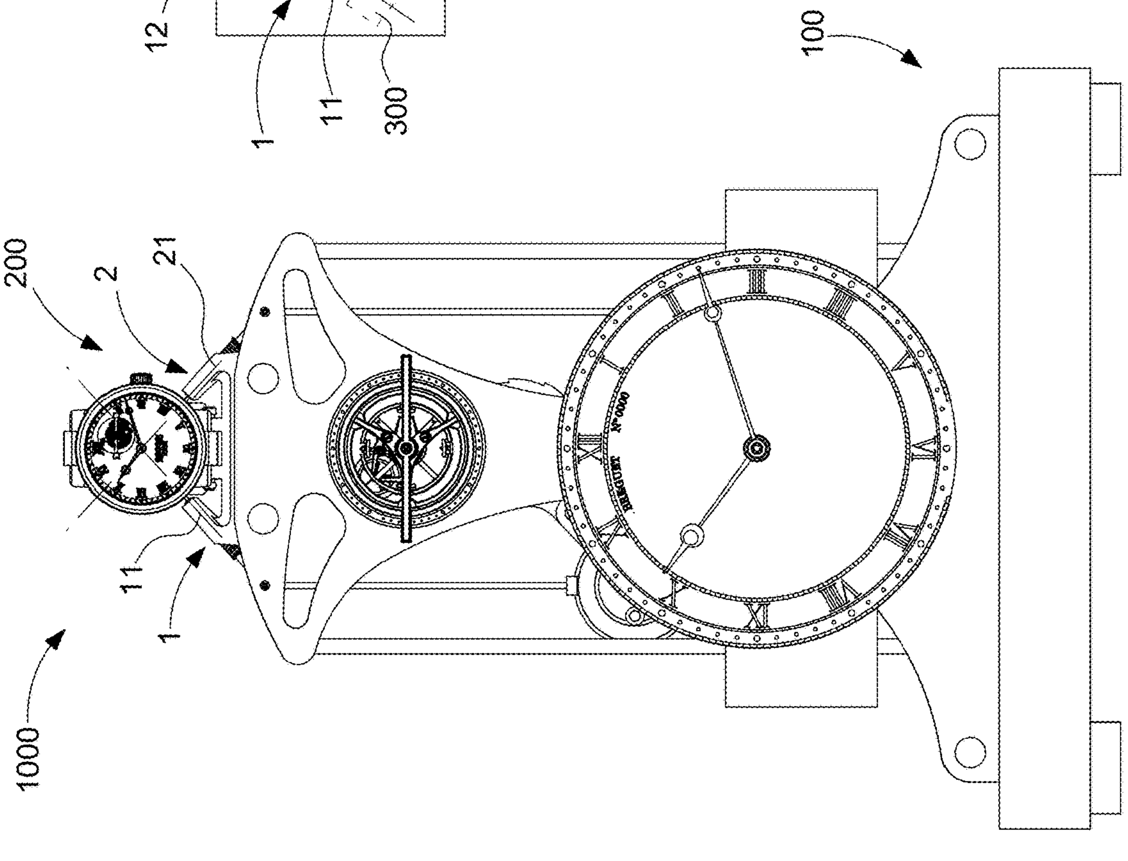
FIG. 1 shows, schematically, and in front view, a sympathetic timepiece assembly, which includes a sympathetic clock including a receptacle, and at least one sympathetic watch, which is deposited in this receptacle, the connections between the clock and the watch being made along two oblique transmission lines, each including an actuator in the clock, able to drive in translation and/or rotation to a receiver in the watch, this receiver then acting as an internal actuator to either define the nature of a function such as start/stop, time setting, or else winding, or to transmit an amount of power to a watch mechanism, for example according to a rotation to drive the timer for a time setting, or by translations in particular in a reciprocating movement to coil a barrel or a particular mechanism.
Figure 7:
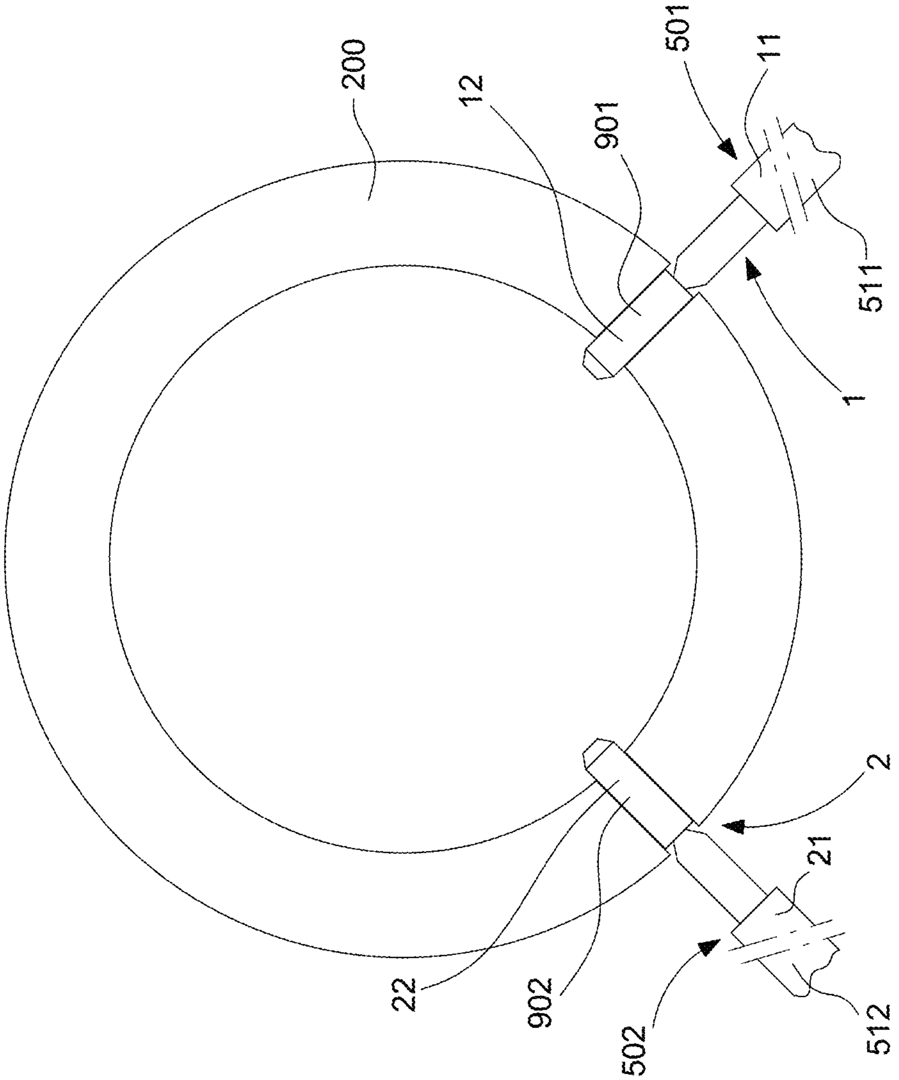
FIG. 7 shows, schematically and in plane, a detail of a particular embodiment of a first actuator and a second push-type actuator.
Figure 6:
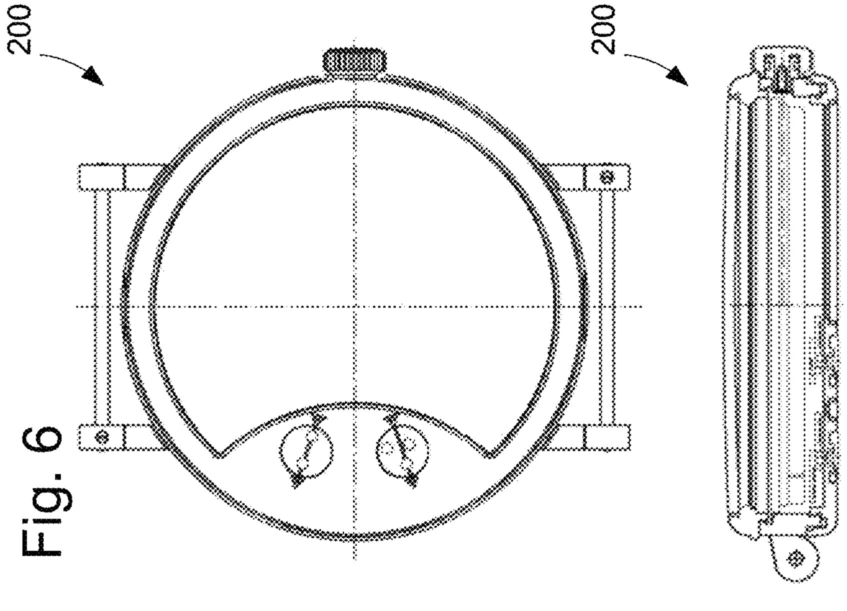
FIG. 6 includes a bottom view and a side view of a sympathetic watch with two upper half-shafts according to FIG. 3.
Figure 9:
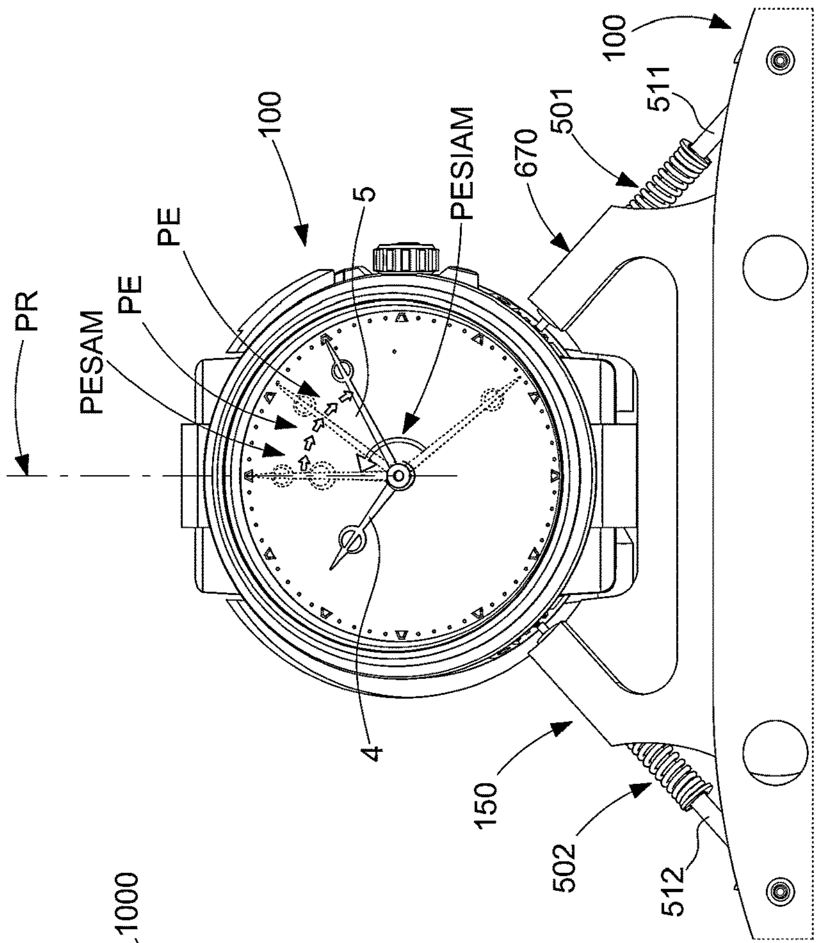
FIGS. 8 to 12 illustrate the data acquisition on the clock for setting the time upon request, described below as a sixth variant.
Figure 8:
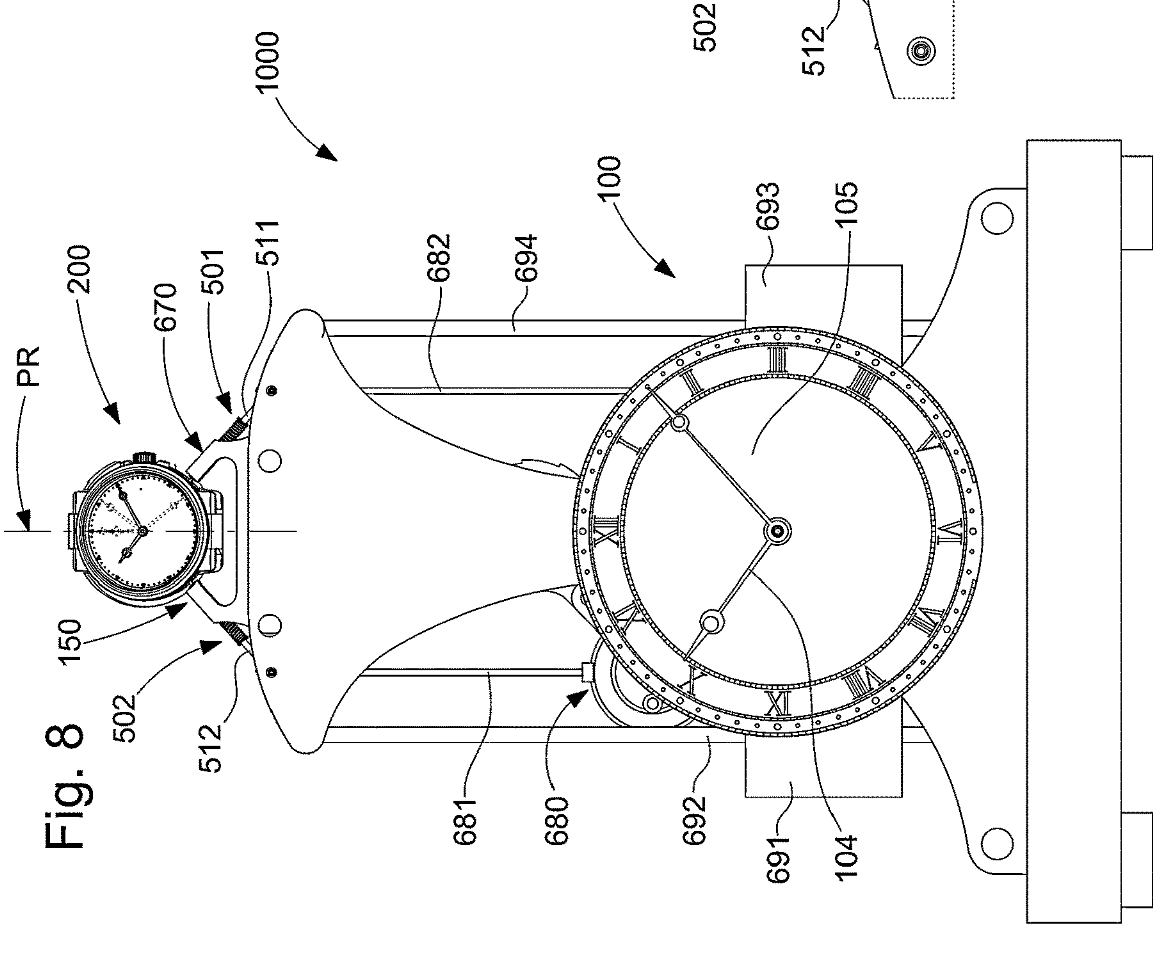
Figure 11:
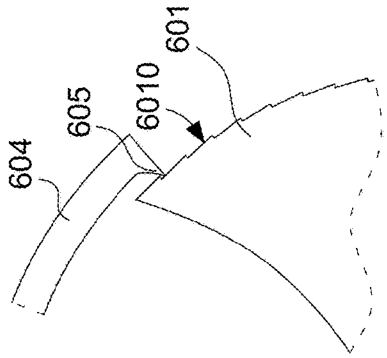
Figure 12:
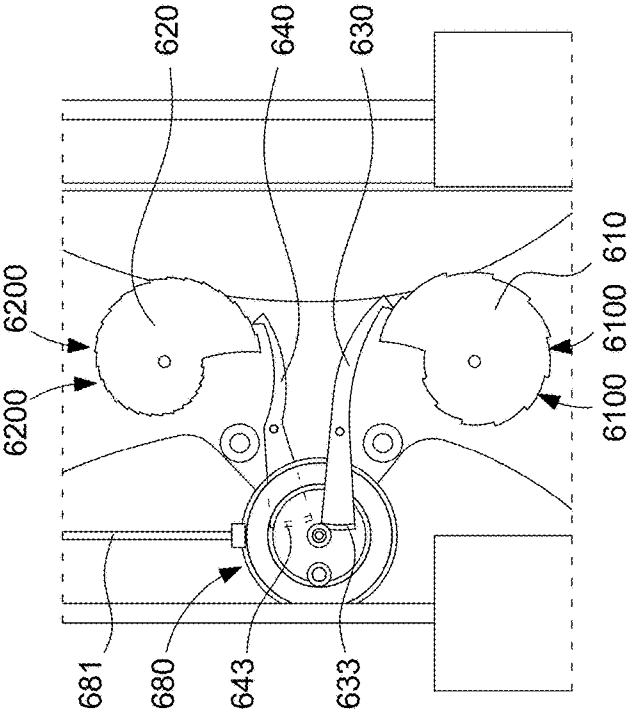
Figure 10:
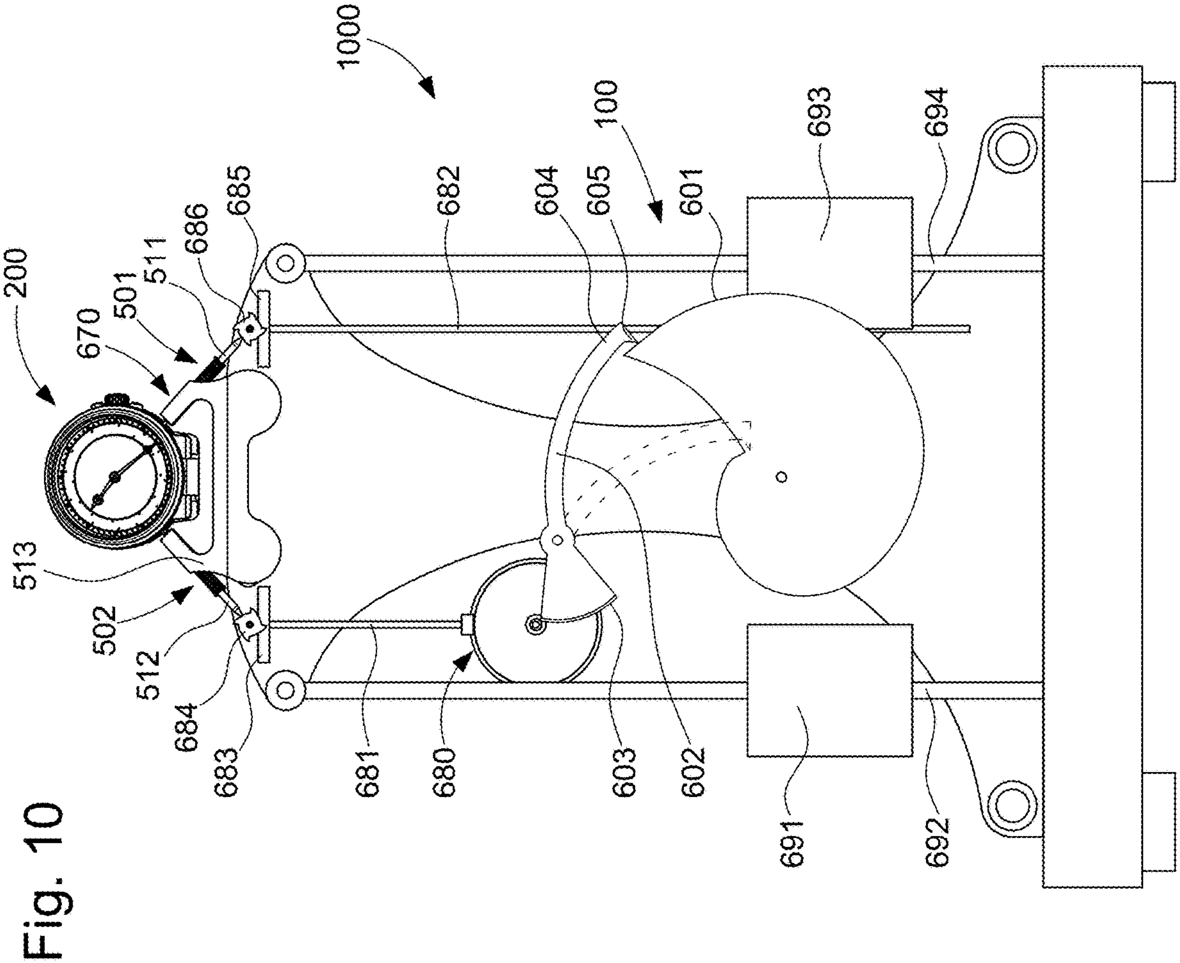
Figure 27:
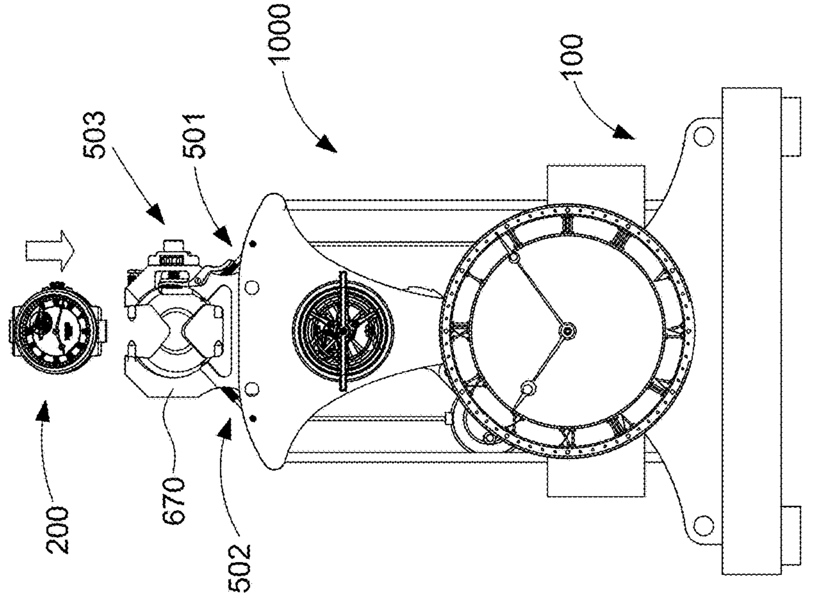
FIG. 27, similar to FIG. 1, shows the clock with its receptacle still empty, at 10h09, and the watch displaying 8h17 the clock here includes three actuators, a first actuator substantially at four o'clock of the watch, a second actuator substantially at eight o'clock of the watch, and a third actuator arranged to cooperate with the crown of the watch at three o'clock, all disposed in a star around the receptacle here constituted by a stretcher with a pivotally movable part.
Figure 28:
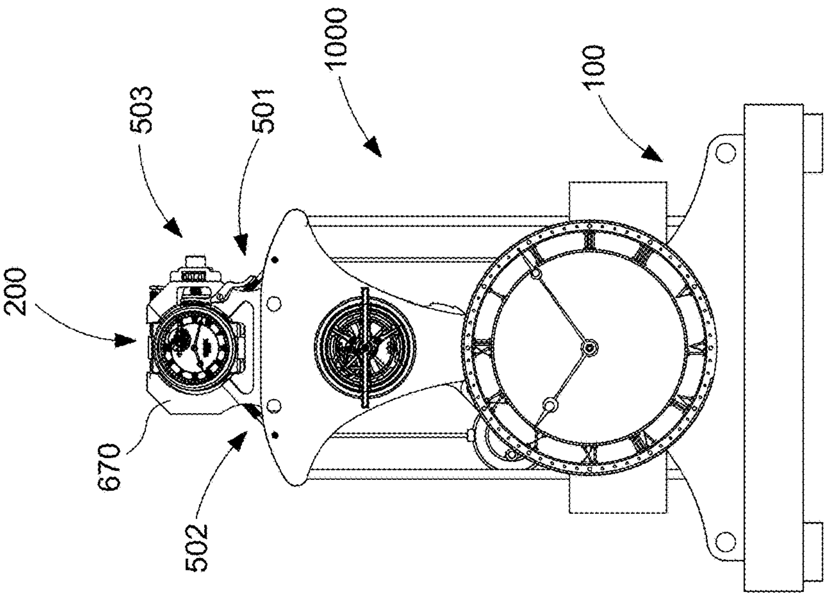
FIG. 28, similar to FIG. 27, shows the watch inserted into its receptacle.
Figure 29:
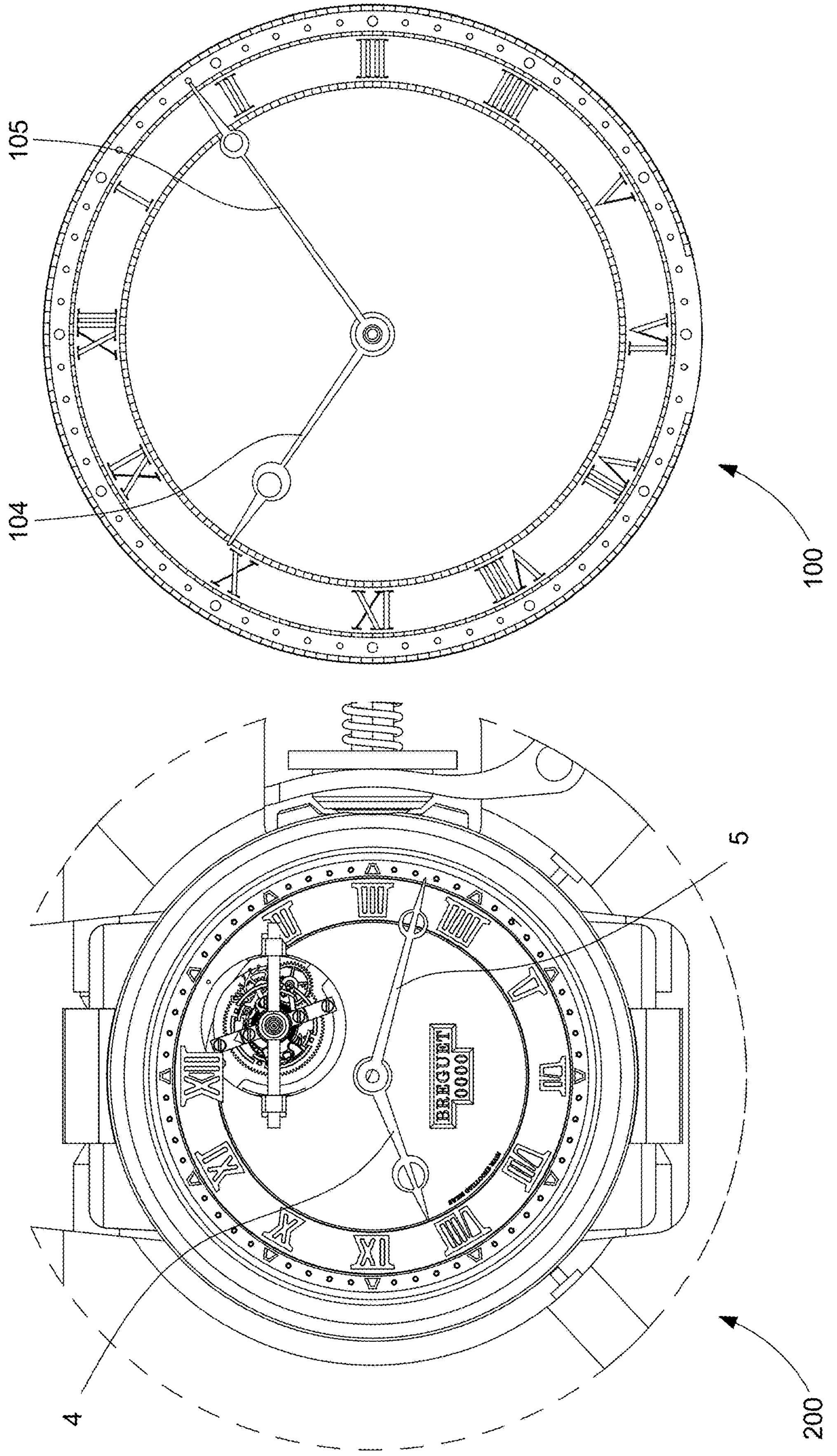
FIGS. 29 to 33 illustrate the main time setting and winding steps, and each include the visualisation, at the same time, of the display of the watch in the left part, and of the display of the clock in the right part.
Figure 30:
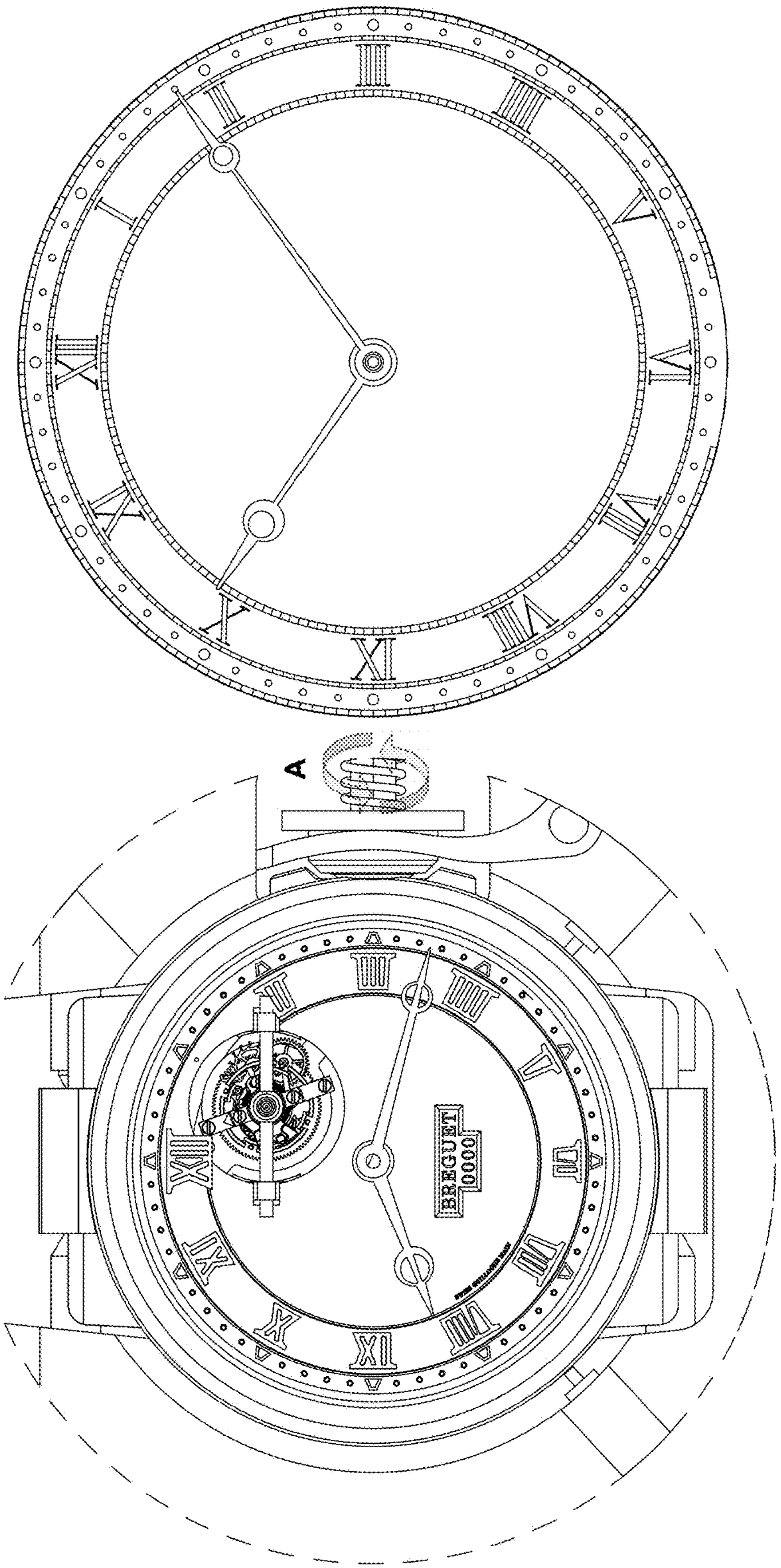
Figure 31:
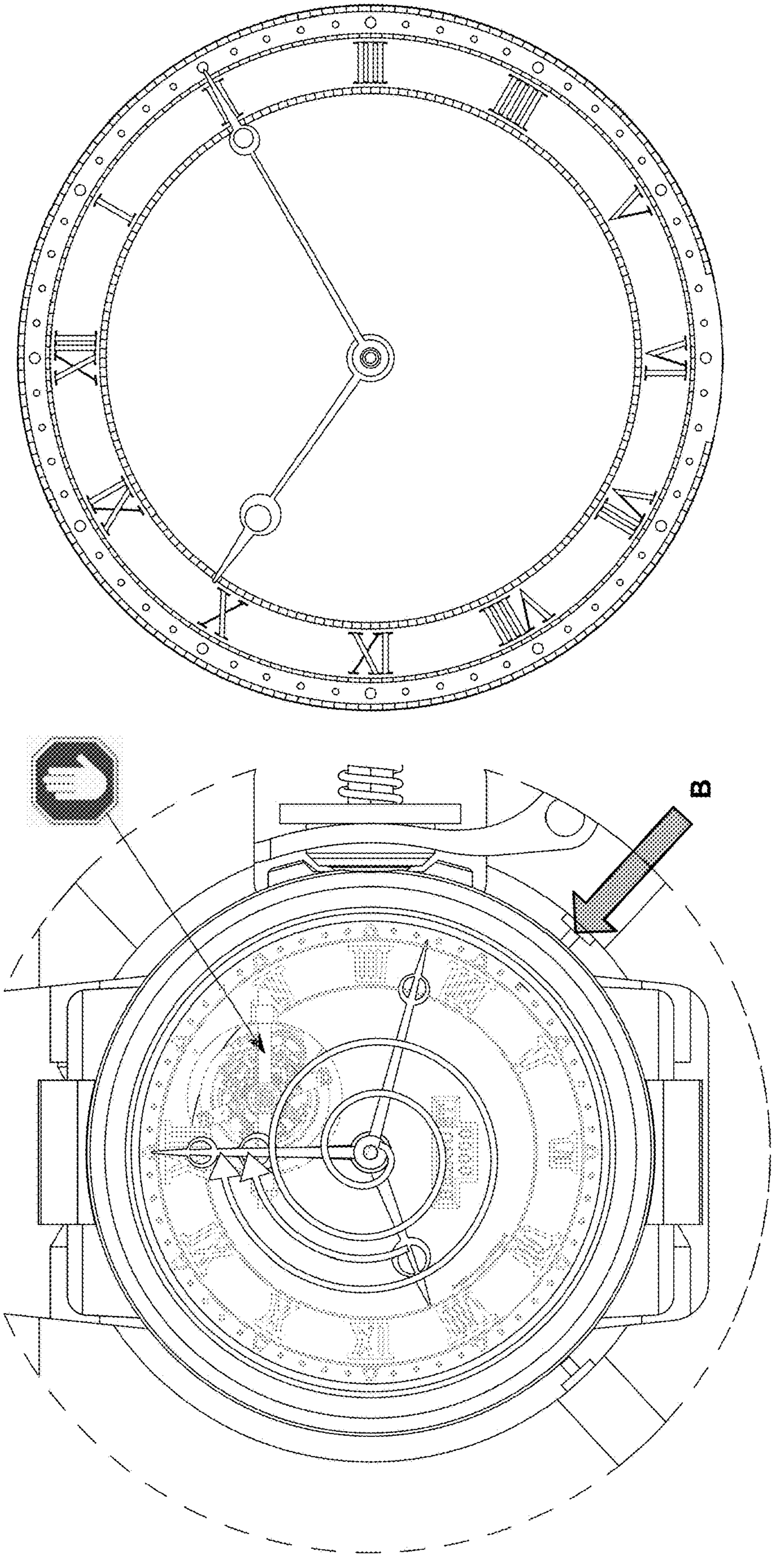
Figure 32:
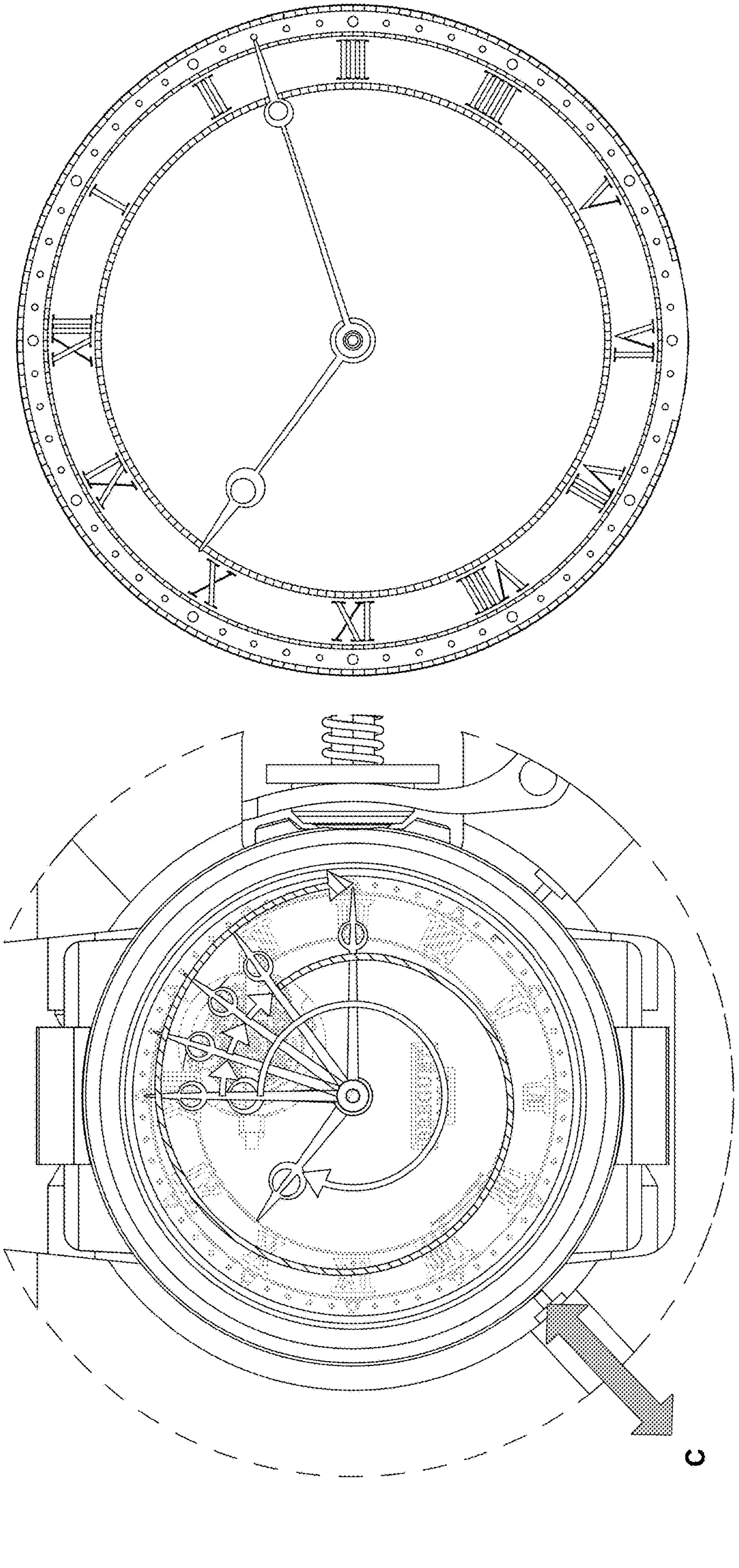
Figure 33:
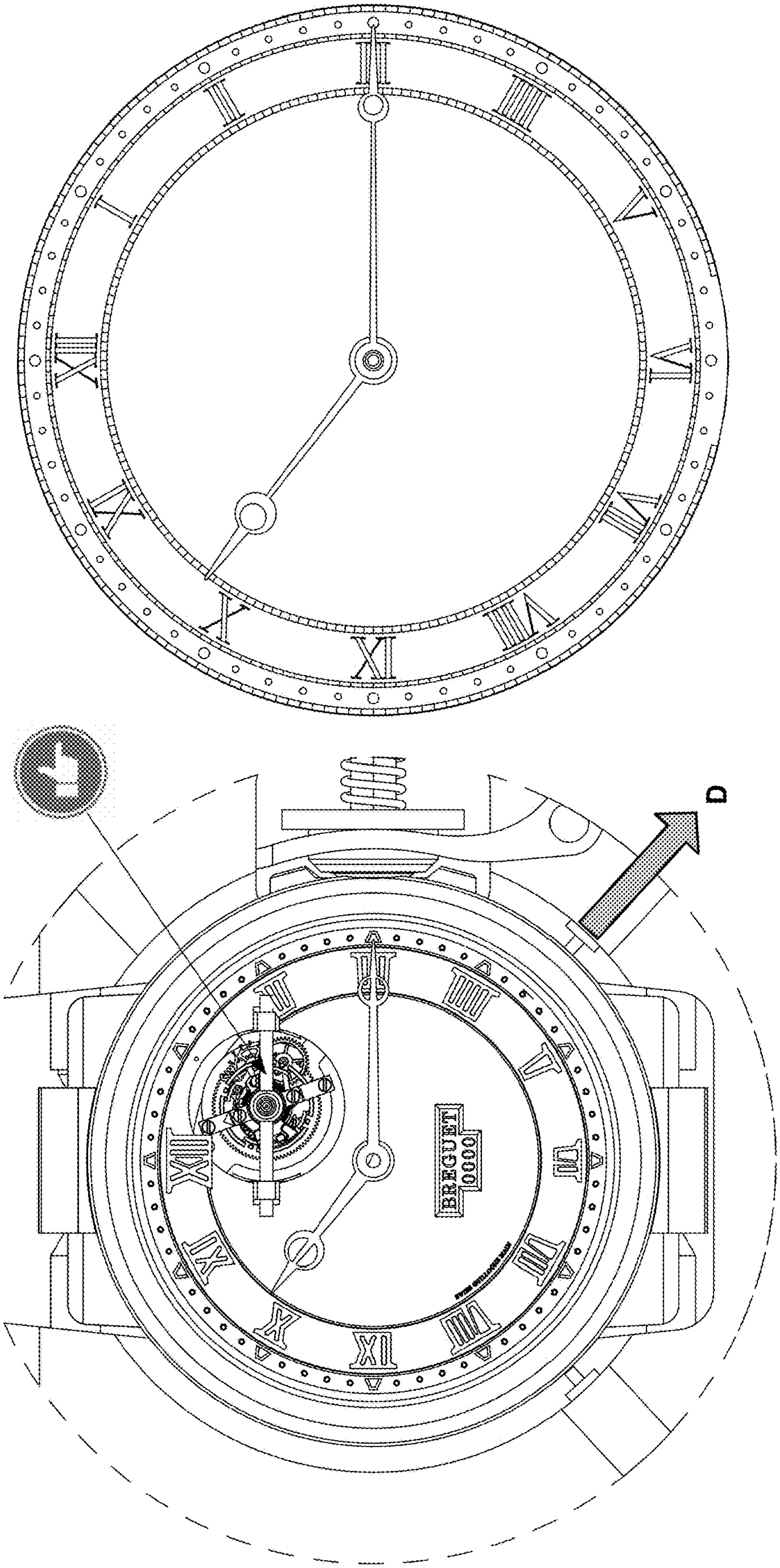
Figure 34:
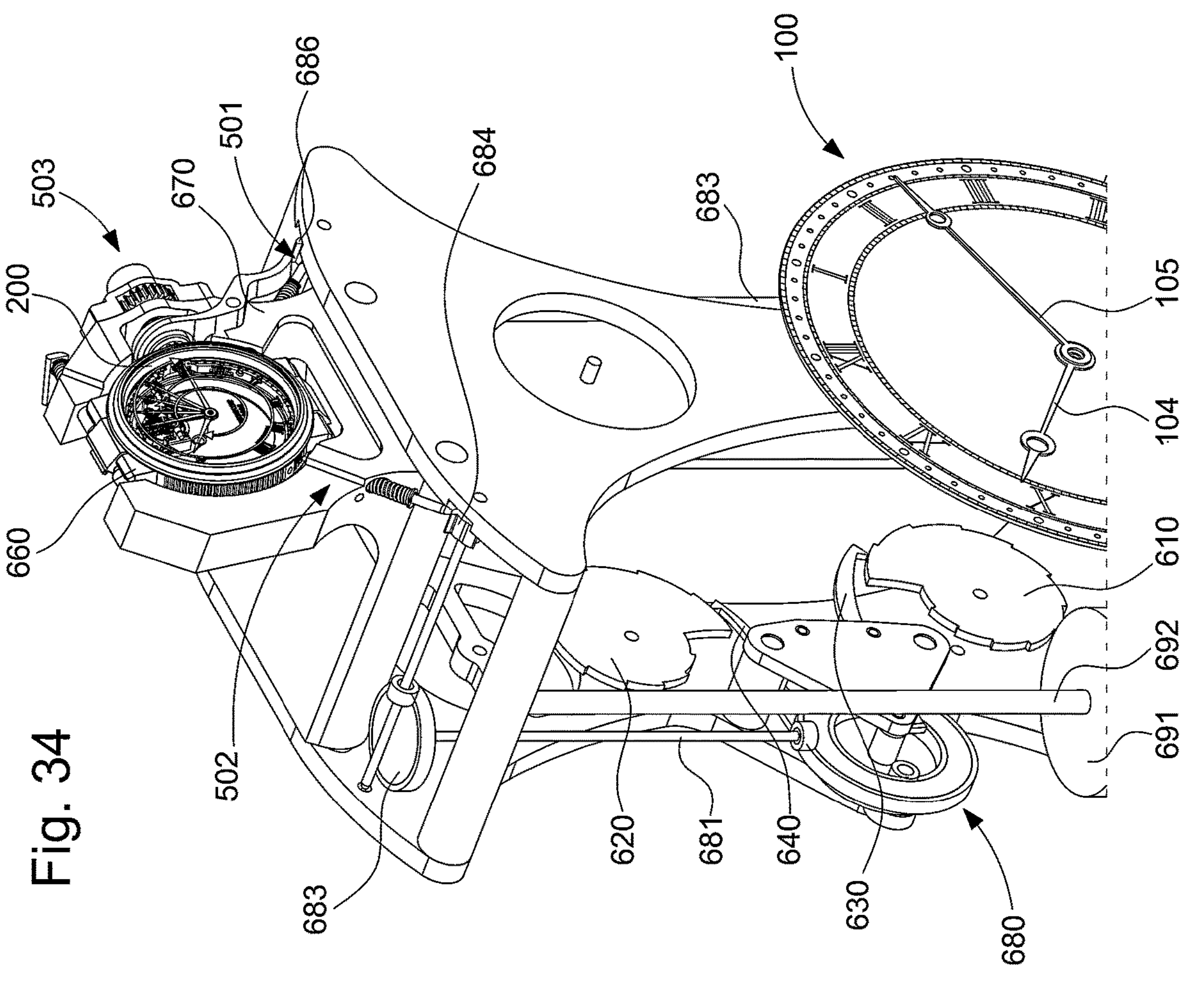
Figure 36:
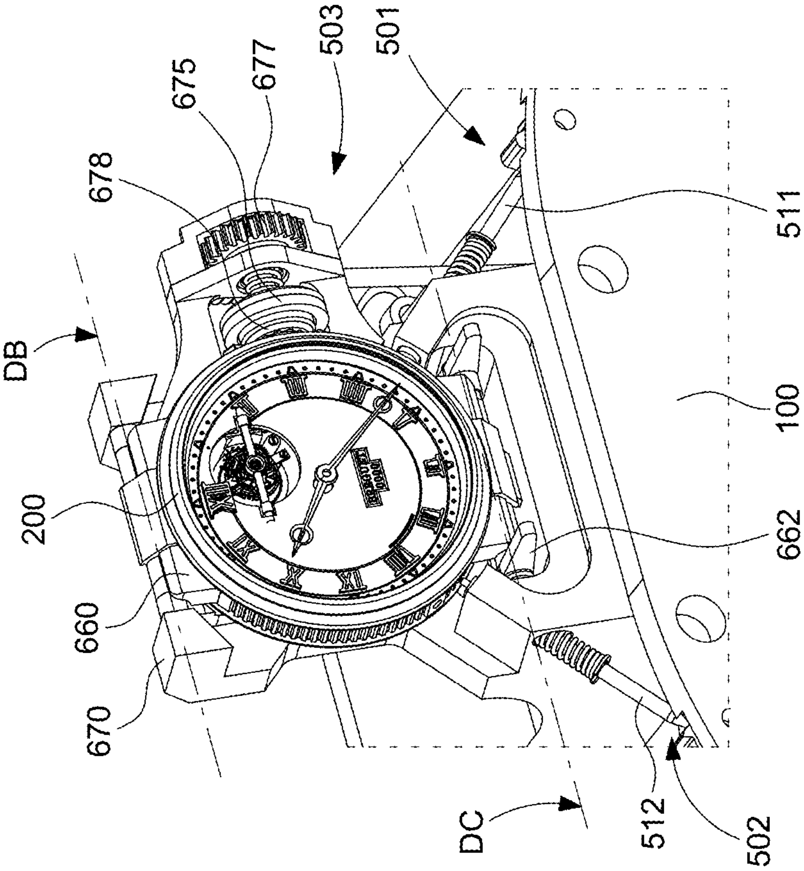
Figure 35:
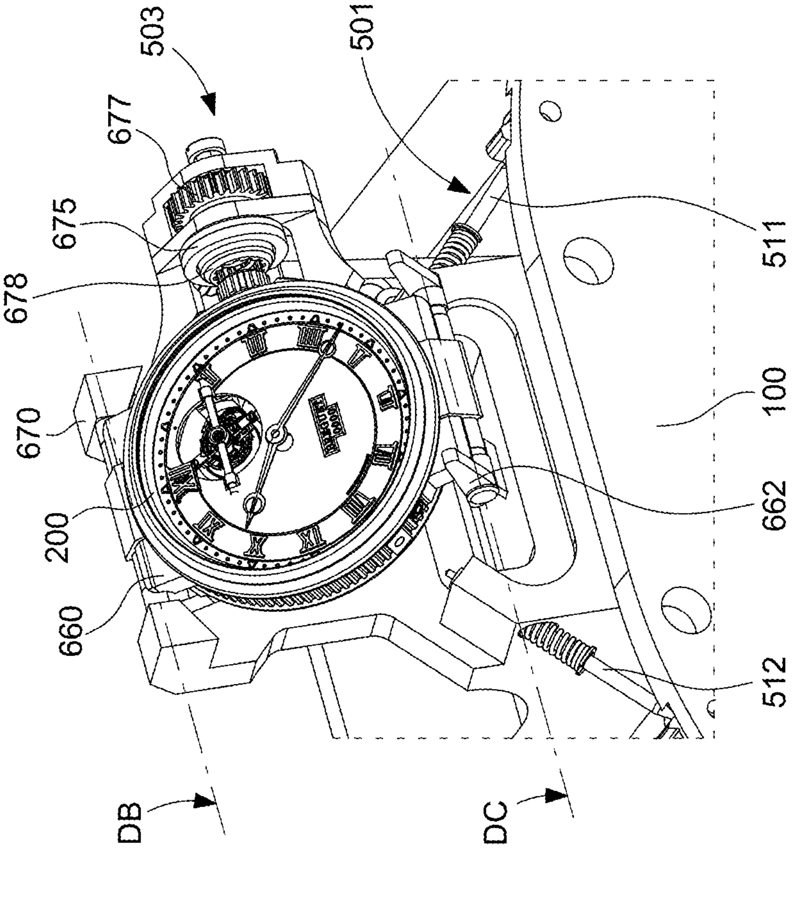
Figure 37:
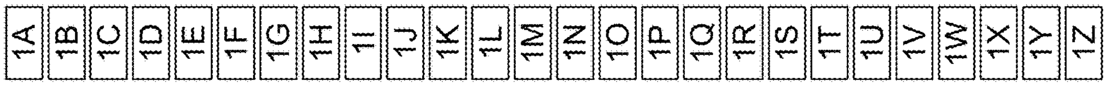
Figure 38:
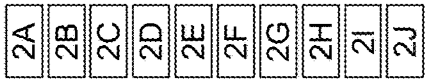
Figure 39:
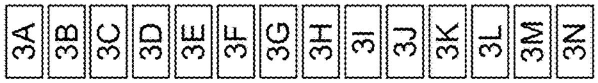
Figure 40:
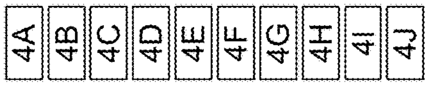
Figure 41:
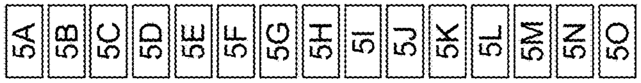
Figure 42:
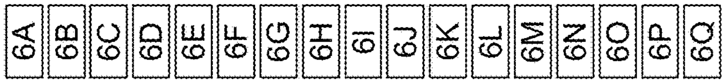
Figure 43:
Figure 44:
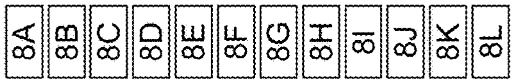
Figure 45:
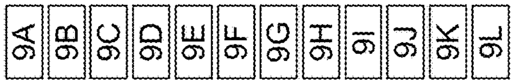

the watch is then ready to be restarted, and only waits for the release of its stop lever, which will be controlled by the clock;

FIG. 33 shows the start of the watch by releasing the stop lever, when the clock passes through the 10h15 position, the watch is then time set with the best precision, and is ready to be worn by the user;

FIG. 34 is a perspective view of the sympathetic assembly of FIGS. 27 and 28, with the clock according to the embodiment of FIG. 12;

FIGS. 35 and 36 show, schematically and in perspective, the cooperation of three actuators of the clock with a watch deposited on a pivoting stretcher forming a receptacle: a first push-type actuator at four o'clock, a second push-type actuator at eight o'clock, and a third rotary actuator at three o'clock for driving the watch crown;

FIGS. 37 to 45 are flowcharts including the elementary operations of the methods according to nine variants described below, respectively from the first variant to the ninth variant.

DETAILED DESCRIPTION OF THE PREFERRED EMBODIMENTS

The invention relates to a sympathetic timepiece assembly 1000, which includes a sympathetic clock 100, which includes a clock hour display 104, and a clock minute display 105, and at least one sympathetic watch 200, which includes a watch hour display 4, and a watch minute display 5, and which is arranged to be disposed in a receptacle 150 included in the clock, in particular at a stretcher 670, in a single transfer position, this sympathetic assembly 1000 includes at least one connection mechanism between this clock 100 and each watch 200 when this watch 200 is deposited in the receptacle 150 in the transfer position.

According to the invention, this at least one connection mechanism includes at least two distinct transmission lines, one for selecting a function to be performed or a display variable to be adjusted, and the other for transferring power or movement, or/and transmit a pulse.

More particularly, at least one transmission line, and more particularly each transmission line, includes a shaft. More particularly, this shaft is at least rotary.

More particularly and in a non-limiting manner, at least one of these shafts, or each of these shafts, is similar to that of the Breguet clock N° 128 (G. Daniels: The Art of Breguet: page 277).

At least one such shaft, and more particularly each shaft, is divided into two half-shafts between the clock 100 and the concerned watch 200, these two half-shafts being arranged to drivingly cooperate with each other when the watch 200 is placed on the clock 100 in the receptacle 150 in the transfer position, either in direct drive, and more particularly in coaxial drive, or through an intermediate wheel or a gear train. The transmission between these half-shafts is not described in detail here, it is possible to use any suitable drive mechanism, toothing, spline, coupling sleeve, friction, or the like. The half-shafts can cooperate end to end, or internally to each other, or tangentially to each other, or through an intermediate wheel or a gear train, or the like.

These at least two transmission lines distribute the different functions.

The invention is more particularly described with two transmission lines, in the shape of at least two shafts: a first selection shaft 1 and at least a second drive shaft 2. Of course, some of the functions described below can be fragmented, and handled by other additional shafts.

The first selection shaft 1 transmits a function selection, one of the functions being a neutral/winding function for power recharging a watch 200. This transmission is in particular of the function alternation type: neutral-winding, date, hours, minutes, or the like, spread over 360°. The first selection shaft 1 is comparable to a selector, a machine controller, or to a column wheel for a chronograph or a complication watch.

The second drive shaft 2 ensures the transmission of force, in particular of torque, for power recharging, in particular the winding of a barrel, of a watch 200 from the clock 100, and/or to ensure transmission to a watch 200 of an adjustment or setting value, in the form of an angle of rotation on the basis of a value given by the clock 100, and/or to impart a pulse to an organ of the watch. The adjustment or setting value may correspond to one of the sizes displayed by the watch; it can also be an adjustment value of the resonator of the watch, by action on an index, a balance-spring stud, pressing on a flexible blade, adjusting the inertia, or the like.

The first shaft 1 and the second shaft 2 are distinct from each other, they can, in a variant, extend along parallel axes, or else coincide.

In a particular variant, their axes are coplanar.

In another particular variant, their axes intersect.

The invention allows to set the adjustment, in particular the time setting, of a watch 200 by at least two separate shafts 1 and 2, the first of which indicates the desired type of correction, and the others the correction values, at least one shaft among the latter being devoted to the power recharging function of the watch, in particular a recoiling of the barrel.

The first shaft 1 and/or the second shaft 2 can be movable in different ways, in translation and/or in rotation.

In a variant, the first shaft 1 and the second shaft 2 are movable in rotation.

In a variant, the first shaft 1 and the second shaft 2 are movable in translation.

In a variant, one of the first shaft 1 and the second shaft 2 is movable in rotation, and the other is movable in translation.

In a variant, one of the first shaft 1 and the second shaft 2 is movable in rotation and translation, and the other is movable in translation.

In a variant, one of the first shaft 1 and the second shaft 2 is movable in rotation and translation, and the other is movable in rotation.

In a variant, the first shaft 1 and the second shaft 2 are movable in rotation and translation.

Advantageously, the setting is sequential, and starts from a neutral position wherein the power recharging takes place, this neutral position is followed, preferably after a certain predefined duration, or else upon action of the user, by at least one elementary sequence for adjusting one of the variables displayed by the watch, or else by triggering a particular function.

In particular, the settings of the watch adjustments are made sequentially, with each variable being adjusted independently of the others.

More particularly, this sequential time-setting is carried out by a dedicated mechanism, in parallel with the conventional mechanism for time-setting the watch.

More particularly, the sequential time setting is controlled by the clock. In particular, in a particular variant, the duration between two elementary sequences is adjustable. More particularly still, each duration between two elementary sequences is adjustable.

Advantageously, the timing defining the tempo of the elementary sequences, managed by the clock, defines the triggering instant (or the signal) for the start of the watch previously maintained stopped by a stop mechanism including in particular but in a non-limiting manner a stop-second mechanism 25 with a stop lever or the like. The exemplary embodiments described below include, in a non-limiting manner, a stop lever arranged to cooperate with an inertial mass 15, in particular a balance, of a resonator 10, for its blocking or its release.

More particularly, the adjustment setting or the sequential time setting corrects, in a non-limiting manner, all or part of the following indications: hour, minute, date, day, month, and/or any other indications.

The neutral position allows power recharging or winding of the watch, and this winding is controlled by the watch.

This first shaft 1 and this second shaft 2 allow collaboration between the clock 100 and a watch 200 in the manner described below.

The first shaft 1 includes a first lower half-shaft 11 of the clock 100 and a first upper half-shaft 12 of the watch 200.

When the watch 200 is absent, that is to say not placed on the clock 100, and when the clock 100 does not carry any watch 200, these two half-shafts intended to constitute together the first shaft 1, that is to say the first lower half-shaft 11 and the first upper half-shaft 12 are each in the neutral position.

Similarly, the second shaft 2 includes a second lower half-shaft 21 of the clock 100 and a second upper half-shaft 22 of the watch 200.

When the watch 200 is placed on the clock 100, the first lower half-shaft 11 and the first upper half-shaft 12 on the one hand, and the second lower half-shaft 21 and the second upper half-shaft 22 on the other hand, are matched. As the first lower half-shaft 11 and the first upper half-shaft 12 are in the neutral position, the selected function is neutral/winding, placing the watch is facilitated by indexing each half-shaft in the neutral position independently, which half-shafts are naturally indexed.

The clock 100 is arranged to deliver a torque to the first shaft 1 in the presence of the watch 200. The rotation of this first shaft 1 is regulated by a regulating mechanism, for example of the minute repeater regulator type.

Each watch 200 is arranged to release or block the rotation of the second shaft 2 depending on the level of power that it has stored, in particular according to the coiling of the barrel in a particular case, according to a defined hysteresis, for example by a power reserve mechanism. This rotation of the second shaft 2 is, in this particular case, transmitted to the winding of the barrel and ensures its coiling. In this neutral position, the watch 200 therefore ensures its coiling at all times within a defined range.

The clock 100 includes at least one control means 300, which is arranged to be operated by the user, or to be controlled by the time base of the clock, to rotate the first lower half-shaft 11, to select the function of the first shaft 1.

When the watch 200 is placed on the clock 100 and the user requests the time setting, by such a control means 300, such as a lever, in particular present on the clock 100, the setting of the adjustment or the time setting of the watch 200 is performed by a sequence of functions which are controlled by the clock 100. For example, for an adjustment to the instantaneous value of the date, hour, minute and second values. Following the request of the user, the sequence of adjustment to the current value begins, for example for a sequence of time setting. Each sequence starts at a precise tempo, which is defined by the time base of the clock 100.

Of course, it is also possible to install a control means 300 on the watch 200, instead of installing it on the clock 100, or else to equip both the clock 100 and the watch 200, each with a control means 300. If the control means 300 is only on the watch, this allows to lock the function, as long as the watch 200 is not in the transfer position in the receptacle 150.

In the particular case where the sympathetic assembly 1000 is arranged for the successive adjustment of the date, hour, minute and second values, several elementary sequences follow one another.

During the first elementary sequence, the clock 100 rotates the first shaft 1 to the date position, and rotates the second shaft 2 by an angle corresponding to the instantaneous value of the date. The watch 200 recognises the rotation of the first shaft 1 to the date position, actuates the stop lever, which stops the resonator and the watch, positions the date, hour, minute and second displays in the zero position, and applies the value transmitted by the second shaft 2 to the date display.

The term "display" here means any movable display element known in horology: hand, ring, disc, cursor, flag, city or time zone display, moon phase display, leap year display, AM/PM display, day/night display, power reserve indicator, striking selector, alarm indicator, calendar display, or the like.

After a first predetermined duration D1, for example 2 minutes, the clock 100 triggers the second elementary sequence. During this second elementary sequence, the clock 100 rotates the first shaft 1 to the hour position, and rotates the second shaft 2 by an angle corresponding to the instantaneous value of the time. The watch 200 recognises the rotation of the first shaft 1 to the hour position, and applies the value transmitted by the second shaft 2 to the hour display 4 of the watch 200.

After a second predetermined duration D2, for example two minutes, the clock 100 triggers the third elementary sequence. During this third elementary sequence, the clock 100 rotates the first shaft 1 to the minute position, and rotates the second shaft 2 by an angle corresponding to the instantaneous minute value, added to the value of a third predetermined duration D3, which separates the third elementary sequence from the next change of elementary sequence, which will be the last setting before the release of the running of the watch 200. The watch 200 recognises the rotation of the first shaft 1 to the minute position, and applies the value transmitted by the second shaft 2 on the minute display 5 of the watch.

After the third predetermined duration D3, for example two minutes, the clock 100 returns the first shaft 1 to the neutral/winding position. The watch 200 recognises the rotation of the first shaft 1 to neutral/winding position, and releases the stop lever, the watch 200 is then adjusted and completely time set, and starts exactly at the second.

The playful and useful side of this construction is noted: in this example, in 6 or 8 minutes (if the first sequence starts after a transient duration DO of two minutes), the watch 200, presented on the clock in an uncoiled state, stopped and not time set, is wound up and completely time set, date included. A particular option consists in adding a perpetual calendar to the clock 100, which then allows to correct the simple date of the watch 200 at the request of the user at the control means 300.

More particularly, the clock 100 is a mechanical movement clock.

In a variant, the clock 100 receives a signal from a time base, for example a controlled radio signal, GPS, a signal from an electronic clock, or the like, and includes means for transforming the signal indicating the instantaneous time into movements of mechanical components, for the transmission of information to a watch 200.

In a variant, all the power and movement transfers between the clock 100 and the watch 200 are mechanical and/or magnetic.

In a variant, all the power and movement transfers between the clock 100 and the watch 200 are mechanical.

In a variant, all the power and movement transfers between the clock 100 and the watch 200 are magnetic.

In a variant, no power and/or movement transfer is performed through the winding and time-setting rod of the watch.

More particularly, each half-shaft 12, 22 included in the watch 200 is separate from the winding and time-setting rod of the watch 200 when it includes one.

In a variant, no power transfer is performed through the winding and time-setting rod of the watch.

In a variant, no movement transfer is performed through the winding and time-setting rod of the watch.

The winding system does not require a sliding flange barrel and prevents wear thereof. The winding is done in a few minutes and at any time when the watch 200 is placed on the clock 100 and when necessary.

Since the adjustment settings, and in particular the time setting, are made upon request, the wear of the mechanisms is limited when the watch 200 is stored on the clock 100 for long periods. For these cases, a time setting can be triggered at regular intervals, for example once a week, by a control imparted by the time base of the clock 100.

This invention allows to produce a sympathetic clock adapted to the needs of current users, with useful and playful use as described above. This allows a real evolution of a product known for two hundred years.

The rate of the clock 100, more stable and more precise than that of the watch 200, keeps it on time when it is not worn, and corrects it at request.

The great battery life of the clock 100 is provided to the watch 200: when it is not worn, and allows for example a weekend wear and week maintenance at an ideal operating range.

Different variants of the sympathetic timepiece assembly 1000 according to the invention, and different variants of use, are described below.

Such a sympathetic assembly 1000 includes a sympathetic clock 100 and at least one sympathetic watch 200, which is arranged to be deposited in a receptacle 150 of the clock 100, in a single transfer position. The sympathetic assembly 1000 includes a connection mechanism including at least two separate transmission lines between the clock 100 and each watch 200 when the watch 200 is deposited in the receptacle 150 in the transfer position.

The sympathetic clock 100, which is arranged for power recharging and adjusting the display and/or rate of at least one sympathetic watch 200, includes at least one actuator for carrying out the power recharging and/or the display and/or rate adjustment of at least one sympathetic watch 200 deposited in the receptacle 150 in the transfer position.

And the clock 100 includes at least one first actuator of the all-or-nothing clock 501, movable between a rest position and an activated position, to control the activation or deactivation of a mechanism included in the watch 200. And the clock 100 includes at least one other actuator of the clock 502; 503, which is arranged to impart a series of pulses or to transmit a mechanical torque to a receiver included in a watch 200.

More particularly, at least one first actuator of the clock 501 is also arranged to impart a series of pulses, between its rest position and its activated position, to a receiver included in a watch 200.

More particularly, at least one other actuator of the clock 502; 503, is an all-or-nothing actuator, which is movable between a rest position and an activated position, to control the activation or deactivation of a mechanism included in the watch 200.

More particularly, at least one other actuator of the clock 502; 503, is a second actuator 502, which is arranged to impart a series of pulses to a receiver included in a watch 200.

More particularly, at least one other actuator of the clock 502; 503 is a third actuator 503 arranged to transmit a mechanical torque to a receiver included in a watch 200.

More particularly, at least one such third actuator 503 can be uncoupled in a disengaged position at a distance from a watch 200 deposited in the receptacle 150 in the single transfer position, and can be coupled in an engaged position with an operating means 270 or with a control rod included in the watch 200.

More particularly, at least one such third actuator 503 includes a sleeve 678, which is arranged to cooperate, in the engaged position, with an operating means 270 or a control rod included in a watch 200.

More particularly, the clock 100 includes first power storage means 691,693, in particular weights, which are arranged to power supply at least one movement 180 or 900 included in the clock 100 and/or any mechanism specific to the clock 100.

More particularly, the clock 100 includes second power storage means, which are dedicated to the transfer of power to at least one watch 200 deposited in the receptacle 150. More particularly, these second power storage means are arranged to rotationally drive a transfer shaft 683 carrying a worm 684, or a pinion, to drive a pinion 677, or respectively a worm, for rotating the third actuator 503.

More particularly, the clock 100 is arranged to transfer power continuously to a watch 200.

More particularly, the clock 100 is arranged to transfer power step by step to a watch 200.

More particularly, the clock 100 includes at least one movement 180, which drives at least one snail cam 601, 610, 620, the angular position of which characterises the instantaneous value of a horological variable. And the clock 100 includes at least one feeler-spindle 602, 630, 640, which is arranged to bearingly cooperate with the periphery of a snail cam 601, 610, 620, in order to read the instantaneous value thereof. Each feeler-spindle 602, 630, 640 includes a rack 603, 633, 643, which is arranged to cooperate with a gear train arranged to drive a second actuator; more particularly, this gear train is an input gear train of a differential mechanism 680, one output of which is arranged to drive a second actuator 502.

More particularly, the clock 100 includes at least one electromechanical or electronic movement arranged to control the movement of an output mobile which is arranged to drive a second actuator 502.

More particularly, the second actuator 502 includes a cam 684 having a plurality of ramps arranged to push and pull a second control rod 512 included in this second actuator 502, which second control rod 512 is returned towards the second cam 684 by second elastic return means 513, so as to impart to the second control rod 512 a reciprocating movement for time setting a watch 200.

More particularly, the second actuator 502 includes a crank and a connecting-rod, which are arranged to push and pull a second control rod 512 included in this second actuator 502, so as to impart to the second control rod 512 a reciprocating movement for time setting a watch 200. In a variant, this second control rod 512 is returned by second elastic return means 513.

More particularly, the clock 100 includes a first transfer shaft 682 for driving a first actuator of the clock 501, arranged to push or pull a first rod 511 of this first actuator of the clock 501, to control the stop or the release of the resonator 10 of a watch 200, or of a tourbillon or karussel carrying this resonator. More particularly, this first transfer shaft 682 is arranged for driving a first control cam 686 included in this first actuator of the clock 501. This first control cam 686 includes, more particularly, a plurality of ramps.

More particularly, the clock 100 includes means for timing to a reference time, and triggering means when the time displayed by the clock 100 becomes equal to this reference time, to trigger a sequence of movements of the actuators 501, 502, 503, when the receptacle 150 is occupied by a watch 200 during the transfer position.

More particularly, the clock 100 includes means for controlling the recoil of the actuators 501, 502, 503, when the user removes a watch 200 from the receptacle 150 during the execution of a power recharging and/or display and/or rate adjustment cycle.

More particularly, the clock 100 includes means for periodically triggering power recharging cycles of a watch 200 deposited in the receptacle 150 according to a predetermined period, and includes means for limiting a power recharging cycle for a power reserve of a predetermined value, the power reserve being greater than the predetermined period.

More particularly, the clock 100 includes manual control means, which are arranged to be handled by a user to control the execution of a power recharging and/or display and/or rate adjustment cycle of a watch 200 deposited in the receptacle 150 in the transfer position.

More particularly, the clock 100 includes a stop control mechanism 120, which is arranged to transform a step-by-step time-setting control carried out by a user or by the clock 100, into a sequence, the first step of which is an action for controlling a mechanism 20 for stopping and/or uncoupling the displays included in a sympathetic watch 200.

More particularly, this stop control mechanism 120 is arranged to control a movement of a transmission line to identify a time-setting action, and to control the transfer of a pulse or a torque to a stop mechanism 20 included in the watch 200.

As regards the sympathetic watches 200, advantageous, non-limiting types are described below: a heart-piece and hammer version, a pawl and double cam version, and a pawl, rack and double cam version.

These watches have common features.

In both versions of the watch, the sympathetic watch 200 includes at least one power storage barrel, for power supplying at least one resonator 10 included in this watch 200. The watch 200 includes a display gear train and a finishing gear train.

To perform the time settings, it is necessary to use a coupling mechanism, or/and a resonator stop mechanism. To this end, for all the time-setting devices and methods presented in the present description, the watch 200 includes either a stop mechanism 20 which is arranged to stop the operation of the resonator 10, or else a coupling mechanism allowing to separate the display from the finishing gear train, or else both such a stop mechanism 20 and such a coupling mechanism.

The coupling-clutch indeed allows, when it is open, the rotation of the displays, in particular of the hands, independently of the finishing gear train, whether it is for a displacement of these displays to a predetermined reference time, or for a displacement towards the instantaneous exact time (step-by-step time setting, or relative time setting, or permanent time setting), or else to displace an offset (version with seconds signal), and, when it is closed, to drive the displays or hands.

The use of a stop mechanism 20 including a seconds stop mechanism 25, in particular with a stop lever, is necessary for some time-setting modes such as the permanent time setting. And it constitutes an advantage for step-by-step time-setting modes, where the stop mechanism 20 allows starting at the 0 second signal, or again for relative time-setting modes where the user can then see the inertial mass 15 of the resonator 10, in particular a balance, stopped during the time setting. In these two time-setting modes, the coupling alone can ensure the starting of the hands without the balance being stopped, the display of the second is then random: ±30 s.

The watch 200 conventionally includes at least one hour display 4 and one-minute display 5, and/or at least any other display 3.

The watch 200 includes at least one internal mechanism, which is able to be activated or deactivated by an all-or-nothing actuator of the clock 100, and it includes at least one receiver able to receive a series of pulses or a mechanical torque coming from a clock 100 actuator.

In the heart-piece and hammer version, the watch 200 includes a reset mechanism 500, which is arranged to return at least one such display 3, 4, 5 to a predetermined reference position. This description mainly deals with the example of a reference position at twelve hours and zero minutes; any other reference position is possible, for example ten hours and ten minutes, or the like.

The reset mechanism 500 is arranged to return at least one, and more particularly but in a non-limiting manner each, display 3; 4; 5, of the watch 200 to its reference position. To this end, the reset mechanism 500 includes in particular, for at least one display 3, 4, 5, at least one heart-piece 401, 702, 703, which is integral in rotation with the concerned display 3, 4, 5, and the reset mechanism 500 includes at least one hammer 402, 701, which is arranged to bearingly cooperate with a heart-piece 401, 702, 703, under the pressure of a spring when it is released by the activation of the reset mechanism 500. This hammer 402, 701 is returned by the reset mechanism 500 which tends to move it away from the heart-piece 401, 702, 703, in normal running.

More particularly, the watch 200 includes a first actuator of the watch 901, which is arranged to be actuated by the clock 100, to control the movement of at least one hammer 402, 701, to cause the positioning of at least one display 3, 4, 5, in the predetermined reference position, by cooperating, for each adjusted horological variable, a hammer 402, 701, with a heart-piece 401, 702, 703, carried by the corresponding display, and more particularly by a cannon-pinion.

More particularly, the hammer 402 or 701 is unique, and common to all the heart-pieces 401, 702, 703, included in the watch 200, for adjusting the display for the various corresponding watch variables.

More particularly, the watch 200 includes such a stop mechanism 20, and a first actuator of the watch 901, which is arranged to be actuated by the clock 100, to control this stop mechanism 20 to block or release the running of its resonator 10 and/or a mechanism for uncoupling the displays of the watch 200.

More particularly, the first actuator of the watch 901 is arranged to ensure the recoiling of the hammer 402, 701.

More particularly, this stop mechanism 20 includes a stop-second mechanism 25 including a stop lever arranged to bearingly cooperate with an inertial mass 15 of the resonator 10 in a blocked position, and to remain at a distance from the inertial mass 15 during normal running of the resonator 10.

More particularly, the watch 200 includes at least one operating means 270 or a control rod, which is able to cooperate with an actuator of a clock 100 in an engaged position.

More particularly, the watch 200 includes manual control means, which are arranged to be handled by a user to control the execution of a power recharging cycle and/or display adjustment and/or running adjustment of the watch 200 when it is deposited in a receptacle 150 in the transfer position, and in particular the watch 200 includes at least one control means 300 accessible to the user for the control of the execution of a periodical type winding, and/or for the control of the execution of an automatic time setting.

More particularly, the watch 200 includes a second actuator of the watch 902, which is able to operate in a reciprocating movement, for driving a minute display 5 of the watch 200, in steps of a given value, and to indirectly drive, through this minute display 5, an hour display 4 of the watch 200.

The watch 200 is arranged for a correction of the display in steps, with correction steps of a predetermined value, for example two minutes. This correction step is an integer sub-multiple of the hour: one minute, two minutes, three minutes, four minutes, five minutes, six minutes, ten minutes, twelve minutes, fifteen minutes, twenty minutes, thirty minutes. The watch 200 includes a cannon-pinion or a minute wheel, which is positioned precisely thanks to a star with 30 teeth, 15 teeth or including a number of teeth corresponding to the number of correction steps selected per hour.

Watch 200 advantageously includes at least one first upper selection half-shaft 11 and at least one second upper drive half-shaft 12, and the watch 200 is arranged to recognise the movement of a selection transmission line or of a drive transmission line in the end-of-time-setting position, where the first upper half-shaft 12 is arranged to actuate the stop lever of the stop mechanism 20, to release the resonator 10, and/or a mechanism for uncoupling the displays, and authorising the running of the watch 200.

More particularly, the watch 200 includes at least one safety mechanism, to prevent the breaking of the spring of an overloaded barrel, the safety mechanism including a sliding flange or a power reserve measuring mechanism to prevent unnecessary or damaging winding of a barrel.

More particularly, the watch 200 includes displays 3, 4, 5, which are arranged to pivot in the clockwise or counter-clockwise direction, each of the displays being associated with a pawl arranged to block the considered display when switching from the reference position, or from a preparation position close to the reference position.

More particularly, the reference position and/or the preparation position is adjustable, as well as the blocking position of the pawl.

More particularly, the watch 200 includes an interface arranged to drive at least one such display 3, 4, 5, in the counter-clockwise rotation, and to coil the barrel during such a rotation in the counter-clockwise direction.

The interface is advantageously arranged to drive, in addition to the rotation of at least one display 3, 4, 5, in the counter-clockwise direction, a gear train for manually winding at least one barrel, by a pawl mechanism external to a finishing gear train included in the watch 200.

In a variant, the finishing gear train of the watch 200 includes a pawl mobile, arranged for winding at least one barrel during a counter-clockwise rotation.

The watch 200 advantageously includes a time-setting friction capable of allowing the transfer of torque from the coiling, or else includes a coupling mechanism instead of a time-setting friction.

More particularly, the watch 200 includes at least one cannon-pinion coupling mechanism, which is arranged for coupling or uncoupling a display 3, 4, 5. In particular, this coupling mechanism 706 between the display gear train 705, 707, 708 and the finishing gear train 710, includes a friction spring 709.

More particularly, the watch 200 includes a minute display 5, which is arranged to pivot in the clockwise or counter-clockwise direction, and includes a pawl, which is arranged to be unlocked when the minute display 5 switches to the preparation position, and to block the minute display at the reference position. And the watch 200 advantageously includes a friction mechanism arranged to allow the recoiling to continue after this blocking during the counter-clockwise rotation.

The watch 200 includes in particular a hammer 701, which is movable between a coiled position where the hammer 701 is retained by a pawl and tensioned by a spring, and an active position where the hammer 701 is arranged to rest on the periphery of a first heart-shaped hour cam 702, carried by an hour wheel 708, so as to force it to rotate to its smallest radius. The watch 200 also includes a star carried by a minute display mobile, cooperating with a jumper 704, 7040, to maintain each display position at a regular step.

And the watch 200 includes a second, truncated heart-shaped minute cam 703, carried by a minute display 705 to guarantee the display position at the exact minute.

In either version of the watch, the sympathetic assembly 1000 advantageously includes a control mechanism for controlling the placement of the displays in the reference position. More particularly, this control mechanism includes at least one column wheel 840.

More particularly, the watch 200 includes a function controller, able to occupy at least two positions, the first one corresponding to the start of the function where the controller is arranged to control the uncoupling of the finishing gear train, and to stop the inertial mass 15 of the resonator 10, and the second one corresponding to the end of the function where the controller is arranged to release the coupling-clutch and the balance.

In a variant, the function controller is able to occupy, between the first position and the second position, an intermediate position wherein the controller controls the coiling of the hammer.

In an alternative, the function controller is integrated into the watch 200, and includes either a rotary controller, of column wheel type, controlled by the interface, with two to five successive stable positions, or else a reciprocal controller, of the shuttle type, controlled by the interface, with two successive stable positions.

In another alternative, the function controller is external to the watch 200 and is housed in the clock 100, and the watch 200 only includes a reciprocal cam controlled by the interface and returning to rest by default, and includes a stable rest position, and one to three controlled positions.

In a variant, the function controller is of the three-position column wheel type, arranged to control three rocker levers arranged to control the coupling-clutch, the stop lever, and the hammer or hammers, or which are part of these mechanisms, the rocker levers being arranged to rest on the columns of the column wheel so as to be activated when required, and whose different positions are an initial and final position with active coupling-clutch, inactive stop lever, and coiled hammer, a position of return to the reference time, for example 12h 00 min, with inactive coupling-clutch, active stop lever, and released hammer, and a time-setting position with inactive coupling-clutch, active stop lever, and coiled hammer.

In a variant, the function controller includes a three-level snail, which is located in the clock 100 and which is arranged to control, via a sympathetic interface, a reciprocal cam in the watch 200, to control the coupling-clutch, the stop lever, and the hammer or hammers, and the different positions of which are an initial and final position with active coupling-clutch, inactive stop lever, and coiled hammer, a position for returning to the reference time, for example 12h 00 min, with inactive coupling-clutch, active stop lever, and released hammer, and a time-setting position with inactive coupling-clutch, active stop lever, and coiled hammer.

A watch variant can be used for winding by rotating the display to a reference position, under the action of the clock. This watch includes a pawl, and at least two cams.

In this variant, the watch 200 includes at least one power storage barrel, for power supplying at least one resonator 10 included in the watch 200, and a display gear train and a finishing gear train.

The watch 200 includes either a stop mechanism 20 arranged to stop the operation of the resonator 10, or else a coupling mechanism allowing to separate the display from the finishing gear train, or both such a stop mechanism 20 and such a coupling-clutch mechanism.

The watch 200 includes at least one display 3; 4; 5, in particular at least one hour display 4 and one minute display 5.

The watch 200 includes at least one receiver capable of receiving a series of pulses or a mechanical torque from an actuator of the clock 100.

The watch 200 includes a transmission line capable of driving the display in the counter-clockwise direction, a pawl 801, and at least one first hour cam 802 carried by the hour wheel 808, and including a ratchet tooth opening 8030 or a notch 831 corresponding to a reference position of the display.

More particularly, the watch 200 includes a first hour cam 802 carried by the hour wheel 808, and including an opening 8020, a second minute cam 803 carried by a minute display mobile 805, and including a ratchet tooth opening 8030 or a notch 831, a jumper 804 arranged to cooperate with a star carried by a minute display mobile 805 for maintaining each display position according to a predetermined regular step.

More particularly, the watch 200 includes an interface arranged to drive at least one display 3; 4; 5 in a counter-clockwise rotation, and to coil a barrel, in a counter-clockwise rotation. And the watch 200 includes a finishing gear train which includes a pawl mobile, arranged to allow the winding of at least one barrel during the counter-clockwise rotation.

More particularly, the interface is arranged to drive, in addition to the counter-clockwise rotation of at least one display 3, 4, 5, a manual winding gear train of the at least one barrel, by a pawl mechanism external to a finishing gear train included in the watch 200.

More particularly, the watch 200 includes a time-setting friction capable of allowing the transfer of torque from the coiling, or else includes a coupling mechanism instead of a time-setting friction.

Another variant of the watch includes a pawl, a rack, and at least two cams. In this pawl, rack and double cam version, the watch 200 includes a pawl 801, a rack 823 meshed with an hour wheel 808, and which is arranged to click from the hour wheel 808 in the clockwise direction, and which is driven by a return spring 825, an hour rack pinion 824. The watch 200 includes two cams: at least one first hour cam 802 carried by the hour wheel 808, and including an opening 8020, and a second minute cam 803 carried by a minute display mobile 805, and including a ratchet tooth opening 8030 or a notch 831. The watch 200 includes a jumper 804, which is arranged to cooperate with a star carried by a minute display mobile 805 for maintaining each display position according to a predetermined regular step.

The rack pinion 824 is arranged to drive and coil the rack 823, which clicks with each tooth, during normal operation of the watch 200 when the watch 200 does not cooperate with the clock 100.

And the watch 200 includes a coupling mechanism 806 between a display gear train 805, 807, 808, and a finishing gear train 810.

The sympathetic assembly 1000 includes an interface between the clock 100 and the watch 200, this interface being arranged to uncouple the coupling mechanism 806 by actuating it towards its uncoupled position, which allows the rack 823 to drive the hour display and minute display gear train of the watch 200 in the counter-clockwise direction, with as many revolutions as necessary, until the pawl 801 meets the opening 8020 of the first hour cam 802, corresponding to the minutes preceding a reference time corresponding to a predetermined reference position of the displays 3, 4, 5, of the watch 200, at an instant at which the pawl 801 can press on the second minute cam 803 for a rotation corresponding to the last minutes before reaching this reference time, and until blocking the second minute cam 803 in the ratchet tooth opening 8030, the blocking corresponding to the reference display position.

The time-setting mechanism controlled by the clock 100 is arranged to set the time of the displays 4, 5, of the watch 200, in the clockwise direction, towards the exact time by recoiling the rack 801.

The interface between the clock 100 and the watch 200 is further arranged to reconnect the finishing gear train with the display gear train, by coupling the coupling mechanism 806 to recoil the rack 801 or complete the recoiling of the rack 801.

The cooperation between the jumper 804 and the star allows the displays to be maintained in each step, and allows the recoiling of the rack 801 without losing the display.

The star, carried by the minute display 5, is either a thirty-teeth star cooperating with a simple one-tooth jumper 804, or else a pinion of a fifteen-teeth minute cannon-pinion cooperating at the same time with a single tooth of a double jumper 8040 including two teeth, or else includes a number of teeth which corresponds to the integer number of predetermined steps contained in one hour.

The coupling mechanism 806 advantageously includes a friction spring 809.

More particularly, this coupling mechanism 806 is a chronograph coupling mechanism, including a clamp 821 whose function is to ensure the coupling and uncoupling, under the control of a column wheel 840 which controls the angular deviation of the arms of the clamp 821, 822, for opening or closing the clamp, corresponding respectively to the uncoupling or to the coupling.

As in the heart-piece and hammer version, the sympathetic assembly 1000 includes a control mechanism, which is internal or external to the watch 200, for controlling the placement of the displays in the reference position.

More particularly, this function controller is able to occupy at least two positions, the first one corresponding to the start of the function where the controller is arranged to control the uncoupling of the finishing gear train, and stop the balance of the resonator, and the second one corresponding to the end of function where the controller is arranged to release the coupling-clutch and the balance.

More particularly, the function controller is integrated into the watch 200, and includes either a rotary controller, of column wheel 840 type, controlled by the interface, with two to five successive stable positions, or else a reciprocal controller, of shuttle type, controlled by the interface, with two successive stable positions.

More particularly, the function controller is external to the watch 200 and is housed in the clock 100, and the watch 200 only includes a reciprocal cam controlled by the interface and returning to rest by default, and includes a stable rest position, and one to three controlled positions.

More particularly, the function controller includes a snail and a two-position cam.

In a first particular variant, called a step-by-step time-setting, the sympathetic assembly 1000 is arranged to allow the step-by-step time setting. More particularly, this sympathetic assembly 1000 including a sympathetic clock 100 and at least one associated sympathetic watch 200 is designed to perform the following functions:

- starting the stopped watch when it is placed on the clock;
- coiling the watch with the assurance of a minimum battery life of twelve hours when it is removed from the clock;
- keeping the watch in operation when it is on the clock;
- setting the time of the watch when it is placed on the clock or at request, to within plus or minus 15 seconds;
- keeping the watch on time as long as it is on the clock;
- the possibility of deactivating the function for possible storage of the stopped watch on the clock.

In this first variant, the step-by-step time setting can be done at the request of the user at the control means 300, and/or automatically, that is to say controlled by the clock 100, in particular by a mechanism connected to the rotation of the displays of the clock 100, in particular and in a non-limiting manner an hour display of the clock 104, and a minute display of the clock 105. The control performed by the clock 100 can be periodic, or else connected to an ancillary mechanism set by the user, called alarm-type mechanism, similar to an alarm mechanism; this control performed by the clock 100 is only executed if a watch 200 is present in the receptacle 150, in the transfer position.

The time setting is of interest to the user, except for demonstration purposes, if the watch 200 is not fully uncoiled. Also, the time setting is generally consecutive to a recoiling, or more generally, a power recharging of the watch 200. The present description is simplified by the use of the terms “coiling” or “recoiling” for any power charging or recharging, respectively.

The watch 200 conventionally includes displays, 3, 4, 5, and in particular and in a non-limiting manner an hour display of the watch 4, and a minute display of the watch 5. The figures illustrate non-limiting variants where these displays are hands.

More particularly, the control performed by the clock 100, or the action of the user on the control means 300, has the first effect of positioning one of the transmission lines in a position corresponding to the time setting. One of the transmission lines is then able to impart to a time-setting mechanism, which is internal to the watch 200, the movement(s) necessary to precisely reach the display of the current time.

The invention is described below in a non-limiting embodiment, wherein one of the transmission lines between the clock and the watch includes a first actuator of the clock 501, which is arranged to cooperate with a first actuator of the watch 901 of start or stop control of the watch, and another of these transmission lines includes a second actuator of the clock 502 which is arranged to cooperate with a second actuator of the watch 902, in particular a push-piece or the like, which incrementally provides the positioning movement. In another embodiment, these push-pieces can be combined. In another embodiment, another transmission line includes a third actuator of the clock 503, arranged to cooperate with one of the actuators of the watch.

The watch 200 includes a resonator 10, which includes at least one inertial mass 15; the present description relates to the most common case of a balance-spring type resonator, where the inertial mass 15 is a balance.

The watch 200 is equipped with a stop mechanism 20, designed to stop the operation of the resonator 10, in particular by pressing an arm, or a leaf spring, or another actuator, on the inertial mass 15 or on a suitable element of the resonator. More particularly, this stop mechanism 20 is a stop-second mechanism 25 including a stop lever.

The clock 100 includes a stop control mechanism 120, which is arranged to transform the step-by-step time-setting control carried out by the user or by the clock 100, into a sequence, the first step of which is a control action of the stop mechanism 20 of the watch 200.

The stop control mechanism 120 of the clock 100 is arranged to control a movement of one of the transmission lines to identify the time-setting action, and to control the transfer of a pulse or a torque to the stop mechanism 20 of the watch 200.

The time-setting sequence is as follows:

to set the time, the resonator 10 is stopped, in particular the balance of the watch 200, is stopped and the displays of the watch 200 return to the reference position, in particular 12h00, instantaneously;

the hour 4 and minute 5 displays of the watch 200 then reach, in successive steps, a restart display position which corresponds to the instantaneous exact time, increased by the value of at least one additional step imposed by the mechanism, in particular a two-minute step;

when the next two minutes pass, that is to say at the instant corresponding to the restart display position which has just been reached, the resonator 10, in particular the balance 15, of the watch, is released by the stop mechanism 20 of the watch 200, in particular by this stop-second mechanism 25.

For this purpose, the watch 200 recognises the movement of the transmission line between the clock 100 and the watch 200 in the time-setting position, a first actuator of the watch 901 (in particular a push-piece or the like) actuates the stop lever of the stop-second mechanism 25, which stops the resonator 10 and the watch 200. This first actuator of the watch 901 is advantageously also a mechanism for controlling at least one hammer or the like, and causes the positioning of the hour 4 and minute 5 displays of the watch 200 in the reference position, by cooperating, for each adjusted horological variable, a hammer with a heart-piece carried by a cannon-pinion.

Thus, more particularly, the step-by-step time setting includes a sequence of steps, described here with numerical values of the step which are in no way limiting:

During the time-setting order given by the user at the control means 300, or given by the clock 100 itself, the control means 300, or a horological movement 900 included in the clock 100, activates the stop control mechanism 120, which immediately controls the stop mechanism 20 of the watch 200, through the first push-piece 901.

The resonator 10 is then stopped, in the particular case illustrated here the inertial mass 15 is stopped.

The watch 200 includes at least one display 3, 4, 5; more particularly and in a non-limiting manner, the present description relates to the setting of an hour display of the watch 4, and of a minute display of the watch 5.

The watch 200 includes a reset mechanism 500, which is arranged to return at least one display 3, 4, 5 of the watch, in particular the hour display of the watch 4 and the minute display of the watch 5, to a reference position, in particular for example the position at the reference position, in particular 12h00, that is to say twelve hours and zero minutes, or else, as can be seen in FIGS. 27 to 33, the position 10h10, that is to say ten hours and ten minutes, or any other value. Unless otherwise indicated, in the present description, the reference position is this reference position of 12h00, twelve hours and zero minutes.

More particularly, this reset mechanism 500 is designed to return each display 3, 4, 5 of the watch to its reference position.

In a non-limiting embodiment, this reset mechanism 500 includes, for each display 3, 4, 5, a heart-piece 401, 702, 703, which is integral in rotation with this display 3, 4, 5, and the reset mechanism 500 includes at least one hammer 402, 701, which is arranged to bearingly cooperate with this heart-piece 401, 702, 703, during the activation of the reset mechanism 500; preferably this hammer 402, 701 is returned by a hammer spring 403 which tends to move it away from the heart-piece 401, 702, 703, in normal operation.

In a particular variant, the hammer 402, 701 is unique, and common to all the heart-pieces 401, 702, 703, included in the watch 200 for the different horological variables to be adjusted.

The stop mechanism 20 thus controls, simultaneously with the stop of the watch 200, the resetting of its display by activating its reset mechanism 500 to return each display 3, 4, 5 to its reference position.

Thus each display 3, 4, 5 of the watch 200 instantly assumes the reference display position, for example the twelve o'clock and zero-minute position.

Another transmission line is then driven by the clock to impose a particular display to the watch; instead of being done continuously, this drive is carried out in steps. This other transmission line includes a second actuator of the watch 902, which operates here in a reciprocating movement; this non-limiting embodiment is one of the possibilities for controlling the time of the watch.

Subsequently, by means of this second actuator of the watch 902, the clock 100 drives the minute display of the watch 5, in steps of a given value, for example of two minutes, and therefore indirectly drives through the minute display of the watch 5, the hour display of the watch 4, until the display on the watch matches a restart display position which corresponds to the instantaneous exact time which is the value of the instantaneous display visible on the clock 100, increased by at least one additional step, therefore here by two minutes.

This mechanism works similarly to a date corrector: watch 200 has a corrector connected to a minute mobile, and the clock 100 actuates a second actuator of the watch 902 which presses on this corrector, the number of times necessary to reach the instantaneous time, increased by the value of the step, here by two minutes. This linear movement resembles the operation of a bicycle pump. The reference point on the clock is done similarly to that carried out by a minute repeater mechanism at request, with sensing the hour and minute snails conventionally included in the clock.

The two-minute steps are a non-limiting example, and, in this example, the number of steps to be taken, for two-minute steps, is then variable between 0 and 359 steps (60/2*12). During this phase, the cannon-pinion or the minute wheel of the watch is positioned precisely thanks to a star, in particular but in a non-limiting manner 30 teeth; the advantageous case of a 15-teeth star will be seen below. More generally, the cannon-pinion or the minute wheel of the watch 200 is precisely positioned by the combination of a star integral with the cannon-pinion or minute wheel, and a jumper with one or more teeth, the number of teeth of this star and the number of teeth of this jumper together defining the value of the predetermined step.

The operation of the first actuator of the watch 901 can be used to ensure the recoiling of the hammer 402, 701.

Subsequently, the clock 100 waits for the next passage to the next two minutes, in order, at this precise moment which corresponds to the restart display position which was previously set, to release the stop lever by means of the first push-piece 901, and thus allow the watch to operate at the exact time. Thanks to the seconds stop, this time setting is very precise.

Indeed, this same passage to the next two minutes has the effect of modifying the state of the stop control mechanism 120, and of controlling a movement of the start/stop control transmission line, to identify the end-of-time-setting action, and to control the transfer of a pulse or a torque to the stop mechanism 20 of the watch 200.

In the embodiment where the sympathetic clock 100 includes a first selection shaft 1 and at least one second drive shaft 2, the watch 200 recognises the movement of one of the transmission lines in the end-of-time-setting position, the first upper half-shaft 12 re-actuates the stop lever of the stop mechanism 20, which releases the resonator 10 and the watch 200, the running of which resumes instantaneously.

In short, by a first interface, the clock 100 stops the inertial mass 15, in particular the balance, of the watch 200, in particular by a stop-second lever mechanism 25.

Subsequently, by a second mechanism, the clock 100 drives in steps, here in two-minute steps, the minute display of the watch 5 of the watch 200, and by means of which the hour display of the watch 4 of the watch 200, until these displays reach and together indicate the instantaneous exact time plus two minutes.

Subsequently, the clock 100 waits for the next passage to the next two minutes to release the stop lever, and thus allow the watch 200 to operate on time.

The time setting of the watch is thus carried out very precisely.

In short, the step-by-step time-setting method of such a sympathetic watch 200 includes different steps described below.

1A: A value of a pre-determined battery life that the watch 200 must have at all instants is determined after a first coiling in the event of the clock 100 being removed.

1B: A predetermined time-setting step value is determined.

1C: A reference position is defined for displays 3, 4, 5, of the watch 200.

1D: The connection mechanism is equipped with at least two distinct transmission lines, one for power or movement transfer, and the other for selecting a function to be performed or a display variable to be adjusted, each transmission line including an interface with a clock actuator in the clock 100 and at least one watch actuator in the watch 200.

1E: The watch 200 is placed in the receptacle 150, in the transfer position allowing the clock 100 to detect the presence of the watch 200, and to carry out a first coiling of the watch 200 to trigger the starting of the watch 200 if the watch 200 is stopped when it is placed on clock 100.

1F: The clock 100 coils the watch 200 so as to guarantee the pre-determined battery life of the watch 200 when it is removed from the clock 100.

1G: And the clock 100 performs the time setting of the watch 200, either when the watch 200 is placed on the receptacle 150, or alternatively at a predetermined time on the clock 100, or at request by action of a user on a control means 300 included in the clock 100 or the watch 200, or upon control of a horological movement 900 included in the clock 100.

1H: And the clock 100 positions a transmission line in a position corresponding to the time setting, and actuates in successive steps, each of the value of this predetermined step, a transmission line capable of imparting to an internal time setting mechanism of the watch 200 any movement necessary to precisely reach the display of the current time.

1I: The clock 100 keeps the watch 200 in operation as long as the watch 200 is on the clock 100, in the receptacle 150, in the transfer position.

1J: More particularly, the clock 100 and/or the watch 200 is equipped with a control means arranged to allow the user to deactivate the time-setting function and the coiling function for storing the stopped watch on the clock.

1K: More particularly, the time-setting is controlled step by step by a periodic mechanism connected to the rotation of the displays of the clock 100, or else connected to an alarm, or alarm type mechanism, set by the user.

1L: More particularly, the sympathetic assembly 1000 is equipped with a first transmission line which includes a first actuator of the clock 501, which is arranged to cooperate with a first actuator of the watch 901 for controlling the start or stop of the watch, and with a second transmission line which includes a second actuator of the clock 502 which is arranged to cooperate with a second actuator of the watch 902, which incrementally provides the positioning movement.

1M: More particularly, the sympathetic assembly 1000 is equipped with a first transmission line which includes a first actuator of the clock 501, which is arranged to cooperate with a first actuator of the watch 901 for controlling the coupling or the uncoupling of the display of the watch 200 relative to the resonator without stopping the latter, and with a second transmission line which includes a second actuator of the clock 502 which is arranged to cooperate with a second actuator of the watch 902, which incrementally provides the positioning movement.

1N: More particularly, a single actuator is produced constituting both the first actuator of the watch 901 and the second actuator of the watch 902.

1O: More particularly, the watch 200 is equipped with a stop mechanism 20, and the clock 100 is equipped with a stop control mechanism 120, which is arranged to transform the step-by-step time-setting control performed by a user or by the clock 100, in a sequence, the first step of which is a control action of the stop mechanism 20 of the watch 200, the stop control mechanism 120 of the clock 100 being arranged to control a movement of a transmission line to identify the time-setting action, and to control the transfer of a pulse or a torque to the stop mechanism 20 of the watch 200.

1P: More particularly, for the actuation, in successive steps, of the transmission line to the internal time-setting mechanism of the watch 200, a time-setting sequence is carried out according to which the stop control mechanism 120 of the clock 100 controls the stop mechanism 20 of the watch 200 to stop the resonator 10 before setting the time, and to control a reset mechanism 500, with which the watch is equipped 200, to instantly return the displays 3, 4; 5, of the watch 200 in their reference position, then the advancement of the displays 3, 4, 5 is controlled, in successive steps, to a restart display position which corresponds to the exact instantaneous time readable on the clock 100, increased by a value corresponding to a predetermined step, or an integer number of predetermined steps, imposed by the mechanism. And the passage of the clock 100 at the time corresponding to the restart display position changes the state of the stop control mechanism 120, and controls a movement of the start/stop control transmission line, to identify the end-of-time-setting action, and controls the transfer of a pulse or a torque to the stop mechanism 20 of the watch 200 to release it and restart the resonator 10.

1Q: More particularly, to carry out the reset, the watch 200 recognises the movement of the transmission line between the clock 100 and the watch 200 in the time-setting position, and a first actuator of the watch 901 actuates the stop mechanism 20 which stops the resonator 10 and the watch 200, the first actuator of the watch 901 constituting a control mechanism for at least one hammer, to cause the positioning of at least one hour display 4 cooperating, for each adjusted horological variable, of a hammer 402; 701, with a heart-piece 401, 702, 703, integral in rotation with a display and carried by a cannon-pinion.

1R: More particularly, to carry out the time-setting sequence, the clock 100 drives another transmission line to impose a particular display on the watch 200, this other transmission line includes a second actuator of the watch 902, which operates in a reciprocating movement, and, by means of the second actuator of the watch 902, the clock 100 drives the minute display of the watch 5 of the watch 200, by an integer number of predetermined steps, and drives, through the minute display of the watch 5, the hour display of the watch 4 of the watch 200, until the display on watch 200 corresponds to the restart display position.

1S: More particularly, to carry out the time-setting sequence, the clock 100 is equipped with a mechanism for driving hour and minute snails by the movement 900, and a mechanism for sensing the instantaneous hour and minute, as on a minute repeater mechanism at request.

1T: More particularly, to carry out the time-setting sequence, the clock 100 is equipped with a drive mechanism by the movement 900 of a single minute snail driven at a speed of one revolution in twelve hours, or one revolution in twenty-four hours, including a number of steps corresponding to the selected minute step multiplied by 12 or 24, and a mechanism for sensing the instantaneous minutes as on a minute repeater mechanism at request.

1U: More particularly, a predetermined step of two minutes is selected, and the number of steps to be taken is variable between 0 and 359 steps, during which the cannon-pinion or the minute wheel of the watch 200 is positioned precisely thanks to a 30-teeth or 15-teeth star and which can then be formed by the cannon-pinion itself.

1V: More particularly, the cannon-pinion or the minute wheel of the watch 200 is precisely positioned by the combination of a star integral with the cannon-pinion or minute wheel, and a jumper with one or more teeth, the number of teeth of the star and the number of teeth of the jumper together defining the value of the predetermined step.

1W: More particularly, a clock 100 which includes a first selection shaft 1 and at least one second drive shaft 2 is implemented, and the watch 200 is arranged to recognise the movement of one of the transmission lines in the end-of-time-setting position, and includes a first upper half-shaft 12 which controls the stop mechanism 20 to release the resonator 10.

A second variant, called periodic pulse winding and at the time-setting function, relates to the periodic winding of the watch 200, when the watch is in the receptacle 150 of the clock 100, with a coiling value which corresponds to the duration of a period, plus a safety duration.

The general objectives are the same as for the first variant of step-by-step time setting.

In an advantageous embodiment, a winding identical to that which is carried out at each period is also triggered when the time is set on the watch, either at the request of the user, or at the request of the time base of the clock 100, to ensure the operation of the watch 200 after setting the time. This winding is then carried out prior to the time-setting operation.

This principle requires the presence, at the watch 200, of a safety mechanism, such as a barrel of the sliding flange type, to prevent the rupture of the barrel spring when overloaded. In a more complex embodiment, a power reserve measuring mechanism can allow to prevent unnecessary or damaging winding of the barrel.

For example, and in a non-limiting manner, periodic winding is carried out with a period of twelve hours, therefore twice a day, for a coiling value greater than the period of periodic winding, for example a coiling value of thirteen hours, so as to have thirteen hours of battery life.

The execution of a periodic type winding can be done at the request of the user at the control means 300, and/or automatically, that is to say controlled by the clock 100, in particular by a mechanism connected to the rotation of the displays 104, 105, of the clock 100. The control carried out by the clock 100 can be periodic, or else connected to an ancillary mechanism set by the user, an alarm mechanism, or an alarm-type mechanism; this control performed by the clock 100 is only executed if a watch 200 is present in the receptacle 150, in the transfer position.

The execution of a periodic type winding can be triggered by an action of the user during a request for time setting, or by a control of the clock 100 itself for the same object.

More particularly, it is by one of the transmission lines between the clock and the watch, or by a third interface such as a crown, that the clock 100 drives the winding gear train of the watch 200 by a number revolutions equivalent to thirteen hours of battery life, in the present example. This battery life allows the watch 200 to operate if the user immediately wears his watch, provided that said watch is equipped with an automatic winding mechanism ensuring additional coiling, even if this watch 200 was uncoiled beforehand, before the time-setting request.

If the watch 200 is automatic, it will continue its coiling while being worn.

If the watch 200 remains in its receptacle 150 on the clock 100, it continues to operate until the next periodic winding, in this advantageous example, after twelve hours.

It can be noted that, in an extreme case, the winding can go down so that the chronometry is downgraded, but if the winding period is coupled with a time-setting period, this loss is not harmful for the user.

It should also be noted that, after approximately 50 cycles, the maximum coiling of the watch, for example 60 hours, will be reached, the watch will therefore operate continuously between 48 and 60 hours of coiling and the barrel flange is then biased to a sliding of two hours per day, which is much lower than for normal wearing of an automatic watch, and does not generate excessive wear of the mechanism.

This periodic winding is very simple, and preserves the power storage mechanism of the watch, while ensuring availability for the benefit of the user.

In short, the method for winding such a sympathetic watch 200 by periodic pulse includes different steps described below.

2A: A coiling period is determined, and when the watch is in the receptacle 150, a periodic winding of the watch 200 is carried out with a period equal to the coiling period, with a coiling value which corresponds to the duration of a coiling period, plus a safety duration.

2B: More particularly, a winding identical to the periodic winding which is carried out at each coiling period, or else during a time-setting operation of the watch 200 by the clock 100, or else at request by action of a user on a control means 300, or upon control of a horological movement 900 included in the clock 100, to ensure the continued operation of the watch 200 after the time-setting operation, the winding being carried out prior to the time-setting operation.

2C: More particularly, the clock 100 keeps the watch 200 in operation as long as the watch 200 is on the clock 100, in the receptacle 150, in the transfer position.

2D: The clock 100 and/or the watch 200 is equipped with a control means arranged to allow the user to deactivate the time-setting function and the coiling function for storing the stopped watch on the clock.

2E: The watch 200 is equipped with a safety mechanism, a sliding flange barrel or a power reserve measuring mechanism, to prevent the breaking of the overloaded barrel spring and to prevent unnecessary or detrimental winding of the barrel.

In particular, a twelve-hour coiling period is selected.

2F: More particularly, a thirteen-hour coiling value is selected, including a twelve-hour coiling period, and a safety duration of one hour, so as to dispose a total of thirteen hours of battery life.

2G: More particularly, a periodic type automatic winding is selected, which is controlled by the clock 100, either periodically by a mechanism connected to the rotation of the displays of the clock 100, or by the triggering of an ancillary mechanism regulated by the user, at an instant defined by the user in an alarm mechanism or in an alarm-type mechanism.

2H: More particularly, a periodic type winding is triggered, either by an action of the user during a time-setting request, or by a time-setting control by the clock 100.

2I: The clock 100 drives the winding gear train of the watch 200 by one of the transmission lines, or by a third interface controlling the rotation of a crown included in the watch 200, by an adequate number of revolutions to constitute a coiling value equal to the sum of the coiling period and the safety duration, so as to allow immediate operation of the watch 200, even if the user immediately wears the watch 200, and even if the watch 200 was uncoiled beforehand, before the time-setting request.

2J: More particularly, the coiling period is reduced to a threshold at which the chronometry of the watch 200 is downgraded, and the winding period is coupled with a time-setting period, so that the loss of chronometric performance is not harmful to the user.

More particularly, the connection mechanism including at least two distinct transmission lines between the clock 100 and the watch 200 is produced.

More particularly, this sympathetic assembly 1000 is produced with a watch 200 including at least one resonator 10, and a display gear train and a finishing gear train, and, either a stop mechanism 20 arranged to stop the operation of the resonator 10, or a coupling mechanism allowing to separate the display from the finishing gear train, or else both such a stop mechanism and such a coupling mechanism, and the watch 200 including at least one hour display 4 and one minute display 5.

A third variant, called relative time-setting, relates to the execution of the time-setting at request, and periodically automatically, for example twice a day, controlled by the clock 100.

The general objectives are the same as for the first variant of step-by-step time setting.

At each period, the clock 100 drives the displays 4, 5, of the watch 200, backwards, with a value guaranteeing switching the displays to a twelve-hour and zero-minute position, for example with a value of thirteen hours for a time setting of an hour display over 12 hours. Each of these displays 4, 5 is blocked during the passage of the twelve-hour and zero-minute reference position by a pawl. More particularly, this reference position is adjustable, as well as the blocking position of the pawl specific to at least one display 4, 5, more particularly to each display 4, 5.

The clock 100 drives the displays of the watch 4, 5, to the correct time, with a precision of the order of ±20 seconds.

The execution of this time-setting at request, and automatically periodically, can be done at the request of the user at the control means 300, and/or automatically, that is to say controlled by the clock 100, in particular by a mechanism connected to the rotation of the displays 104, 105, of the clock 100. The control carried out by the clock 100 can be periodic, or else connected to an ancillary mechanism set by the user, an alarm mechanism or an alarm-type mechanism; this control performed by the clock 100 is only executed if a watch 200 is present in the receptacle 150, in the transfer position.

By an interface of the crown type or the like, the clock 100 drives the minute display of the watch 5, and by said minute display drives the hour display of the watch 4, in the counter-clockwise direction, in abbreviated form SIAM, the equivalent of thirteen hours so as to guarantee the passage of the hours through the reference position, in particular at twelve hours and zero minutes. When passing from the position at twelve o'clock and zero minutes, or, advantageously, when passing from a neighbouring position, called the preparation position, for example from the position at twelve o'clock and fifteen minutes, a pawl is unlocked and blocks the minute display at the reference position, in particular 12h00. The drive by the hour clock, over the thirteen-hour stroke in the counter-clockwise direction, continues on a friction system. This principle is the reverse of the principle which allows to adjust exactly, at the exact minute, the striking time of an alarm, by combining two cams, one which is an hour cam and which includes an opening corresponding to a lapse of time of about a quarter of an hour before the time scheduled for the execution of the strike, this opening being arranged to cooperate with a pin for the continuation of the drive by the movement of the only minute cam which triggers the alarm at the exact minute set beforehand, as can be read in document EP2073076B1 in the name of MONTRES BREGUET.

Subsequently, through an appropriate interface, the clock 100 drives the minute display of the watch 5 in the normal clockwise direction, in abbreviated form SAM, and by said minute display the hour display of the watch 4, until they reach the correct time. It should be noted that the time-setting precision is highly dependent on the clearance and the out of truth in the round of the time-setting gear train, it is estimated to be around +/−15 to seconds per minute.

More particularly, the reference position and/or the preparation position is adjustable, as well as the blocking position of at least one pawl, in particular of each pawl.

In short, the method for relative time setting of such a sympathetic watch 200 includes different steps described below.

3A: A reference position is defined for displays 3, 4, 5, of the watch 200.

3B: The time-setting is carried out, or at request by action of a user on a control means 300 included in the clock 100 or the watch 200, or periodically automatically controlled by the clock 100.

3C: And, to perform the relative time setting, the clock 100 drives the displays 4, 5, of the watch backwards, in the counter-clockwise direction, with a stroke long enough to guarantee the passage of the displays 4, 5, by the reference position.

3D: For a watch 200 displaying a twelve-hour display, the stroke is selected with a value greater than twelve hours, in particular but in a non-limiting manner for a twice-daily time setting.

3E: More particularly, the watch 200 is equipped with, in particular but in a non-limiting manner for each of its displays 4, 5, a pawl arranged to block at least one display 4, 5, when it switches into the position corresponding to the reference position.

3F: More particularly, the control means 300 is equipped with an adjustment means to adjust the blocking position of the pawl specific to at least one display, or to adjust the blocking position of the pawl specific to each display.

More particularly, the control means 300 is equipped with an adjustment means for adjusting the reference position.

3G: More particularly, a periodic-type automatic time setting is selected, which is controlled by the clock 100, either periodically by a mechanism connected to the rotation of the displays of the clock 100, or by triggering an ancillary mechanism set by the user, at an instant defined by the user in an alarm mechanism or in an alarm-type mechanism.

3H: More particularly, a periodic time-setting is triggered, either by an action of the user during a time-setting request, or by a time-setting control 100.

3I: More particularly, through an interface, the clock 100 drives the minute display of the watch 5, and through said minute display drives the hour display of the watch 4, in the counter-clockwise direction, in order to block the minute display at the reference position, the drive of the hours by the clock 100 continuing on a friction system.

3J: More particularly, then, by a suitable interface, the clock 100 drives the minute display of the watch 5 this time in the normal clockwise direction, and by said minute display the hour display of the watch 4, until they reach the correct time.

3K: More particularly, a preparation position is defined, close to the reference position, at the passage of which a pawl is unlocked, the control means 300 is equipped with an adjustment means for adjusting the preparation position.

3L: More particularly, the sympathetic assembly 1000 is equipped with a first transmission line which includes a first actuator of the clock 501, which is arranged to cooperate with a first actuator of the watch 901 for controlling the coupling or the uncoupling of the display of the watch 200 relative to the resonator 10 without stopping the latter, and of a second transmission line which includes a second actuator of the clock 502 which is arranged to cooperate with a second actuator of the watch 902, which provides the positioning movement.

3M: More particularly, the watch 200 is equipped with a stop mechanism 20 to keep the inertial mass 15 of the resonator 10 stopped during the time setting.

3N: More particularly, the watch 200 is equipped with a coupling mechanism to start the displays 4; 5 without the inertial mass 15 of the resonator 10 being stopped during the time setting.

In a fourth variant, called winding by relative time setting, the winding takes place during the thirteen-hour period of counter-clockwise rotation of the relative time setting of the watch, described above. Similarly, at request and automatically twice a day. The thirteen hours of counter-clockwise rotation of the displays 4, 5 of the watch ensure the winding of the watch for a duration of thirteen hours.

This fourth variant allows time setting and winding to be carried out with a single rotary interface.

The time-setting function is triggered by user action on the clock (at request), or by a mechanism connected to the (periodic) rotation of the clock displays.

By means of a crown-type interface or the like, the clock 100 drives the minute display of the watch 5 and the hour display of the watch 4 in the counter-clockwise direction by the equivalent of thirteen hours for the relative time setting. This rotation can be used to coil the barrel, advantageously by thirteen hours.

Two solutions are proposed:

- either the interface drives, in addition to the rotation of the displays in the counter-clockwise direction, the manual winding gear train;
- or the finishing gear train includes a pawl mobile, which allows the barrel to be wound up during the reverse rotation of the displays.

The first option is easy to implement. It includes a pawl system so that the clockwise rotation of the relative time-setting displays can be done, but the pawl system is not in the finishing gear train.

The second option is interesting because it only requires a pawl wheel in the finishing gear train. The time-setting friction must allow the transfer of torque from the coiling; the typical cannon-pinion torque is approximately 1N·mm, and the typical cannon-pinion torque for maximum winding is 3N·mm. A coupling system can replace conventional time-setting friction.

This invention allows to ensure a winding for a duration of thirteen hours during the time setting at request, and for a duration of thirteen hours at periodic time settings.

In short, the method for winding such a sympathetic watch 200 by relative time setting includes different steps described below.

4A: A reference position for the displays of the watch 200 is defined.

4B: The winding is carried out by time setting, or at the request by action of a user on a control means 300 included in the clock 100 or the watch 200, or automatically periodically controlled by the clock 100, and, to carry out the relative time setting which allows the winding, the clock 100 drives the displays 4, 5, of the watch backwards, in the counter-clockwise direction, with a sufficiently long stroke to ensure that the displays 4, 5 pass through the reference position.

4C: More particularly, for a watch 200 displaying a twelve-hour display, the stroke is selected with a value greater than twelve hours, in particular but in a non-limiting manner for a twice-daily time setting.

4D: More particularly, the watch 200 is equipped with, for each of its displays 4, 5, a pawl arranged to block this display 4, 5, when it switches into the position corresponding to the reference position.

4E: More particularly, the control means 300 is equipped with an adjustment means to adjust the blocking position of the pawl specific to at least one display, or to adjust the blocking position of the pawl specific to each display.

4F: More particularly, the control means 300 is equipped with an adjustment means for adjusting the reference position.

4G: More particularly, a periodic automatic time setting is selected, which is controlled by the clock 100, either periodically by a mechanism connected to the rotation of the displays of the clock 100, or by the triggering of an ancillary mechanism set by the user, at an instant defined by the user in an alarm or alarm type mechanism.

4H: More particularly, a periodic-type time-setting is triggered, either by an action of the user during a time-setting request, or by a time setting control by the clock 100.

4I: More particularly, through an interface, the clock 100 drives the minute display of the watch 5, and by said minute display drives the hour display of the watch 4, in the counter-clockwise direction, to block the minute display at the reference position, the drive of the hours by the clock 100 continuing on a friction system, to ensure the defined winding. In particular, a preparation position, close to the reference position, at the passage of which the pawl is unlocked, in order to block the minute display, is defined.

4J: More particularly, during the counter-clockwise rotation of the displays, the interface coils the barrel. And, either the pawl is external to the finishing gear train and the interface drives, in addition to the displays, the manual winding gear train included in the watch 200, or the finishing gear train includes a pawl mobile which allows the winding of the barrel by the display gear train and the part of the finishing gear train located between the pawl mobile and the barrel during reverse rotation of the displays.

In a fifth variant, called permanent time-setting variant, the time-setting, like winding, takes place only at request.

In this variant, the watch 200 is necessarily equipped with a stop mechanism 20, designed to stop the operation of the resonator 10, in particular by a support of an arm, or of a leaf spring, or of another actuator, on the inertial mass 15 or on a suitable element of the resonator. More particularly, this stop mechanism 20 is a stop-second mechanism 25 including a stop lever.

The stop lever is activated.

The clock drives the displays backwards by thirteen hours, they are blocked when passing from the reference position, in particular 12h00, by pawls.

These thirteen hours of reverse rotation also ensure the winding of the watch as before.

The clock then drives the displays to the hour, with a precision of around ±20 seconds.

Subsequently, the clock continues to drive the displays until the watch is unlocked on the clock.

Unlocking the watch on the clock releases the stop lever.

This fifth variant avoids constant operation of the watch (excluding display), the daily winding and time setting, the functions being performed only once, from the request to the use of the watch.

The time-setting function is triggered by user action on the clock (at request) only.

By a second interface (push-button type), the clock stops the watch and uncouples the display (cannon-pinion coupling).

By a first interface (crown type), the clock drives the minute display and by said minute display the hour display in the counter-clockwise direction by the equivalent of thirteen hours, so as to guarantee switching the hours to the reference position, in particular 12h00, and to guarantee a minimum winding greater than twelve hours of power reserve, in particular with a value of thirteen hours of power reserve, in a manner similar to the fourth variant. A little before reaching the reference position, in particular 12h00, in reverse operation, for example when passing from the 12h15 position, or the like, a pawl is unlocked and blocks the minute at the reference position, in particular 12h00; the counter-clockwise thirteen-hour drive by the clock continues on a friction system.

Subsequently, by the first interface, the clock drives the minute display, and through said minute display the hour display until they reach the exact time. It should be noted that the time-setting precision is highly dependent on the clearance and the out of truth in the round of the time-setting gear train, it is estimated at ±20 seconds per minute.

Subsequently, via the first interface, the clock drives the displays in real speed as long as the watch is not unlocked from the clock for wearing.

When the watch is unlocked to be worn by the user, the clock releases the stop lever and the display coupling-clutch by the second interface, the watch is again independent.

This invention has the advantage of sparing the operational wear of the watch when it is on the clock.

It also guarantees a minimum of thirteen hours of battery life regardless of when the watch is taken.

In short, the method for winding such a sympathetic watch 200 by permanent time setting includes different steps described below.

5A: A reference position for the displays of the watch 200 is defined.

5B: The time-setting is executed only at request by action of a user on a control means 300 included in the clock 100 or the watch 200, or automatically periodically controlled by the clock 100, and, to set the time, the clock 100 drives the displays 4, 5, of the watch backwards, in the counter-clockwise direction, with a sufficiently long stroke to ensure that the displays 4, 5 pass through the reference position; or the clock 100 controls means of the watch 200 which are disposed so as to ensure the displacement of the displays to the reference position by means of heart-pieces.

5C: Through an interface, the clock 100 drives the minute display of the watch 5, and through said minute display drives the hour display of the watch 4, in the counter-clockwise direction, in order to block the minute display at the reference position, the drive of the hours by the clock 100 continuing on a friction system, and then, through a suitable interface, the clock 100 drives the minute display of the watch 5 this time in the normal clockwise direction, and by said minute display the hour display of the watch 4, until they reach the exact time in continuous rotation. More particularly, a preparation position, close to the reference position, at the passage of which a pawl is unlocked, for this blocking of the minute display.

5D: The action of the user on the control means 300 actuates the stop mechanism 20 to stop the operation of the resonator 10, prior to the drive of the displays 4, 5, to the reference position, and, after the instantaneous time has been reached by the displays 4, 5, of the watch 200, the clock 100 drives the displays 4, 5, as long as the watch 200 is in the transfer position in the receptacle 150, and the removal of the watch 200 from the receptacle 150 separates it from the clock 100 and generates the release of the stop mechanism 20 to allow the operation of the resonator 10.

5E: Thus, the displays 4, 5 are driven to the reference position, in the counter-clockwise direction.

5F: When the user acts on the control means 300, the clock 100 actuates the stop mechanism 20 through an all or nothing interface to stop the operation of the resonator 10.

5G: More particularly, to drive the displays 4, 5 backwards, the clock 100 drives the displays 4, 5, through a movement transmission interface, and, after reaching the instantaneous time by the displays 4, 5, in a normal clockwise direction, the clock 100 drives the displays 4, 5, at real speed as long as the watch 200 is in the transfer position in the receptacle 150, and the removal of the watch 200 from the receptacle 150 separates it from the clock 100 and generates the uncoupling between the movement transmission interface and the displays 4, 5.

5H: More particularly, for a watch 200 displaying a twelve-hour display, the stroke with a value greater than twelve hours is selected, in particular but in a non-limiting manner for a twice-daily time setting.

5I: More particularly, the watch 200 is equipped with, for each of its displays 4, 5, a pawl arranged to block this display 4, 5, when it switches into the position corresponding to the reference position.

5J: More particularly, the control means 300 is equipped with an adjustment means to adjust the blocking position of the pawl specific to at least one display, or to adjust the blocking position of the pawl specific to each display.

5K: More particularly, the control means 300 is equipped with an adjustment means for adjusting the reference position.

5L: More particularly, a permanent automatic time-setting triggering is selected, which is controlled by the clock 100, either periodically by a mechanism connected to the rotation of the displays of the clock 100, or by the triggering of an ancillary mechanism set by the user, at an instant defined by the user in an alarm-type mechanism.

5M: More particularly, such a permanent time-setting is triggered, either by an action of the user during a time-setting request, or by a time-setting control by the clock 100.

5N: More particularly, the control means 300 is equipped with an adjustment means for adjusting the preparation position.

5O: More particularly, the winding is carried out only at request during an action of a user on the control means 300 during the permanent time setting which allows winding.

A sixth variant, called acquiring data for setting the time at request, has the purpose of allowing to read the time displayed by the clock and to transmit the information to the watch within the framework of the operating modes of the sympathetic clocks described in the first, third, and fifth variants above. FIGS. 8 to 12 illustrate this data acquisition on the clock for on-request time setting.

This sixth variant uses a mechanism which allows to read the difference between the current time and the reference time, selected arbitrarily and in a non-limiting manner at 12h00 for all the described variants, and which also allows to transmit the information of the value of this difference to the watch, so as to index it after returning its displays to the reference position, in particular 12h00. Advantageously, this transmission can give either the exact deviation, or the total of the deviation and an offset necessary for a time-setting at the second signal.

This sixth variant is explained here in a similar way to the first variant, called the step-by-step time-setting, it will be seen that it is also valid for the third and the fifth variants.

Recall that, according to the first variant, the time-setting function is triggered by an action of the user on the clock (at the request at the control means 300) or by a mechanism connected to the (periodic) rotation of the displays of the clock. By the first interface, the clock stops the resonator 10, in particular the balance 15 of the watch (stop balance lever mechanism), and actuates a hammer mechanism returning the hour display of the watch from 4 to 12 o'clock, and by said hour display the minute display of the watch 5 to 00 minutes. Then, via the second interface (push-button), the clock drives in two-minute steps the minute display of the watch 5, and by said minute display the hour display of the watch 4, until these displays 4 and 5 reach and indicate the exact time increased by a non-limiting two-minute step. This function can ensure the recoiling of the hammer. During this phase, the minute wheel is positioned precisely thanks to a star, in particular a 30-teeth or 15-teeth star. Then, the clock waits for the next passage to the next two minutes to release the stop lever and allow the watch to operate on time.

A first embodiment of this sixth variant includes a single cam 601 at the clock 100, and performs the step-by-step time setting.

The clock 100 includes a snail cam 601 making one revolution in twelve hours, and including 360 bearings 6010 on its circumference, one bearing per two minutes. This cam is integral with the display of the clock (one revolution in twelve hours).

The clock 100 includes a feeler-spindle 602, in particular a rocker lever, which includes at a first end a rack 603, and at a second opposite end a feeler-spindle finger 604 with a beak 605. Said feeler-spindle finger is maintained by default in a rest position, which corresponds to the reference time, plus an offset corresponding to possible gear train clearances and a possible additional jump to allow the time setting function with seconds stop according to the first variant. Maintaining this feeler-spindle 602 is advantageously done with an adjustment eccentric (not shown) allowing the watchmaker to be able to easily compensate for these clearances.

The adjustment can also advantageously be carried out with a fine adjustment rack according to the teachings of application EP20158326.7 in the name of MONTRES BREGUET.

When the user requests the time setting, or when the clock itself requests this time setting, the proposed time-setting cycle includes a phase of referencing the watch to the reference position, 12h00 for example.

The feeler-spindle 602 carrying the feeler-spindle finger 604 is subjected to the action of return means, and in particular of an elastic return means such as a spring.

As soon as this referencing is carried out, the clock 100 releases the feeler-spindle 602, which is rotated by this return means, not shown in the figures. The feeler-spindle 602 rotates until it abuts on one of the 360 bearings 6010 of the cam 601. This rotation corresponds exactly to the number of two-minute steps separating the reference time from the time displayed on the clock.

This rotation is transmitted in a non-limiting manner by an interface, in particular of the reciprocating type, to the watch and to its display or to its minute display. Alternatively, the interface can also be rotatable instead of reciprocating.

At the end of the function, the clock 100 recoils and returns the feeler-spindle 602 to its rest position by a mechanism similar to the known grand strike mechanisms, and is ready for a new function.

A second embodiment of this sixth variant includes two cams 610 and 620 in the clock 100, and performs the step-by-step time setting.

A 360-position cam, as used in the first embodiment, indeed remains a difficult element to manufacture, and necessarily bulky, even in the context of a clock.

The operation of this second embodiment is similar to that of the first single cam mode, but compensates for the difficulty of manufacturing the cam: thus the clock 100 includes two cams: a first hour cam 610 making one revolution in twelve hours and including on its circumference 12 bearings 6100 of one hour each, and a second minute cam 620 making one revolution in one hour and including 30 bearings 6200 of two minutes each. These cams are integral with the clock display, respectively with the hour display 104 (one revolution in twelve hours) and the minute display 105 (one revolution in one hour).

The clock 100 also includes two feeler-spindles: a first feeler-spindle 630 arranged to cooperate with the first hour cam 610, and a second feeler-spindle 640 arranged to cooperate with the second minute cam 620. These two feeler-spindles are maintained by default in a rest position which corresponds, for the first hour feeler-spindle 630 to the reference time plus an offset corresponding to possible gear train clearances, and for the second minute feeler-spindle 640 to a possible additional jump to allow the time-setting function with a stop seconds mechanism 25 according to the first variant.

As soon as the watch 200 is set to the reference time, the clock 100 releases the feeler-spindles 630 and 640 until it rests on their respective cams 610, 620. This rotation is transmitted to an interface and to the watch 200, in particular via a differential gear train 680, one of the reasons for which has a ratio of 1/12 relative to the other, in order to accumulate the values of the two cams. An output of this differential mechanism 680 is arranged to drive a second actuator 502, in particular but in a non-limiting manner via a second control cam 684.

More particularly, this second actuator 502 includes a crank and a connecting-rod arranged to push and pull a second control rod 512 included in this second actuator 502, so as to impart to the second control rod 512 a reciprocating movement for time setting such a watch 200. Alternatively, the second control rod 512 is returned to the second cam 684 by second elastic return means 513.

In a variant, the clock 100 includes at least one electromechanical or electronic movement, which is arranged to control the movement of an output mobile which is arranged to drive such a second actuator 502, in particular but in a non-limiting manner by means of a second control cam 684.

This rotation is transmitted by this interface to the watch 200 and to its minute display 5.

At the end of the function, the clock 100 recoils and returns the two feeler-spindles 630 and 640 to their rest positions, by a mechanism similar to the known grand strike mechanisms, and is ready for a new function.

In short, the method for acquiring data on the clock 100 for setting the time of the watch 200 at request includes different steps described below.

6A: A reference position for the displays of the watch 200 is defined.

6B: The clock 100 performs the time setting of the watch 200, either when the watch 200 is placed on the receptacle 150, or when switching to a predetermined instant on the clock 100, or at the request by action of a user on a control means 300 included in the clock 100 or the watch 200, or upon control of a horological movement 900 included in the clock 100, and the time displayed by the clock 100 is read for the transmission of the time information to the watch 200, by implementing a reading mechanism at the clock 100, which reads the deviation between the current time compared to the reference time, and which is arranged to transmit the information of the value of this deviation to the watch 200, so as to index it after placing its displays 4, in the reference position.

6C: More particularly, the reading mechanism is arranged to transmit the information of the value, or else of the exact deviation, or else of a corrected deviation which is the total of the deviation and an offset necessary to a time-setting at the seconds signal.

6D: More particularly, a predetermined time-setting step value is determined, and the clock 100 positions a transmission line in a position corresponding to the time setting, and actuates, in successive steps, each of the value of the predetermined step, a transmission line capable of imparting to a time-setting mechanism internal to the watch 200 any movement necessary to precisely achieve the display of the current time. And, for the actuation by successive steps of the transmission line to the time-setting mechanism internal to the watch 200, a time-setting sequence is carried out according to which the stop control mechanism 120 of the clock 100 controls the stop mechanism 20 of the watch 200 to stop the resonator 10 or uncouple the finishing gear train from the display gear train before setting the time, and to control a reset mechanism 500 included in the watch 200 to instantly return the displays 3, 4, 5, of the watch 200 to their reference position.

6E: Then the advancement of the displays 3, 4, 5 is controlled in successive steps, to a restart display position which corresponds to the exact instantaneous time readable on the clock 100, increased by a corresponding value at a predetermined step, or an integer number of predetermined steps, imposed by the mechanism.

6F: Then the switching of the clock 100 to the time corresponding to the restart display position changes the state of the stop control mechanism 120, and controls a movement of the start/stop control transmission line, to identify the end-of-time-setting action, and controls the transfer of a pulse or a torque to the stop mechanism 20 of the watch 200 in order to release it and restart the resonator 10 or couple the finishing gear train with the display gear train.

6G: More particularly, to carry out the reset, the watch 200 recognises the movement of the transmission line between the clock 100 and the watch 200 in the time-setting position, and use is made of a watch 200, whose first actuator of the watch 901 actuates the stop mechanism 20 which stops the resonator 10 and the watch 200, this first actuator of the watch 901 constituting a mechanism for controlling at least one hammer, to cause the positioning of at least one hour display 4 and one minute display 5, in the reference position, by cooperating, in particular for each adjusted horological variable, a hammer 402, 701, with a heart-piece 401, 702, 703, integral in rotation with one of the displays, and more particularly but in a non-limiting manner carried by a cannon-pinion.

6H: More particularly, to carry out the time-setting sequence, the clock 100 drives another transmission line to impose a particular display to the watch 200, this other transmission line includes a second actuator of the watch 902, with which the watch 200 is equipped, and which operates in a reciprocating movement, and, by means of the second actuator of the watch 902, the clock 100 drives the minute display of the watch 5 of the watch 200, by an integer number of predetermined steps, and drives, through the minute display of the watch 5, the hour display of the watch 4 of the watch 200, until the display on the watch 200 corresponds to the restart display position.

6I: More particularly, to carry out the time-setting sequence, the clock 100 is equipped with a mechanism for driving hour and minute snails by the movement 900, and a mechanism for sensing the instantaneous hour and minute at request.

6J: More particularly, to carry out the time-setting sequence, the clock 100 is equipped with a mechanism for driving a single minute snail driven at a speed of one revolution in twelve hours, or one revolution in twenty-four hours, by the movement 900, including a number of steps corresponding to the selected minute step multiplied by 12 or 24, and a mechanism for sensing the instantaneous minutes.

6K: More particularly, a predetermined step of two minutes is selected, and the number of steps to be performed is variable between 0 and 359 steps, during which the cannon-pinion or the minute wheel of the watch 200 is positioned precisely thanks to a 30-teeth or 15-teeth star and which can then be formed by the cannon-pinion itself.

6L: More particularly, the cannon-pinion or the minute wheel of the watch 200 is positioned precisely by the combination of a star integral with the cannon-pinion or minute wheel, and a jumper with one or more teeth, the number of teeth of the star and the number of teeth of the jumper together defining the value of the predetermined step.

6M: More particularly, when the clock 100 drives the minute display of the watch 5, it also ensures the at least partial recoiling of at least one hammer 402, 701, or of each hammer 402, 701.

6N: More particularly, to carry out the sensing of the instantaneous hour and minute, use is made of a clock 100 which includes a single snail cam 601 making one revolution in twelve hours, and including three hundred and sixty bearings 6010 on its circumference, that is to say one bearing per two minutes, the single snail cam 601 being integral with the display of the clock 100 which performs one revolution in twelve hours, and the clock 100 includes a feeler-spindle 602, subjected to the action of elastic return means, and which includes at a first end a rack 603, and at a second opposite end a feeler-spindle finger 604 with a beak 605, which feeler-spindle 602 is maintained by default in a rest position, which corresponds to the reference time, plus a positive or zero offset corresponding to possible gear train clearances and to a possible additional jump to allow a time-setting function with seconds stop to be performed, and, when the user requests the time setting, or when the clock 100 requests the time setting, the time-setting cycle begins with a phase of referencing the watch 100 to the reference position, and, as soon as this referencing is carried out, the clock 100 releases the feeler-spindle 602, which rotates until it abuts against one of the bearings 6010 of the cam 601, according to a rotation which corresponds exactly to the number of steps separating the reference time from the time displayed on the clock 100.

6O: More particularly, at the end of the function, the clock 100 recoils and returns the feeler-spindle 602 to its rest position, and is ready for a new function.

6P: More particularly, to carry out the sensing of the instantaneous hour and minute, a clock 100 is used which includes a first hour snail cam 610 making one revolution in twelve hours and including on its circumference twelve bearings 6100 of one hour each, and a second minute snail cam 620 making one revolution in one hour and including thirty bearings 6200 of two minutes each, which cams 610 and 620 are respectively secured to the hour display of the clock 104 making one revolution in twelve hours and to the minute display of the clock 105 making one revolution in one hour, the clock 100 including a first feeler-spindle 630 arranged to cooperate with the first hour cam 610, and a second feeler-spindle 640 arranged to cooperate with the second minute cam 620, the first feeler-spindle 630 and the second feeler-spindle 640 being maintained by default in a rest position which corresponds, for the first hour feeler-spindle 630 to the reference time added with a positive or zero offset corresponding to possible gear train clearances, and for the second minute feeler-spindle 640 to a possible additional jump to allow the time-setting function with a stop-second mechanism 25, and, when the user requests setting the time, or when the clock 100 requests the time setting, the time-setting cycle begins with a phase of referencing the watch 200 to the reference position, and, as soon as this referencing is made, the clock 100 releases the first feeler-spindle 630 and the second feeler-spindle 640 until they bear on their respective cams 610, 620, in a rotation which is transmitted to an interface and to the minute display 5 of the watch 200, via a differential gear train 680, one of the reasons for which has a ratio of 1/12 relative to the other, in order to accumulate the values of the two cams 610, 620.

6Q: More particularly, at the end of the function, the clock 100 recoils and returns the first feeler-spindle 630 and the second feeler-spindle 640 to their rest position, and is ready for a new function.

A seventh variant, called the reference time setting of the displays, and illustrated by FIGS. 13 to 18, proposes a solution for the function of returning the displays of the watch 200 to the reference position, in particular 12h00, function which is necessary for the implementation of the first, third, and fifth variants above.

This is about allowing the execution of a cycle, for a first displacement of an interface between the watch 200 and the clock 100, a corrector for example, performing the following functions in the watch 200 at any time:

- uncoupling the display gear train from the finishing gear train;
- returning the displays to a reference position, for example 12h00;
- maintaining this position as precisely as possible;
- allowing a time-setting function (which will be detailed later);
- taking advantage of this time-setting function to recoil a hammer;
- or deactivating this hammer.

On a second displacement of the interface between watch 200 and the clock 100:

- coupling the display gear train on the finishing gear train;
- if necessary, recoiling the hammer.

Figure 17:
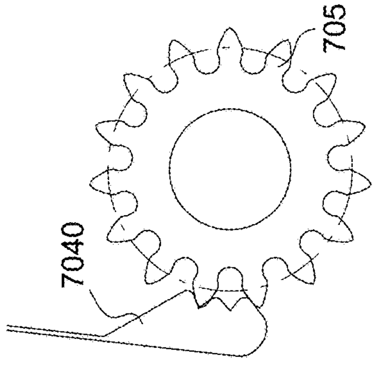

To this end, the watch 200 includes:

- a hammer 701, similar to a chronograph hammer, which has a coiled position where it is retained by a pawl and tensioned by a spring, and an active position where it rests on the periphery of a first heart-shaped hour cam 702 so as to force it to rotate to its smallest radius;

this first heart-shaped hour cam 702 is similar to those used in chronograph mechanisms. This first hour cam 702 is carried by the hour wheel 708;

a second truncated heart-shaped minute cam 703 carried by the minute display 705;

a jumper 704 bearingly cooperating with a 30-teeth star integral with the minute display (not shown in the figures);

a 30-teeth star carried by the minute display (not shown in the figures);

a pinion 705 of a cannon-pinion, which can act as a star, in particular a 15-teeth star cooperating with a double jumper 7040, as shown in FIG. 17;

a coupling mechanism 706 between the display gear train 705-707-708 and the finishing gear train 710, including a friction spring 709 in the particular case illustrated by the figures;

a mechanism for controlling the three phases of the function (not shown in the figures).

Figure 15:
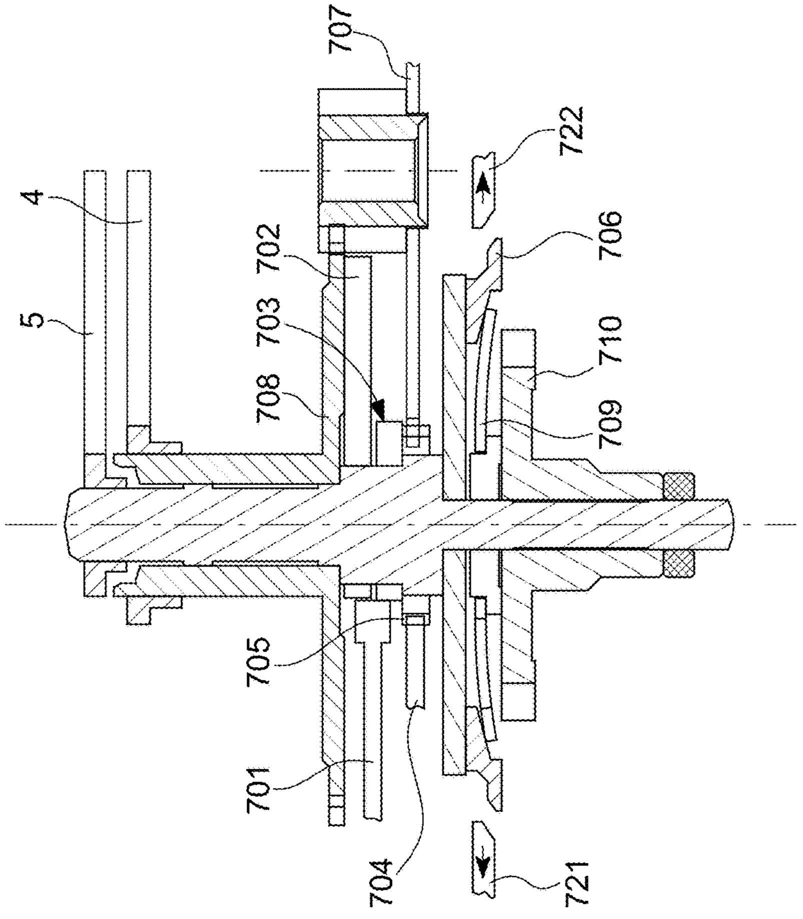

The cycle is carried out in three phases:

triggering the placement to the reference position, in particular 12h00, and uncoupling by the interface, in the position of FIG. 15;

maintaining the position of the displays for time setting, isolating or recoiling the hammer;

coupling and, if necessary, recoiling the hammer via the interface.

Figure 16:
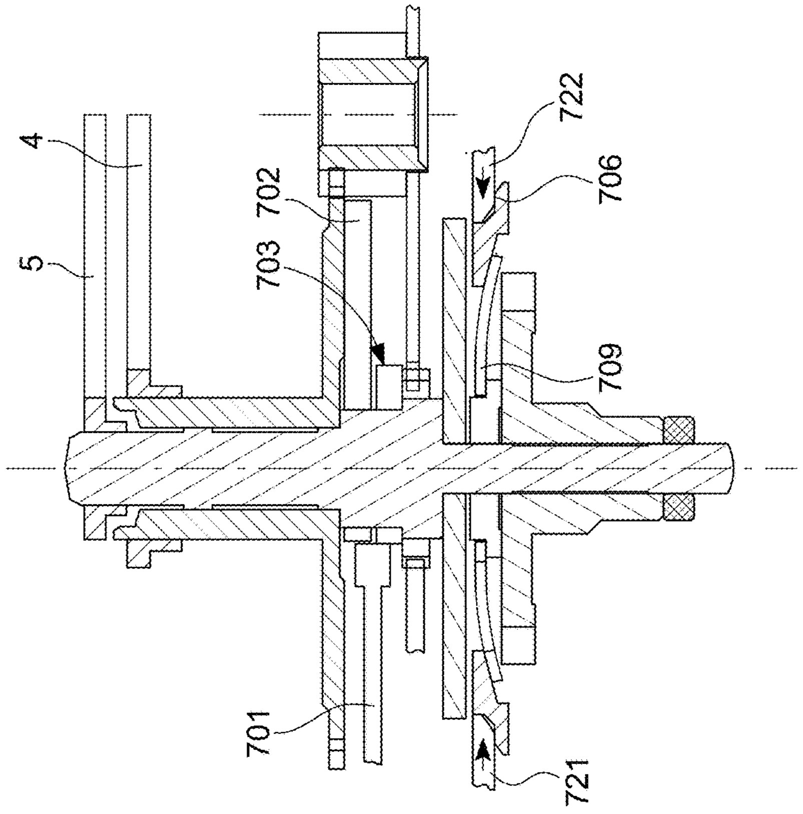

In the first phase, the interface actuates the coupling-clutch 706 to its uncoupled position, as visible in FIG. 16.

The interface then releases the hammer 701, which takes by the first heart cam 702 the hour display, and, by the timer, the minute display to the reference position, in particular 12h00.

Figure 14:
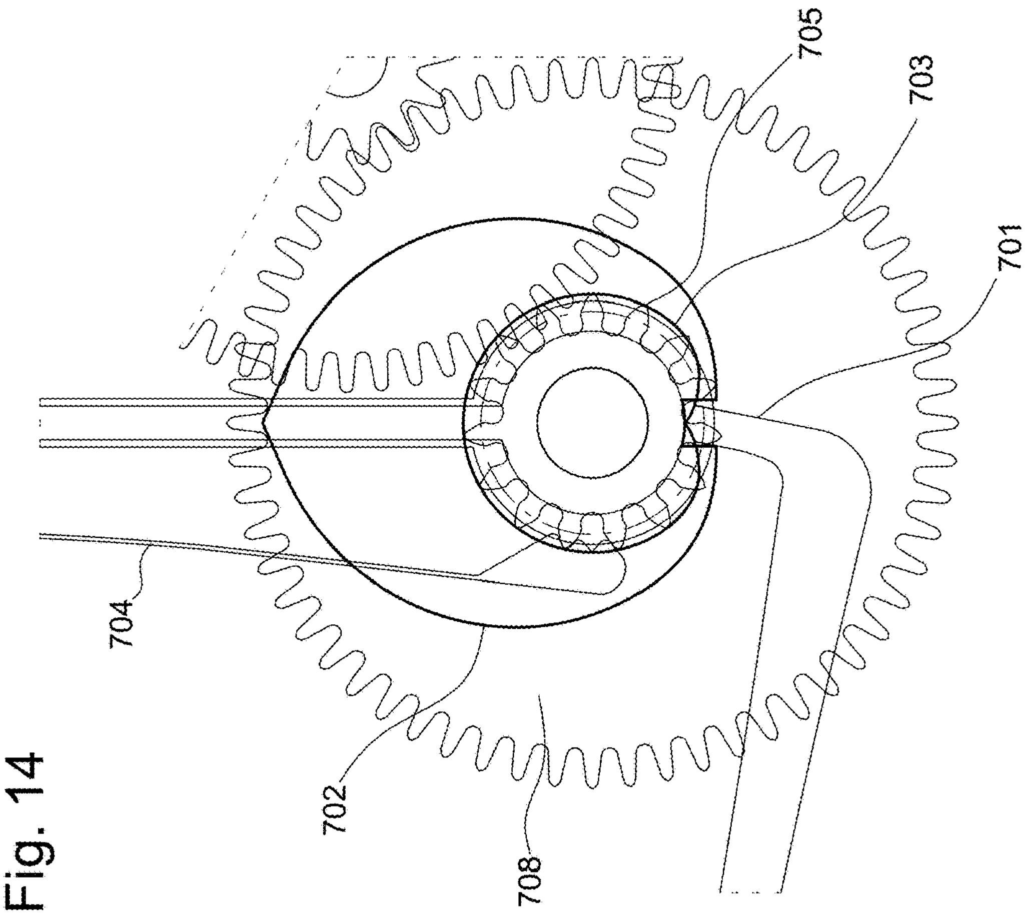
FIGS. 13 to 18 illustrate a seventh variant of the reference time setting variant of the displays.
Figure 13:
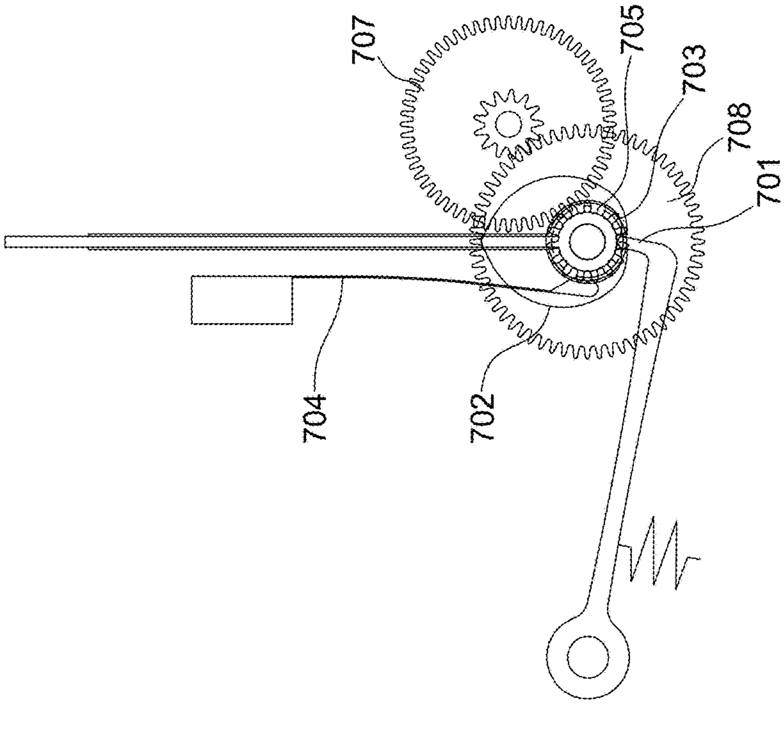

The typical timer set allows an error of the order of 3 minutes on the position of the minute display in relation to that of the hours: ±1.5 minutes, depending on the resetting direction transmitted by the hammer to the heart-piece, as shown in FIGS. 13 and 14.

Advantageously, an additional minute heart cam 703 works at the end of the hammer 701 function, and guarantees the position at the exact minute.

During the second phase, the jumper 704 and the 30 star maintain the position of the display at the reference position, in particular 12h00, and at all subsequent positions in two-minute correction steps. In this example, the 15-tooth cannon-pinion advantageously replaces the 30 star, by working with a double jumper as shown in FIG. 17.

The mechanism can recoil the hammer without losing the display, the time can be set in two-minute steps.

In the third phase, the interface can release the coupling-clutch, and reconnect the finishing gear train with the display gear train.

Thus the option of two heart cams improves the precision of the operation.

Figure 18:
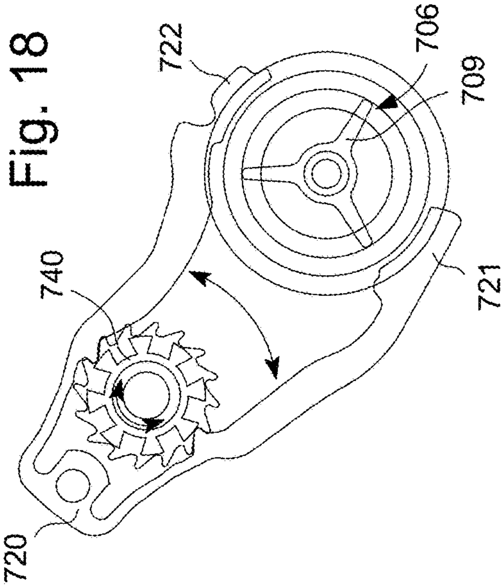

FIG. 18 illustrates a BREGUET chronograph 1050 coupling mechanism, including a clamp 721 whose function is to ensure coupling and uncoupling, under the control of a column wheel 740 which controls the angular deviation of the clamp arms 721 and 722, for opening or closing the clamp, and therefore the uncoupling or coupling.

This seventh variant allows a time-setting mechanism to be involved, and allows the display gear train to be uncoupled from the finishing gear train, and allows them to be coupled again with one another.

The construction is simplified in the case of the advantageous use of the cannon-pinion toothing for the star function.

In short, the method for setting the reference time of the displays includes different steps described below.

7A: A reference position of the displays is defined.

7B: Use is made of a watch 200 including a coupling mechanism 706 between a display gear train 705, 707, 708, and a finishing gear train 710, and including a hammer 701 movable between a coiled position where it is retained by a pawl and tensioned by a spring, and an active position where the hammer 701 is arranged to rest on the periphery of a first hour heart cam 702 carried by an hour wheel 708 included in the watch 200, so as to constrain the first hour heart cam 702 in rotation to its smallest radius.

And a cycle including three phases is executed:

7C: a first phase during which, by a first displacement of an interface between the clock 100 and the watch 200, the coupling mechanism 706 is uncoupled by the interface which actuates it to its uncoupled position, and, after uncoupling the coupling-clutch 706, the interface releases the hammer 701, which returns by the first hour heart cam 702 the hour display 4, and, by the timer, the minute display 5 to the reference position, 7D: a second phase where the position of the displays 4, 5 is maintained, for time setting, isolating or recoiling the hammer 701, 7E: and a third phase where, by a second displacement of the interface between the clock 100 and the watch 200, to reconnect the finishing gear train with the display gear train, the coupling mechanism 706 is coupled by the interface which actuates it towards its coupled position and during which third phase it is possible to recoil the hammer 701 by the interface.

7F: More particularly, at the end of the stroke of the hammer 701, the latter cooperates with a second minute heart cam 703 in the shape of a truncated heart and integral with the minute display 5, to guarantee the position at the exact minute.

7G: More particularly, a predetermined time-setting step value is determined, and, during the second phase, the position of the display is maintained in the reference position, by cooperation between a jumper 704 and a star, included in the watch 200, then in each subsequent position step by step, to allow the recoiling of the hammer 701 without losing the display.

7H: More particularly, one chooses as a star, carried by the minute display 5, either a thirty-teeth star cooperating with a simple one-tooth jumper 704, or else a pinion of a fifteen-teeth minute cannon-pinion cooperating at the same time with a single tooth of a double jumper 7040 including two teeth.

7I: More particularly, the cannon-pinion or the minute wheel of the watch 200 is precisely positioned by the combination of a star integral with the cannon-pinion or minute wheel, and a jumper with one or more teeth, the number of teeth of the star and the number of teeth of the jumper together defining the value of the predetermined step.

7J: More particularly, the coupling mechanism 706 is equipped with a friction spring 709.

7K: More particularly, as the coupling mechanism 706, use is made of a chronograph coupling mechanism, including a clamp 721 whose function is to ensure the coupling and uncoupling, under the control of a column wheel 740 which controls the angular deviation of the arms of the clamp 721,

722, for opening or closing the clamp, corresponding respectively to the uncoupling or to the coupling.

7L: More particularly, a three-phase control mechanism is used. More particularly, this control mechanism includes at least one column wheel 740.

Figure 19:
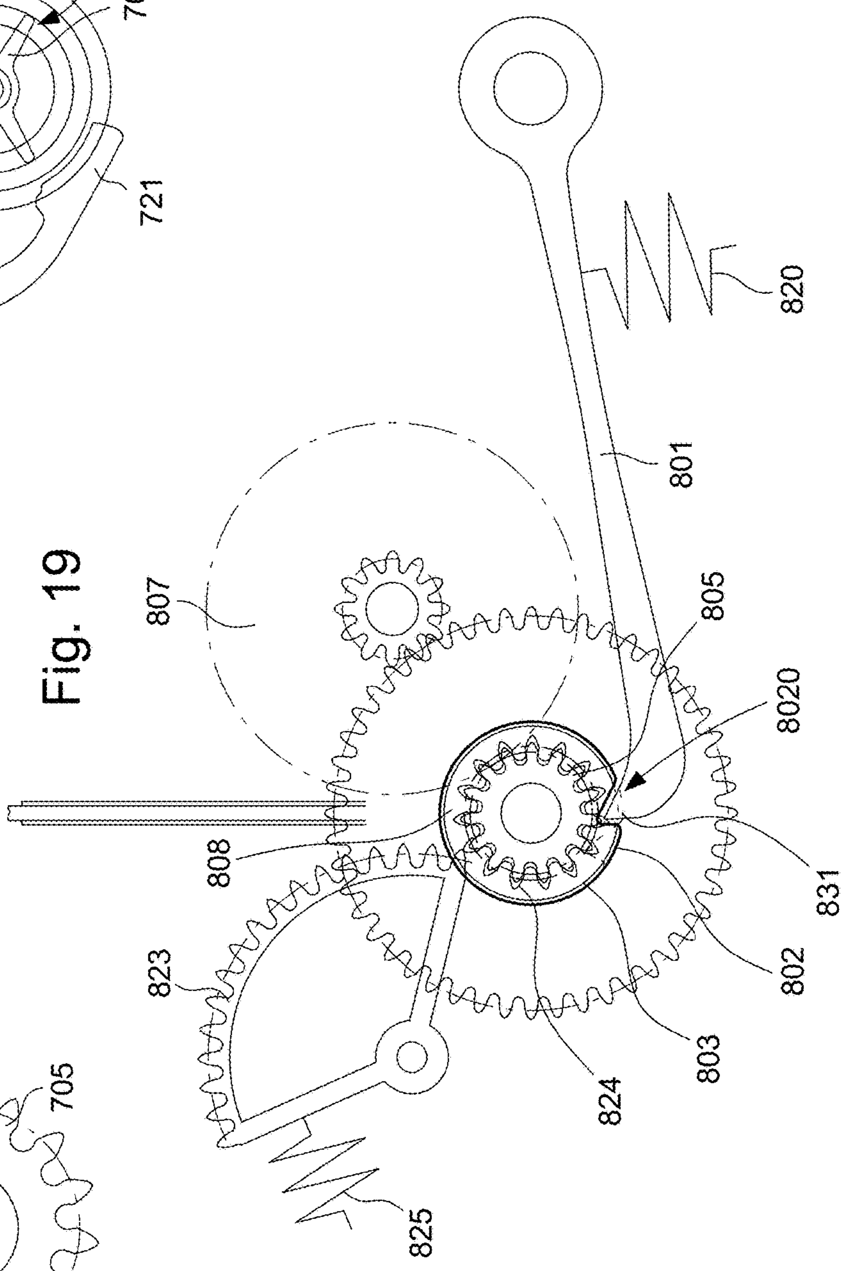
FIGS. 19 to 21 illustrate an eighth variant of the reference time setting of the displays.
Figure 21:
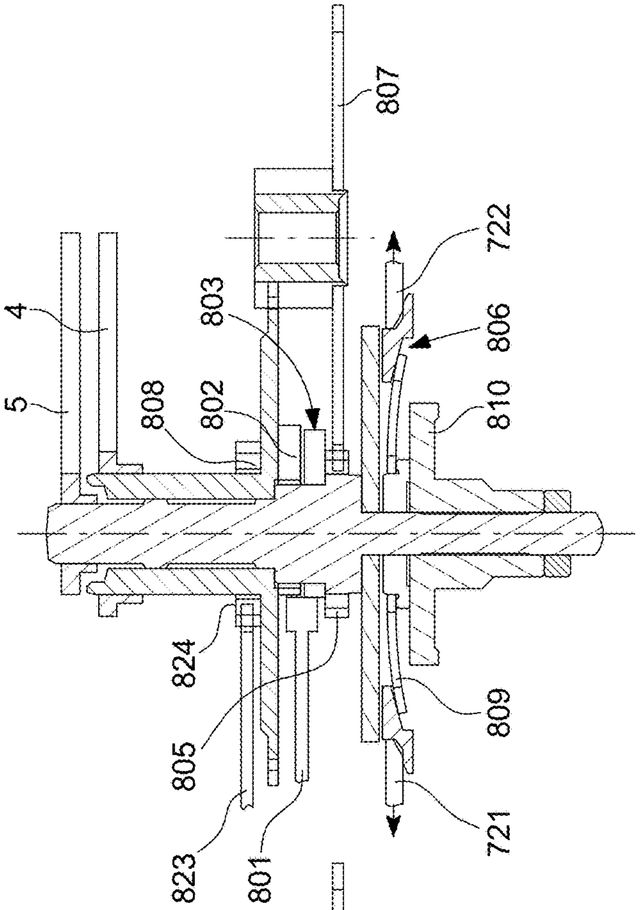
Figure 20:
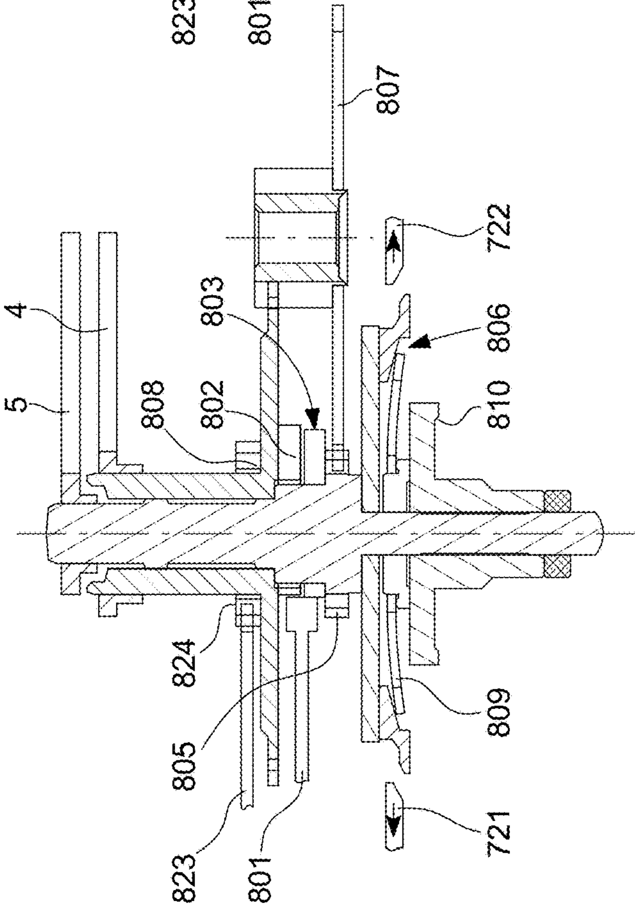

As an alternative to this seventh variant, an eighth variant, called the reference time setting, illustrated by FIGS. 19 to 21, proposes another solution for the function of returning the displays of the watch 200 to the reference position, in particular 12h00, a function which is necessary for the implementation of the first, third and fifth variants above.

Here again, it is about allowing the execution of a cycle, for a first displacement of an interface between the watch 200 and the clock 100, a corrector for example, performing the following functions in the watch 200 at any time:

- uncoupling the display gear train from the finishing gear train;
- returning the displays to a reference position, for example 12h00;
- maintaining this position as precisely as possible;
- allowing a time-setting function (which will be detailed later).

And, on a second displacement of the interface between the watch and the clock, coupling the display gear train on the finishing gear train.

Use is made of a watch 200 including:

- a rack 823 meshed with an hour wheel 808 integral with the hour display of the watch 4, and carrying an hour cam 802 including a ratchet tooth notch,
- a pawl 801 which is held in contact with the hour cam 802 by a pawl spring 8010, where the rack 823 is arranged to click in the clockwise direction of the hour wheel 808, and is driven by a return spring 825.

The watch 200 also includes a rack pinion 824 or hour pinion, which rack pinion 824 is arranged to drive and coil the rack 823, which clicks with each tooth, during normal operation of the watch 200 when the watch 200 does not cooperate with the clock 100.

The watch 200 further including a coupling mechanism 806 between a display gear train 805; 807; 808 and a finishing gear train 810.

And, at any time, the reference time setting of the watch 200 is performed by a cycle including three phases, consisting of:

- a first phase during which the placement in the reference position is triggered, by a first displacement of an interface between the clock 100 and the watch 200, the reference time setting of the displays 4, 5 of the watch 200 is performed, and the coupling mechanism 806 is uncoupled by the interface which actuates it towards its uncoupled position which allows the rack 823 to drive the hour display and minute display gear train of the watch 200 in the counter-clockwise direction, over as many revolutions as necessary, until the pawl 801 meets the ratchet tooth opening of the hour cam, this blocking corresponding to the reference display position,
- a second phase where the position of the displays 4, 5 is maintained for the time setting, and where the time-setting mechanism controlled by the clock 100 sets the time of the displays 4, 5, of the watch 200 in the clockwise direction to the exact time by recoiling the rack 801, and
- a third phase where, by a second displacement of the interface between the clock 100 and the watch 200, to reconnect the finishing gear train with the display gear train, the coupling mechanism 806 is coupled via the interface which actuates it towards its coupled position and during which third phase it is possible to recoil the rack 801 or to complete the recoiling of the rack 801, started during the second phase, by the interface.

More particularly, use is made of a watch 200 including an hour display of the watch 4 carrying an hour cam 802 including an opening 8020, a second minute cam 803 carried by the minute display of the watch 805, and including a ratchet tooth opening 8030 or a notch 831. And the coupling mechanism 806 is uncoupled in its uncoupled position, which allows the rack 823 to drive the hour display and minute display gear train of the watch 200 in the counter-clockwise direction, over as many revolutions as necessary, until the pawl 801 meets the opening 8020 of the first hour cam 802, corresponding to the minutes preceding the reference time, at an instant at which the pawl 801 can rest on the second minute cam 803 for the rotation corresponding to the last minutes before reaching the reference time, and until it is blocked in the ratchet tooth opening 8030 of the second minute cam 803, the blocking corresponding to the reference display position.

The watch 200 also includes a jumper 804 arranged to cooperate with a star, in particular a 30-teeth star integral with the minute display mobile 805, similarly to the seventh variant, and includes a mechanism for controlling the three phases of the function.

The cycle is carried out in three phases:

- triggering the placement in the reference position, in particular 12h00, and uncoupling by the interface;
- maintaining the position of the displays for the time setting;
- coupling, and if necessary recoiling the pawl 801 via the interface.

During normal operation of the watch, sympathetically off, the hour pinion 824 drives and coils the rack 823, which clicks at each tooth, as shown in FIGS. 19 and 20.

In the first phase, the interface actuates the coupling-clutch 806 to its uncoupled position, as shown in FIG. 21.

The coupling-clutch releases the hour display gear train and the minute display, which is driven in the counter-clockwise direction by the rack 823.

The display gear train, driven in the counter-clockwise direction by the rack 823, can potentially make more than one revolution of the hour wheel (hour display), and more than twelve revolutions of the cannon-pinion (minute display) connected by the timer.

During the second phase, the time-setting mechanism can perform its function in the clockwise direction to the exact time by recoiling the rack 801. If the recoiling is not complete by time setting, it is supplemented by the normal rotation of the watch display in the clockwise direction.

In the third phase, the interface can release the coupling-clutch, and reconnect the finishing gear train with the display gear train.

In short, the reference time setting method includes different steps described below.

8A: A reference position of the displays is defined.

8B: Use is made of a watch 200 including:

- a rack 823 meshed with an hour wheel 808 secured to the hour display of the watch 4, and carrying an hour cam 802 including a ratchet tooth notch,
- a pawl 801 which is maintained resting on the hour cam 802 by a pawl spring 8010,
- where the rack 823 is arranged to click in the clockwise direction of the hour wheel 808, and is driven by a return spring 825.

The watch 200 also includes a rack pinion 824 or hour pinion, which rack pinion 824 is arranged to drive and coil the rack 823, which clicks with each tooth, during normal operation of the watch 200 when the watch 200 does not cooperate with the clock 100.

Watch 200 also including a coupling mechanism 806 between a display gear train 805; 807; 808 and a finishing gear train 810.

And, at any time, the reference time setting of the watch 200 is performed by a cycle including three phases, consisting of:

8C: a first phase during which the placement in the reference position is triggered, by a first displacement of an interface between the clock 100 and the watch 200, the reference time setting of the displays 4, 5 of the watch 200 is performed, and the coupling mechanism 806 is uncoupled by the interface which actuates it to its uncoupled position, which allows the rack 823 to drive the hour display and minute display gear train of the watch 200 in the counter-clockwise direction, over as many revolutions as necessary, until the pawl 801 meets the ratchet tooth opening of the hour cam, this blocking corresponding to the reference display position, 8D: a second phase where the position of the displays 4, 5 is maintained for time setting, and where the time-setting mechanism controlled by the clock 100 sets the time of the displays 4, 5, of the watch 200 in the clockwise direction to the exact time by recoiling the rack 801, 8E: and a third phase where, by a second displacement of the interface between the clock 100 and the watch 200, to reconnect the finishing gear train with the display gear train, the coupling mechanism 806 is coupled by the interface which actuates it towards its coupled position and during which third phase it is possible to recoil the rack 801 or to complete the recoiling of the rack 801, started during the second phase, by the interface.

8F: More particularly, a predetermined time-setting step value is determined, and, during the second phase, the position of the display is maintained in the reference position, by cooperation between a jumper 804 and a star, included in the watch 200, then in each subsequent position step by step, to allow the recoiling of the rack 801, without losing the display.

8G: More particularly, one chooses as a star, carried by the minute display 5, either a thirty-teeth star cooperating with a simple one-tooth jumper 804, or else a pinion of a fifteen-teeth minute cannon-pinion cooperating at the same time with a single tooth of a double jumper 8040 including two teeth.

8H: More particularly, the cannon-pinion or the minute wheel of the watch 200 is precisely positioned by the combination of a star integral with the cannon-pinion or minute wheel, and a jumper with one or more teeth, the number of teeth of the star and the number of teeth of the jumper together defining the value of the predetermined step.

8I: In particular, the coupling mechanism 806 is equipped with a friction spring 809.

8J: More particularly, as the coupling mechanism 806, use is made of a chronograph coupling mechanism, including a clamp 821 whose function is to ensure the coupling and uncoupling, under the control of a column wheel 840 which controls the angular deviation of the arms of the clamp 821, 822, for opening or closing the clamp, corresponding respectively to the uncoupling or to the coupling.

8K: More particularly, a three-phase control mechanism is used.

8L: More particularly, a control mechanism which includes at least one column wheel 840 is used.

A ninth variant relates to a method and a step-by-step time-setting mechanism for the hour and minute displays. The invention proposes a solution for the time setting function of the displays, of the watch in two-minute steps following a reset to the reference position, in particular 12h00, as described in the seventh and eighth variants. It is controlled by the interface of a sympathetic clock, whose data-acquisition mechanism for time setting is as described in the sixth variant above.

Also, it is about allowing the execution of a cycle, for a first displacement of an interface between the watch and the clock, a corrector for example, performing the following functions in the watch at any time:

- returning the displays to a position corresponding to the current time, by a number of steps defined relative to the original position, for example 12h00;
- returning the displays to a position corresponding to the current time increased by an offset allowing to wait for a seconds signal releasing the watch resonator for a precise time setting.

The present description relates to a non-limiting construction of a mechanism setting the time in two-minute steps. Steps of 1 minute, 3, 4, 5, 6 and 10 minutes are also possible.

The watch includes:

- a corrector 932 coinciding with the interface of the clock or another element allowing to transmit a reciprocating movement;
- a rocker lever 931 including an arm 921 capable of driving the cannon-pinion of a tooth in a reciprocating movement;
- a jumper 904 maintaining the position of the minute display in the interval of the driving functions;
- a 30-teeth star carried by the minute display for two-minute steps, in a manner similar to the seventh variant;
- a coupling mechanism 906 between the display gear train 905-907-908 and the finishing gear train 910 which is in the open position for setting the time and can be closed while the watch is operating, in a manner similar to the seventh or eighth variant.

In the particular embodiment illustrated by the figures, advantageously a 15-teeth cannon-pinion 905 is used, which is also necessary to replace the 30-teeth star. This option is not restrictive and the star must be defined according to the desired number of steps per minute. Ze=60 min/2 min. Therefore, the 15-teeth cannon-pinion has 30 stable positions thanks to the double jumper 904 described in FIG. 25, and to the staging of the two offset bearing surfaces 922 and 923 of the arm 921 of the rocker lever 931.

In the initial state, the first stable position therefore corresponds to the display obtained after resetting to the reference position, that is to say 12h00 in this example.

Figure 24:
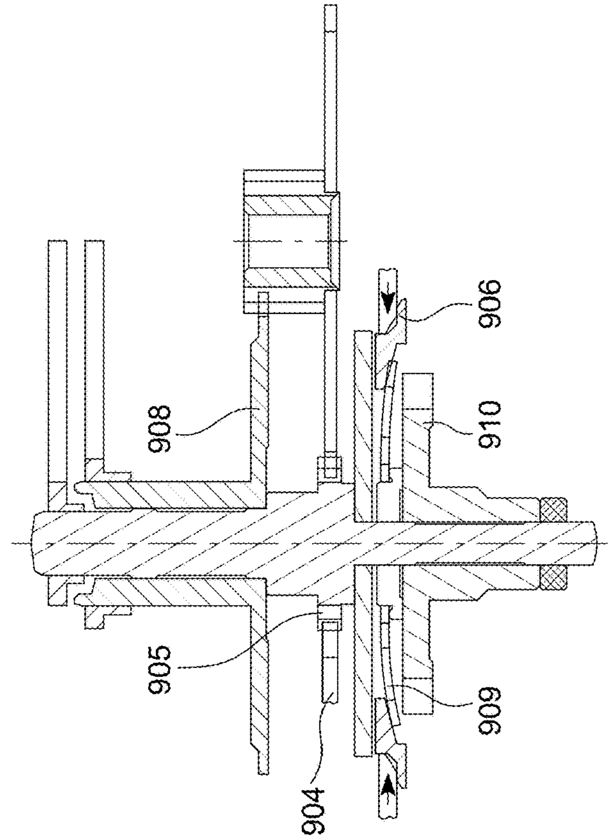
Figure 23:
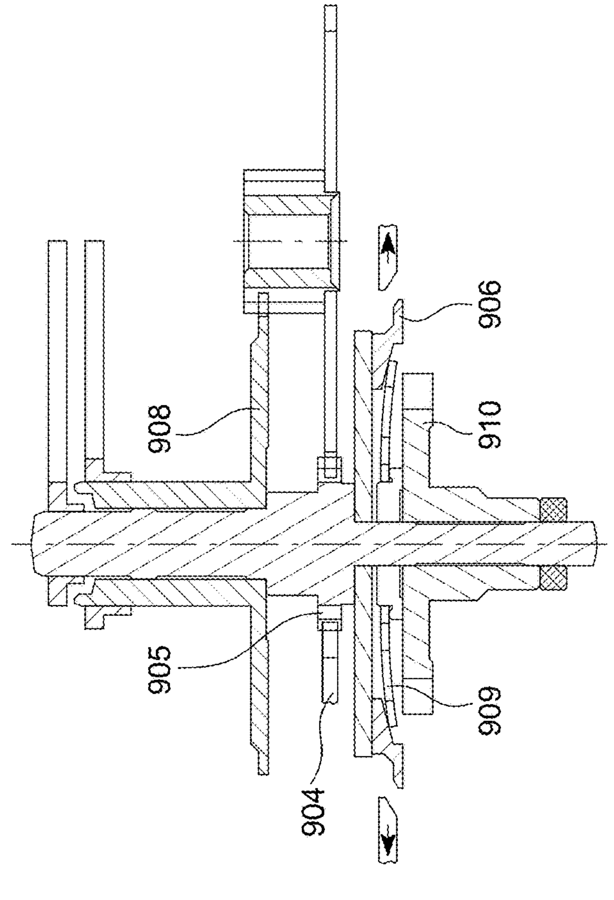
Figure 26:
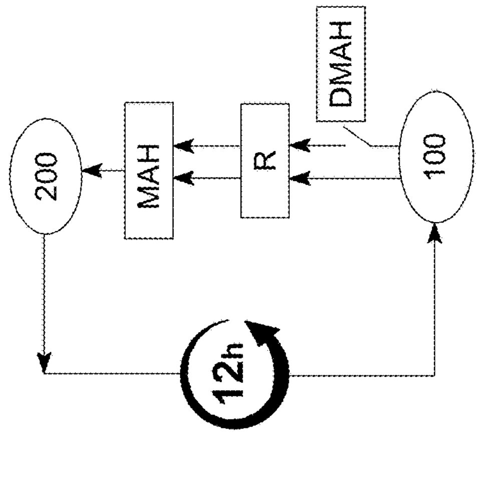
FIG. 26 is a flowchart showing a cycle executed over 12 hours between the clock and the watch, with an optional time-setting request DMAH by the user, and winding R and time-setting actions MAH.

The coupling-clutch is in the open position relative to the finishing gear train 910 as shown in FIG. 24. The display is therefore independent of the gear train of the watch. This gear train is moreover stopped by the stop lever during the function.

With regard to the time-setting function, the clock, according to the sixth variant, transmits through its interface a defined number of displacements necessary to reach the current time, in two-minute steps. It also transmits one or two additional steps to allow the waiting time until the seconds signal.

The interface of the clock collaborates with the corrector 932 of the watch which drives the rocker lever 931. This rocker lever 931 is constructed so as to drive the 30 star by one step, or else, in the alternative embodiment, the 15 pinion by half a step.

Figure 25:
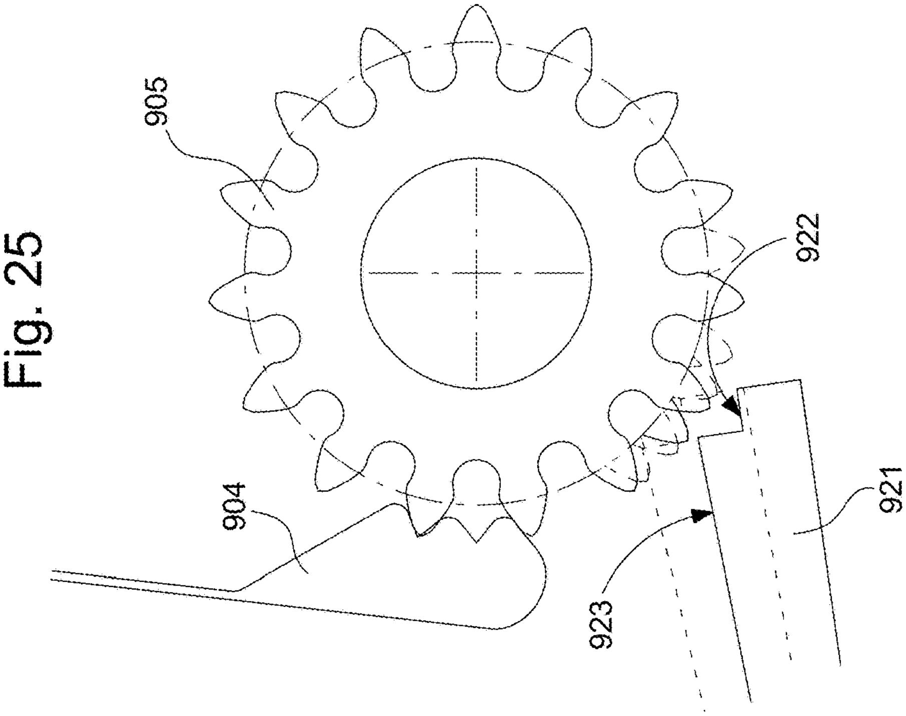
FIGS. 22 to 25 illustrate a ninth variant of step-by-step time setting of the hour and minute displays.
Figure 22:
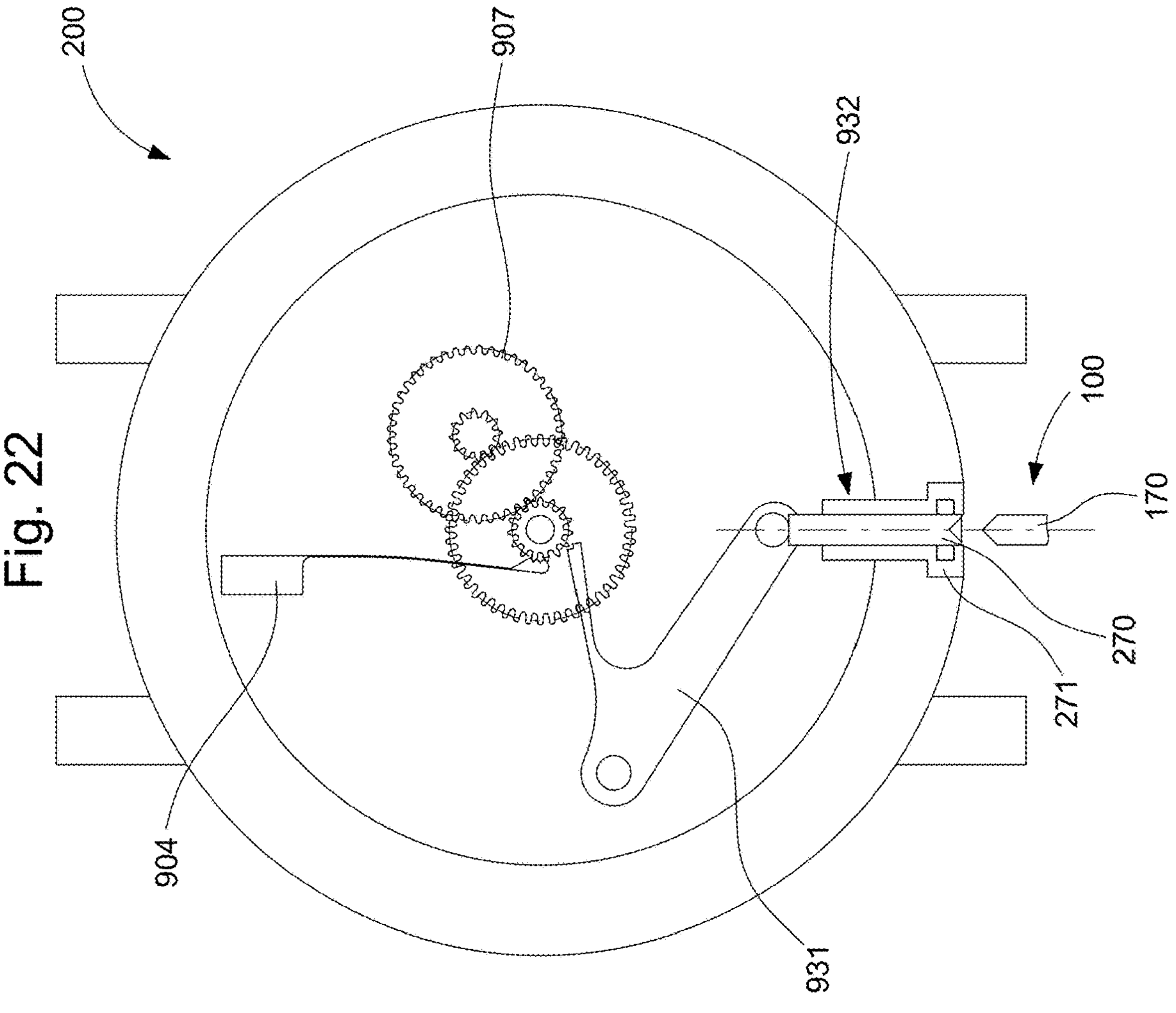

The rocker lever 931 drives the 15-teeth pinion over 80% of the step, and returns to its rest position, the jumper then ensures the remaining stroke, with the remaining 20% of the step in progress, and positions the pinion for the next half step, as shown in FIG. 25.

This embodiment responds to the desired time-setting functions, it allows the clock to displace the displays by two-minute steps to the current time, and to add an offset.

In short, the method for step-by-step time setting of the hour and minute displays involves different steps described below.

9A: A reference position of the displays is defined.

9B: Use is made of a watch 200 including a corrector 932 cooperating with an interface of the clock 100 for the transmission of a reciprocating movement, a rocker lever 931 capable of driving the cannon-pinion of the minute display 5 of a tooth by a reciprocating movement, and a jumper 904 maintaining the position of the minute display in the interval of the drive functions, the watch 200 also including a coupling mechanism 906 between a display gear train 905, 907, 908 and a finishing gear train 910. And, at any time, the clock 100 is able to return the displays 4, 5, either to a position corresponding to the current time read on the clock 100 by the drive of the teeth of the minute display 5 by the rocker lever 931, by a number of steps defined in relation to the reference position, or else to another position corresponding to the current time increased by an offset allowing to wait for a seconds signal allowing the stop mechanism 20 to release the resonator 10 from the watch 200 by the partial drive of the minute display 5 by the rocker lever 931 which performs only part of the stroke corresponding to each tooth, the remainder of the stroke of each tooth to complete the indexed rotation of the minute display 5 then being performed under the pulse of the jumper 904.

9C: A predetermined time-setting step value is determined.

9D: The cannon-pinion or the minute wheel of the watch 200 is precisely positioned by the combination of a star integral with the cannon-pinion or minute wheel, and a jumper with one or more teeth, the number of teeth of the star and the number of teeth of the jumper together defining the value of the predetermined step.

9E: More particularly, the cannon-pinion or the minute wheel of the watch 200 is driven by the combination, on the one hand, of a star integral with the cannon-pinion or minute wheel, and of a rocker lever or of a driver or of a rack, the movement of which is controlled by the clock 100.

9F: More particularly, in a first phase, the clock 100 controls the stop mechanism 20 to stop the resonator 10, returns the displays 4, 5 into the reference position, and positions the coupling mechanism 906 in the open position relative to the finishing gear train 910 which is then independent of the watch 200 gear train.

9G: More particularly, in a second phase, the clock 100 transmits through its interface a defined number of displacements necessary to reach the current time, by an integer number of predetermined steps.

9H: More particularly, in a second phase, the clock 100 transmits through its interface a defined number of displacements necessary to reach the current time, by an integer number of predetermined steps, plus one or two displacements corresponding to one or two additional predetermined steps to allow the waiting time until the seconds signal allowing the stop mechanism 20 to release the resonator 10 of the watch 200.

9I: More particularly, use is made of a watch 200 whose rocker lever 931 is arranged to drive a thirty-teeth star by one step, or a fifteen-teeth pinion by a half step.

9J: More particularly, use is made of a watch 200 whose rocker lever 931 is arranged to drive a fifteen-teeth pinion by half a step, and, drives the fifteen-teeth pinion over 80% of the stroke, and returns to its rest position, the jumper 904 ensuring the remaining 20% of the current stroke, and positions the fifteen-teeth pinion for a next half-step.

9K: More particularly, use is made of a watch 200 which includes a mechanism for setting the time in constant steps, and includes a corrector 932 coinciding with the interface of the clock 100 or another element allowing to transmit a reciprocating movement, a rocker lever 931 capable of driving the cannon-pinion of a tooth by a reciprocating movement, a jumper 904 arranged to maintain the position of the minute display in the interval of the drive functions, a star carried by the minute display with a number of teeth depending on the value of the required step, a coupling mechanism 906 between the display gear train 905, 907, 908, and the finishing gear train 910 and which is in the open position for the time setting and can be closed in operation of the watch 200, the interface of the clock 100 being arranged to cooperate with the corrector 932 of the watch 200 which drives the rocker lever 931 which is arranged to drive the star by one step, or a half step.

9L: More particularly, use is made of a watch 200 whose star is formed by the minute cannon-pinion.

The seventh variant and the eighth variant implement a function controller, to ensure the progress of the functions in the different phases:

In the seventh variant, the function controller has three positions:

- start of function: it controls the uncoupling of the finishing gear train, stops the balance, and releases the hammer;
- time-setting function: it coils the hammer;
- end of function: it releases the coupling-clutch and the balance.

In the eighth variant, the controller has two positions:

- start of function: it controls the uncoupling of the finishing gear train, and stops the balance;
- end of function: it releases the coupling-clutch and the balance.

The invention proposes, in a non-limiting manner, various embodiments, with either a specific controller integrated into the watch, similar to those used in chronographs, or else a controller external to the watch, integrated into the clock. For the controller integrated into the watch, use can be made of:

- a rotary controller, of the column wheel type, controlled by the interface (with two to five successive stable positions: 1-2-3-1-2-3-1 etc.);
- a reciprocal controller, of the shuttle type, controlled by the interface (two successive stable positions: 1-2-1-2-1 etc.).

When the controller is in the clock, the watch only includes a reciprocal cam controlled by the interface and returning to rest by default (a stable rest position, and one to three controlled positions: 1-2-3-2-1-2-3 etc.).

The execution with a column wheel is well adapted to the seventh variant. For example, a column wheel with three positions is selected, said three positions are selected successively by the clock through the sympathetic interface.

This column wheel controls three rocker levers in the manner of chronographs, these rocker levers control the coupling-clutch, the stop lever, and the hammer or hammers, or else are part of these mechanisms. These rocker levers are built to rest on the columns of the column wheel so as to be activated as needed.

The different positions are:

position 0: initial and final position: active coupling-clutch, inactive stop lever, and coiled hammer;

position 1: return to the reference position, in particular 12h00: inactive coupling-clutch, active stop lever, and released hammer;

position 2: time setting: inactive coupling-clutch, active stop lever, and coiled hammer;

position 0: return after complete rotation.

This embodiment can be applied to the eighth variant with a two-position column wheel.

The second embodiment with a simple shuttle is sufficient for the eighth variant where two positions are sufficient, and can replace the column wheel.

The embodiment wherein the controller is in the clock suits the seventh variant well: the three-position column wheel, described previously, is functionally replaced by a three-level snail, which is located in the clock. This snail controls a cam in a reciprocating movement in the watch. This cam controls the coupling-clutch, the stop lever, and the hammer or hammers, as needed.

The different positions are:

position 0: initial and final position: active coupling-clutch, inactive stop lever, and coiled hammer;

position 1: return to the reference position, in particular 12h00: inactive coupling-clutch, active stop lever, and released hammer;

position 2: time setting: inactive coupling-clutch, active stop lever, and coiled hammer;

position 0: return of the cam to zero.

This embodiment with a controller external to the watch is interesting, because it prevents the watch from remaining in position 1 or in position 2, when the watch is unexpectedly removed from the clock (during the execution of the function).

The construction is adapted to avoid the fall of the hammer when switching to position 1 when returning to position 0.

This embodiment wherein the controller is in the clock can be applied to the eighth variant, with a snail and a two-position cam.

In short, such a controller responds to the desired time setting functions, allows the uncoupling of the display from the finishing gear train, and their coupling, allows the hammer to be controlled if necessary, and allows the stop lever to be controlled.

Of course, the use of such a controller is also applicable to the other variants described above.

Thus, these different variants allow to fulfil the following functions:

starting of the stopped watch when it is placed on the clock;

ensuring a minimum battery life of twelve hours when the watch is removed from the clock to be worn;

keeping the watch in operation when it is on the clock;

time setting the watch when it is placed on the clock or at request, with a precision of around ±15s;

keeping the watch on time as long as it is on the clock;

alternatively, the sympathetic assembly 1000 includes an option with an uncoupling mechanism, in order to be able to deactivate the function for a storage of the stopped watch on the clock.

More particularly, the first interface includes a first external actuator in the clock, and a first internal actuator in the watch.

Similarly, the second interface includes a second external actuator in the clock, and a second internal actuator in the watch.

Similarly, the third interface includes a third external actuator in the clock, and a third internal actuator in the watch.

Similarly, if we generalise to a greater number of interfaces, the nth interface includes an nth external actuator in the clock, and an nth internal actuator in the watch.

The sympathetic assembly, as well as the different methods, corresponding to so many different use scenarios, described above, are based on clocks and watches that do not include a strike.

It is understood that it is possible to make such a sympathetic assembly with a striking clock, and/or a striking watch.

Striking mechanisms have the advantage of providing precise references for time settings, which one can imagine using for time setting the sympathetic watches.

However, precautions must be taken.

The striking snails can be used for the time-setting mechanism, in an example of a time-setting carried out in five-minute steps, the corresponding snail must have 144 five-minute steps, and will not be used for the strike. In a strike, the hour snail is in principle jumping with the surprise-piece mechanism, therefore a priori even the drive is particular. The watch can be a strike watch, but this makes the system a bit more complex as it is necessary to isolate the strikes during sympathetic operation where the sympathetic clock 100 and the sympathetic watch 200 cooperate, as the strikes would strike continuously during the time setting and could cause the mechanism to jam.

Under this condition of interposition of isolators, which makes the execution more complex, producing such a mechanism for a striking watch is possible; the watch striking snails would then be driven by the sympathetic time setting.

Only the basic winding and time-setting functions have been explained in the present description, the transfer of other information concerning other variables is of course possible by extrapolation: second time zone, day-night display, AM/PM, date, and more generally calendar elements, or the like.

The invention claimed is:

1. A method for setting to a reference time of a sympathetic watch (200) by a sympathetic clock (100), with which said watch (200) forms a sympathetic assembly (1000) including a connection mechanism including at least two distinct transmission lines between said clock (100) and said watch (200) when said watch (200) is deposited in a receptacle (150) included in said clock (100), in a transfer position, said watch (200) including at least one resonator (10), and a display gear train and a finishing gear train, and, or else a stop mechanism (20) arranged to stop the operation of said resonator (10), and said watch (200) including at least one hour display (4) and one minute display (5), a reference position of which is defined, wherein one said watch (200) is used including a rack (823) meshed with an hour wheel (808) integral with said hour display of the watch (4) and carrying an hour cam (802) including a ratchet tooth notch, a pawl (801) which is bearingly held on said hour cam (802) by a pawl spring (8010), said rack (823) being arranged to click in the clockwise direction of said hour wheel (808), and being driven by a return spring (825), said watch (200) further including a rack pinion (824) or hour pinion, which rack pinion (824) being arranged to drive and coil said rack (823), which clicks with each tooth, during normal operation of said watch (200) when said watch (200) does not cooperate with said clock (100), said watch (200) further including a coupling mechanism (806) between the display gear train (805; 807; 808) and the finishing gear train (810), and wherein, at any time, the setting to a reference time of said watch (200) is performed by a cycle including three phases, comprising a first phase during which the placement in said reference position is triggered, by a first displacement of an interface between said clock (100) and said watch (200), the setting to a reference time of said displays (4; 5) of said watch (200) is performed, and said coupling mechanism (806) is uncoupled by said interface which actuates said coupling mechanism towards an uncoupled position which allows said rack (823) to drive an hour display and a minute display gear train of said watch (200) in the counter-clockwise direction, until said pawl (801) meets the ratchet tooth notch of said hour cam, a blocking corresponding to said reference display position, a second phase where the position of said displays (4; 5) is maintained for the time setting, and where the time-setting mechanism controlled by said clock (100) sets the time of said displays (4; 5) of said watch (200) in the clockwise direction to the exact time by recoiling said rack (801), and a third phase where, by a second displacement of said interface between said clock (100) and said watch (200), to reconnect said finishing gear train with said display gear train, said coupling mechanism (806) is coupled via said interface which actuates said coupling mechanism towards a coupled position.

2. The method for setting to a reference time of a sympathetic watch (200) according to claim 1, wherein said hour cam (802) includes an opening (8020), a minute cam (803) carried by said minute display of the watch (5), and including a ratchet tooth opening (8030) or a notch (831), and said coupling mechanism (806) is uncoupled by an interface which actuates said coupling mechanism towards the coupled position which allows said rack (823) to drive the hour display and minute display gear train of said watch (200) in a counter-clockwise direction, until said pawl (801) meets said opening (8020) of said hour cam (802), and until the blocking in said ratchet tooth opening (8030) of said minute cam (803), said blocking corresponding to said reference display position.

3. The method for setting to a reference time according to claim 2, wherein said coupling mechanism (806) includes a chronograph coupling mechanism, including a clamp (821) whose function is to ensure coupling and uncoupling, under the control of a column wheel (840) which controls an angular deviation of the arms of said clamp (821, 822), for opening or closing said clamp, corresponding respectively to the uncoupling or to the coupling.

4. The method for setting to a reference time according to claim 3, wherein a mechanism for controlling said three phases is used and wherein said control mechanism includes at least one said column wheel (840).

5. The method for setting to a reference time according to claim 2, wherein a mechanism for controlling said three phases is used.

6. A sympathetic timepiece assembly (1000), for implementing the method according to claim 2, including at least one sympathetic watch (200), and a sympathetic clock (100) with a receptacle (150) for receiving one said sympathetic watch (200) in a single transfer position, for the execution of a power recharging and/or display adjustment and/or rate adjustment cycle controlled by said clock (100) or by said watch (200), through a connection mechanism including at least two distinct transmission lines between said clock (100) and one said watch (200) in said transfer position, said watch (200) including at least one power storage barrel, for power supplying at least one resonator (10), said watch (200) including at least one resonator (10), and a display gear train and a finishing gear train, and, or else a stop mechanism (20) arranged to stop the operation of said resonator (10), or else a coupling mechanism allowing to separate the display from the finishing gear train, or else both such a stop mechanism (20) and such a coupling mechanism, and said watch (200) including at least one hour display (4) and one minute display (5), and/or at least one display (3; 4; 5), wherein said watch (200) includes at least one mechanism which is able to be activated or deactivated by an all-or-nothing actuator of said clock (100), and includes at least one receiver able to receive a series of pulses or a mechanical torque coming from an actuator of said clock (100), wherein said watch (200) includes a pawl (801), a rack (823) meshed with an hour wheel (808), and arranged to click from said hour wheel (808) in the clockwise direction, and driven by a return spring (825), an hour rack pinion (824), at least one hour cam (802) carried by said hour wheel (808), and a jumper (804) arranged to cooperate with a star carried by a minute display mobile (805) for maintaining each display position according to a predetermined regular step.

7. The sympathetic assembly (1000) according to claim 6, wherein said hour cam (802) includes an opening (8020), said watch (200) further including a minute cam (803) carried by a minute display mobile (805), and including a ratchet tooth opening (8030) or a notch (831), and a jumper (804) arranged to cooperate with a star carried by a minute display mobile (805) for maintaining each display position according to the predetermined regular step.

8. The sympathetic assembly (1000) according to claim 6, wherein said rack pinion (824) is arranged to drive and coil said rack (823), which clicks with each tooth, during normal operation of said watch (200) when said watch (200) does not cooperate with said clock (100), and wherein said watch (200) includes the coupling mechanism (806) between the display gear train (805; 807; 808) and the finishing gear train (810), and wherein said sympathetic assembly (1000) includes an interface between said clock (100) and said watch (200), said interface being arranged to uncouple said coupling mechanism (806) by actuating said coupling mechanism towards the uncoupled position, which allows said rack (823) to drive the hour display and minute display gear train of said watch (200) in the counter-clockwise direction, with as many revolutions as necessary, until said pawl (801) meets said ratchet tooth opening of said hour cam (802), corresponding to a predetermined reference position of said displays (3; 4; 5) of said watch (200), and until blocking in said ratchet tooth opening, said blocking corresponding to said reference display position.

9. The sympathetic assembly (1000) according to claim 8, wherein said interface between said clock (100) and said watch (200) is further arranged to reconnect said finishing gear train with said display gear train, by coupling said coupling mechanism (806) to recoil said rack (801) or complete the recoiling of said rack (801).

10. The sympathetic assembly (1000) according to claim 8, wherein said coupling mechanism (806) includes a friction spring (809).

11. The sympathetic assembly (1000) according to claim 8, wherein said coupling mechanism (806) is a chronograph coupling mechanism, including a clamp (821) whose function is to ensure coupling and uncoupling, under the control of a column wheel (840) which controls the angular deviation of arms of said clamp (821, 822), for opening or closing said clamp, corresponding respectively to the uncoupling or to the coupling.

12. The sympathetic assembly (1000) according to claim 6, wherein said rack pinion (824) is arranged to drive and coil said rack (823), which clicks with each tooth, during normal operation of said watch (200) when said watch (200) does not cooperate with said clock (100), and wherein said watch (200) includes the coupling mechanism (806) between the display gear train (805; 807; 808) and the finishing gear train (810), and wherein said sympathetic assembly (1000) includes an interface between said clock (100) and said watch (200), said interface being arranged to uncouple said coupling mechanism (806) by actuating said coupling mechanism towards the uncoupled position, which allows said rack (823) to drive the hour display and minute display gear train of said watch (200) in the counter-clockwise direction, until said pawl (801) meets said opening (8020) of said hour cam (802), and until blocking said minute cam (803) in said ratchet tooth opening (8030), said blocking corresponding to said reference display position.

13. The sympathetic assembly (1000) according to claim 6, wherein a time-setting mechanism controlled by said clock (100) is arranged to set the time of said displays (4; 5) of said watch (200) in the clockwise direction towards a correct time by recoiling said rack (801).

14. The sympathetic assembly (1000) according to claim 6, wherein the cooperation between said jumper (804) and said star allows said displays to be maintained in each step, and allows the recoiling of said rack (801).

15. The sympathetic assembly (1000) according to claim 6, wherein said sympathetic assembly (1000) includes a control mechanism for controlling the placement of said displays in said reference position.

16. The sympathetic assembly (1000) according to claim 15, wherein said control mechanism includes at least one said column wheel (840).

17. The sympathetic assembly (1000) according to claim 15, wherein a function controller is able to occupy at least two positions, a first position corresponding to where said controller is arranged to control the uncoupling of the finishing gear train, and stop the balance of the resonator, and a second position corresponding to the where said controller is arranged to release the coupling-clutch and the balance.

18. The sympathetic assembly (1000) according to claim 17, wherein said function controller is integrated into said watch 200, and includes either a rotary controller, of column wheel type, controlled by the interface, with two to five successive stable positions, or else a reciprocal controller, of shuttle type, controlled by the interface, with two successive stable positions.

19. The sympathetic assembly (1000) according to claim 17, wherein said function controller is external to said watch (200) and is housed in said clock (100), and wherein said watch (200) only includes a reciprocal cam controlled by the interface and returning to rest by default, and includes a stable rest position, and one to three controlled positions.

20. The sympathetic assembly (1000) according to claim 17, wherein said function controller includes a snail and a two-position cam.

21. The method for setting to a reference time according to claim 1, wherein a predetermined time-setting step value is determined, and, wherein during said second phase, the position of the display is maintained in said reference position, by cooperation between a jumper (804) and a star, included in said watch (200), then in each subsequent position step by step, to enable the recoiling of said rack (801).

22. The method for setting to a reference time according to claim 21, wherein the method includes choosing as said star, carried by said minute display (5), either a thirty-teeth star cooperating with one a simple one-tooth jumper (804), or else a pinion of a fifteen-teeth minute cannon-pinion cooperating at the same time with a single tooth of a double jumper (8040) including two teeth.

23. The method for setting to a reference time according to claim 21, wherein a cannon-pinion or the minute wheel of said watch (200) is precisely positioned by the combination of a star integral with said cannon-pinion or minute wheel, and a jumper with one or more teeth, a number of teeth of said star and a number of teeth of said jumper together defining the value of said predetermined step.

* * * * *